US012621873B2

(12) United States Patent (10) Patent No.: US 12,621,873 B2

Khoshkholgh Dashtaki et al. (45) Date of Patent: May 5, 2026

(54) RANDOM ACCESS PROCEDURE WITH BUFFER STATUS REPORT

(71) Applicant: Ofinno, LLC, Reston, VA (US)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Yunjung Yi, Vienna, VA (US); Hyoungsuk Jeon, Centreville, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 240 days.

(21) Appl. No.: 18/511,474

(22) Filed: Nov. 16, 2023

(65) Prior Publication Data

US 2024/0090042 A1 Mar. 14, 2024

Related U.S. Application Data

(63) Continuation of application No. PCT/US2022/030242, filed on May 20, 2022.

(Continued)

(51) Int. Cl.
*H04W 72/21* (2023.01)
*H04W 74/0833* (2024.01)
(Continued)

(52) U.S. Cl.
CPC ....... *H04W 72/21* (2023.01); *H04W 74/0833* (2013.01); *H04W 74/0836* (2024.01); *H04W 74/0838* (2024.01)

(58) Field of Classification Search
CPC ............. H04W 72/21; H04W 74/0833; H04W 74/0838; H04W 74/0836
See application file for complete search history.

(56) References Cited

U.S. PATENT DOCUMENTS 10,531,493 B2 1/2020 Zhang et al.
2016/0157256 A1* 6/2016 Tseng ................ H04W 28/0278
370/329

(Continued)

FOREIGN PATENT DOCUMENTS

WO 2009/137647 A1 11/2009
WO 2021/064150 A1 4/2021
WO 2021/231119 A1 11/2021

OTHER PUBLICATIONS

3GPP TS 38.211 V16.4.0 (Dec. 2020); Technical Specification; 3rd Generation Partnership Project; Technical Specification Group Radio Access Network; NR; Physical channels and modulation; (Release 16).

(Continued)

*Primary Examiner* — Brenda H Pham
(74) *Attorney, Agent, or Firm* — Xin Gao; Kavon Nasabzadeh; Jacob L. Mangan

(57) ABSTRACT

A wireless device receives one or more configuration parameters indicating a first timer used for prohibiting initiation of a random access (RA) procedure for a buffer status report (BSR). The wireless device starts the first timer based on completing a first RA procedure initiated for a first BSR and triggers a second BSR while the first timer is running. Based on the triggering the second BSR while the first timer running, the wireless device prohibits initiation of a second RA procedure for the second BSR.

20 Claims, 38 Drawing Sheets

Related U.S. Application Data

(60) Provisional application No. 63/191,004, filed on May 20, 2021.

(51) Int. Cl.
  *H04W 74/0836* (2024.01)
  *H04W 74/0838* (2024.01)

(56) References Cited

U.S. PATENT DOCUMENTS

2018/0270699 A1* 9/2018 Babaei .............. H04W 28/0278
2018/0368012 A1* 12/2018 Wei ....................... H04W 24/08
2021/0360469 A1 11/2021 Shrestha et al.

OTHER PUBLICATIONS

3GPP TS 38.212 V16.4.0 (Dec. 2020); Technical Specification; 3rd Generation Partnership Project; Technical Specification Group Radio Access Network; NR; Multiplexing and channel coding; (Release 16).

3GPP TS 38.213 V16.4.0 (Dec. 2020); Technical Specification; 3rd Generation Partnership Project; Technical Specification Group Radio Access Network; NR; Physical layer procedures for control (Release 16).

3GPP TS 38.214 V16.4.0 (Dec. 2020); Technical Specification; 3rd Generation Partnership Project; Technical Specification Group Radio Access Network; NR; Physical layer procedures for data; (Release 16).

3GPP TS 38.300 V16.4.0 (Dec. 2020); Technical Specification; 3rd Generation Partnership Project; Technical Specification Group Radio Access Network; NR; NR and NG-RAN Overall Description; Stage 2; (Release 16).

3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).

3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).

3GPP TR 38.821 V16.0.0 (Dec. 2019); Technical Report; 3rd Generation Partnership Project; Technical Specification Group Radio Access Network; Solutions for NR to support non-terrestrial networks (NTN); (Release 16).

R2-2006702; 3GPP TSG-RAN WG2 #111-e; e-Meeting, Aug. 17-28, 2020; Title: Enhancements for NTN on MAC Layer—Impact Analysis on TS; Source: Nomor Research GmbH, Thales; Type: Discussion; Document for: Agreement.

R2-2006974; 3GPP TSG-RAN WG2 Meeting #111e; E-Meeting: Aug. 17-28, 2020; Agenda item: 8.10.2.1; Source: Qualcomm Inc.; Title: UP aspects including Random Access procedure enhancements; Document for: Discussion and Decision.

R2-2007056; 3GPP TSG-RAN WG2 Meeting #111-e; Online, Aug. 17-28, 2020; Agenda item: 8.10.2.1; Source: Spreadtrum Communications; Title: Introducing offsets in MAC; Document for: Discussion and Decision.

R2-2007176; 3GPP TSG RAN WG2 #111; e-Meeting, Aug. 17-28, 2020; Agenda Item: 8.10.2.1; Source: Xiaomi; Title: Discussion on UL scheduling enhancement; Document for: Discussion and Decision.

R2-2007186; 3GPP TSG-RAN WG2 Meeting #111 electronic; Online, Aug. 17-28, 2020; Agenda Item: 8.10.2.1; Source: Sony; Title: MAC enhancements in NTN; Document for: Discussion.

R2-2007714; 3GPP TSG-RAN WG2 Meeting #111; E-meeting, Aug. 17-28, 2020; Agenda Item: 8.10.2.1; Source: Ericsson; Title: On scheduling, HARQ, DRX, RLC, and PDCP for NTN; Document for: Discussion, Decision.

R2-2007888; 3GPP TSG-RAN WG2 #111-e; E-meeting, Aug. 17-Aug. 28, 2020; Agenda Item: 8.10.2.1 (NR_NTN_solutions-Core); Source:

LG Electronics Inc.; Title: Discussion on MAC aspects for NTN; Document for: Discussion and Decision.

R2-2008188; 3GPP RAN WG2 Meeting #111e; Aug. 17-28, 2020; Agenda Item: 8.10.2.1; Source: InterDigital (email discussion Rapporteur); Title: Summary of [AT111][107][NTN] Pre-compensation and other MAC issues; Document for: Discussion, Decision.

R2-2008214; 3GPP RAN WG2 Meeting #111e; Aug. 17-28, 2020; Agenda Item: 8.10.2.1; Source: InterDigital (email discussion Rapporteur); Title: Summary of [AT111][107][NTN] Pre-compensation and other MAC issues Phase 2; Document for: Discussion, Decision.

R2-2009063; 3GPP TSG-RAN WG2 #112-e; e-Meeting, Nov. 2-13, 2020; Revision of R2-2006702; Title: Enhancements for NTN on MAC Layer; Source: Nomor Research GmbH, Thales; Type: Discussion; Document for: Agreement.

R2-2009064; 3GPP TSG-RAN WG2 #112-e; e-Meeting, Nov. 2-13, 2020; Title: Enhancements on UL scheduling for NTN; Source: Nomor Research GmbH, Thales; Type: Discussion; Document for: Agreement.

R2-2009895; 3GPP TSG-RAN WG2 Meeting #112 electronic; Online, Nov. 2020; Agenda Item: 8.10.2.2; Source: Sony; Title: Other MAC enhancements in NTN; Document for: Discussion.

R2-2010168; 3GPP TSG-RAN WG2 #112; E-Meeting, Nov. 2-13, 2020; Revision of R2-2007714; Agenda Item: 8.10.2.2; Source: Ericsson; Title: On scheduling, HARQ, and DRX for NTN; Document for: Discussion, Decision.

R2-2010335; 3GPP TSG-RAN WG2 #112-e; E-meeting, Nov. 2-Nov. 13, 2020; Agenda Item: 8.2.10.2 (NR_NTN_solutions-Core); Source: LG Electronics Inc.; Title: Discussion on scheduling enhancement; Document for: Discussion and Decision.

R2-2010455; e3GPP RAN WG2 Meeting #112e; Nov. 2-13, 2020; Agenda Item: 8.10.2.1; Source: InterDigital (email discussion Rapporteur); Title: Summary of [Post111-e][908][NTN] RACH and HARQ feedback aspects; Document for: Discussion, Decision.

R2-2100161; 3GPP TSG-RAN WG2 Meeting #113-e; Electronic, Jan. 25-Feb. 5, 2021; Agenda Item: 8.10.2.2; Source: OPPO; Title: Report of [Post112-e][152][NTN] UL scheduling enhancements; WID/SID: NR_NTN_solutions-Core—Release 17; Document for: Discussion, Decision.

R2-2100251; 3GPP TSG RAN WG2 Meeting #113; e-Meeting, Jan. 25-Feb. 5, 2021; Agenda item: 8.10.2.1; Source: Samsung; Title:RACH Aspects for an NTN—Observations and Proposals; Document for: Discussion & Decision.

R2-2100334; 3GPP TSG-RAN WG2 Meeting #113-e; Electronic meeting, Jan. 25-Feb. 5, 2021; Source: CATT; Title: Discussion on UL Scheduling Enhancements in NR NTN; Agenda Item: 8.10.2.2; Document for: Discussion and Decision.

R2-2100415; TSG-RAN WG2 Meeting #113 electronic; Online, Jan. 25-Feb. 5, 2021; Source: CAICT; Title: Considerations on RACH procedure enhancements in NTN; Agenda Item: 8.10.2.1; Document for: Discussion and decision.

R2-2100663; 3GPP TSG-RAN WG2 Meeting #113-e; Online, Jan. 25-Feb. 5, 2021; Agenda item: 8.10.2.1; Source: Spreadtrum Communications; Title: Discussion on Random Access in NTN; Document for: Discussion and Decision.

R2-2100740; 3GPP TSG-RAN WG2 Meeting #113e; E-Meeting: Jan. 25-Feb. 5, 2021; Agenda item: 8.10.2.1; Source: Qualcomm Incorporated; Title: Details of the start offset in Random Access procedure; Document for: Discussion and Decision.

R2-2101063; 3GPP TSG-RAN WG2 Meeting #113 Electronic; Elbonia, Jan. 25-Feb. 5, 2021; Agenda item: 8.10.2.2; Source: Nokia, Nokia Shanghai Bell; Title: On UL scheduling enhancements and UE-calculated TA report in NTN; WID/SID: NR_NTN_solutions—Core—Release 17; Document for: Discussion and Decision.

R2-2101254; 3GPP TSG-RAN WG2 #113-e; e-Meeting, Jan. 25-Feb. 5, 2021; Revision of R2-2009064; Title: Enhancements on UL scheduling for NTN; Source: Thales; Type: Discussion; Document for: Agreement.

R2-2101493; 3GPP TSG-RAN WG2 #113-e; E-Meeting, Jan. 25, 2021-Feb. 5, 2021; Revision of R2-2010168; Agenda Item: 8.10.2.2; Source: Ericsson; Title: On scheduling, HARQ, and DRX for NTNs; Document for: Discussion, Decision.

(56) References Cited

OTHER PUBLICATIONS

R2-2101494; 3GPP TSG-RAN WG2 #113e; E-Meeting, Jan. 25, 2021-Feb. 5, 2021; Revision of R2-2010980; Agenda Item: 8.10.2.1; Source: Ericsson; Title: On Random Access in NTNs; Document for: Discussion, Decision.

R2-2101580; 3GPP TSG-RAN WG2 #113-e; E-meeting, Jun. 25-Feb. 5, 2021; Agenda Item: 8.10.2.2 (NR_NTN_solutions-Core); Source: LG Electronics Inc.; Title: Discussion on scheduling enhancement; Document for : Discussion and Decision.

R2-2102951; 3GPP TSG-RAN WG2 Meeting #113bis-e; Electronic meeting, Apr. 12-20, 2021; Source: CATT ; Title: Discussion on UL Scheduling Enhancements in NR NTN; Agenda Item: 8.10.2.2; Document for: Discussion and Decision.

R2-2103232; 3GPP TSG-RAN WG2 Meeting #113bis Electronic; Elbonia, Apr. 12-Apr. 20, 2021; Agenda item: 8.10.2.2; Source: Nokia, Nokia Shanghai Bell; Title: Discussion on UL scheduling enhancements for NTN; WID/SID: NR_NTN_solutions-Core—Release 17; Document for: Discussion and Decision.

R2-2103263; 3GPP TSG-RAN WG2 Meeting #113 bis electronic; Online, Apr. 12-Apr. 20, 2021; Agenda item: 8.10.2.1; Source: Asia Pacific Telecom, FGI; Title: BSR over 2-step RACH; Document for: Discussion and decision.

R2-2103445; 3GPP TSG-RAN WG2 Meeting #113bis electronic; Online, Apr. 12-Apr. 20, 2021; Agenda Item: 8.10.2.2; Source: Panasonic; Title: Co-existence issue of BSR over CG and BSR over 2-step RACH; Document for: Discussion, Decision.

R2-2103460; 3GPP TSG-RAN WG2 Meeting #113bis electronic; Online, Apr. 12-20, 2021; Agenda Item: 8.10.2.1; Source: ASUSTeK; Title: BSR over 2-step RA; Document for: Discussion and Decision.

R2-2103630; 3GPP TSG-RAN WG2 #113b-e; Electronic Meeting, Apr. 12-Apr. 20, 2021; Agenda Item: 8.10.2.1; Source: Huawei, HiSilicon; Title: Report of [POST113-e][106][NTN] MAC aspects (Huawei); Document for: Discussion, Decision.

R2-2104038; 3GPP TSG RAN WG2 Meeting #113 bis electronic; Online, Apr. 12-Apr. 20, 2021; Source : CAICT; Title : Discussion on MAC timers about UL scheduling in NTN; Agenda Item: 8.10.2.2; Document for: Discussion / Decision.

R2-2104144; 3GPP TSG-RAN WG2 #113bis-e; E-meeting, Apr. 12-Apr. 20, 2021; Agenda Item: 8.10.2.2 (NR_NTN_solutions-Core); Source: LG Electronics Inc.; Title: Discussion on UL scheuld-ing and UL retranmission; Document for: Discussion and Decision.

R2-2104851; 3GPP TSG-RAN WG2 Meeting #114-e; Electronic meeting, May 19-27, 2021; Source: CATT; Title: Discussion on HARQ Aspects and UL Scheduling Enhancement in NTN; Agenda Item: 8.10.2.2; Document for: Discussion and Decision.

R2-2105382; 3GPP TSG-RAN WG2 Meeting #114 electronic; Online, May 19-27, 2021; Agenda Item: 8.10.2.1; Source: ASUSTeK; Title: BSR over 2-step RA; Document for: Discussion and Decision.

R2-2105414; 3GPP TSG-RAN WG2 Meeting #114 Electronic; Elbonia, May 19-27, 2021; R2-2103232; Agenda item: 8.10.2.2; Source: Nokia, Nokia Shanghai Bell; Title: Discussion on UL scheduling enhancements for NTN; WID/SID: NR_NTN_solutions-Core—Release 17; Document for: Discussion and Decision.

R2-2105498; 3GPP TSG-RAN WG2 Meeting #114 electronic; Revision of R2-2103445; Online, May 2021; Agenda Item: 8.10.2.2; Source: Panasonic; Title: Co-existence issue of BSR over CG and BSR over 2-step RACH; Document for: Discussion, Decision.

R2-2106089; 3GPP TSG-RAN WG2 #114-e; Electronic meeting, May 19, 2021-May 27, 2021; Revision of R2-2103950; Agenda Item: 8.10.2.2; Source: Ericsson; Title: On DRX, LCP, timing, HARQ, SR/BSR, and CG and SPS; Document for: Discussion, Decision.

R2-2106201; 3GPP TSG-RAN WG2 #114-e; E-meeting, May 19-May 27, 2021; Agenda Item: 8.10.2.2 (NR_NTN_solutions-Core); Source: LG Electronics Inc.; Title: Discussion on other MAC aspects; Document for: Discussion and Decision.

International Search Report and Written Opinion of the International Searching Authority mailed Jul. 27, 2022, in International Application No. PCT/US2022/030242.

* cited by examiner

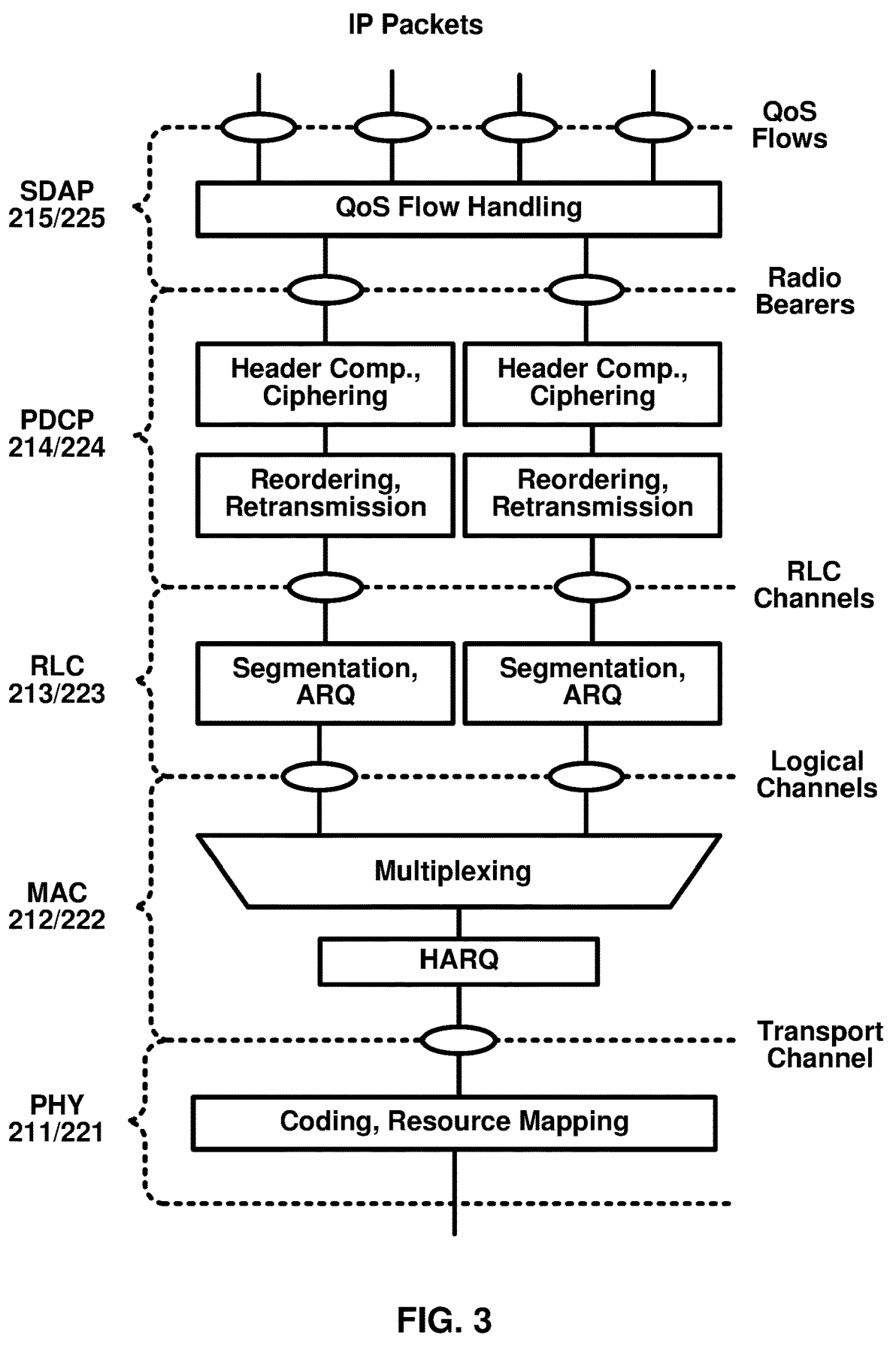

IP Packets

SDAP
215/225

QoS Flow Handling — QoS Flows

Radio Bearers

PDCP
214/224

| Header Comp., Ciphering | Header Comp., Ciphering |
| Reordering, Retransmission | Reordering, Retransmission |

RLC Channels

RLC
213/223

| Segmentation, ARQ | Segmentation, ARQ |

Logical Channels

MAC
212/222

Multiplexing

HARQ

Transport Channel

PHY
211/221

Coding, Resource Mapping

FIG. 3

Uplink

Downlink

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 19

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 20

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 21

| RAT type/ Platform type | Altitude range | Orbit | Typical beam footprint size |
|---|---|---|---|
| LEO satellite | 250 – 1500 km | Circular around the earth | 100 – 500 km |
| MEO satellite | 5000 – 25000 km | | 100 – 500 km |
| GEO satellite | 35,786 km | Notional station keeping position fixed in terms of elevation/azimuth with respect to a given earth point | 200 – 1000 km |
| UAS platform | 8-50 km (20km for HAPS) | | 5 – 200 km |
| HEO platform | 400 – 50000km | Elliptical around the earth | 200 – 1000km |

FIG. 25

| Class of Orbit | Elevation angle (degrees) | | |
|---|---|---|---|
| Altitude (km) | 0 | 10 | 90 |
| LEO satellite | Propagation delay – satellite to UE (millisec) | | |
| 800 | 11.0 | 7.9 | 2.7 |
| 1400 | 14.8 | 11.6 | 4.7 |
| MEO satellite | Propagation delay – satellite to UE (millisec) | | |
| 8000 | 43.0 | 39.4 | 26.7 |
| GEO satellite | Propagation delay – satellite to UE (millisec) | | |
| 35,786 | 138.9 | 135.3 | 119.3 |

Types of non-terrestrial network platforms

RANDOM ACCESS PROCEDURE WITH BUFFER STATUS REPORT

CROSS-REFERENCE TO RELATED APPLICATIONS

This application is a continuation of International Application No. PCT/US2022/030242, filed May 20, 2022, which claims the benefit of U.S. Provisional Application No. 63/191,004, filed May 20, 2021, all of which are hereby incorporated by reference in their entireties.

BRIEF DESCRIPTION OF THE DRAWINGS

Examples of several of the various embodiments of the present disclosure are described herein with reference to the drawings.

FIG. 3 illustrates an example of services provided between protocol layers of the NR user plane protocol stack of FIG. 2A.

FIG. 6 is an example diagram showing RRC state transitions of a UE.

FIG. 7 illustrates an example configuration of an NR frame into which OFDM symbols are grouped.

FIG. 18A shows an example of a DL MAC PDU.

FIG. 18B shows an example of an UL MAC PDU.

FIG. 19 shows an example of multiple LCIDs that may be associated with the one or more MAC CEs.

FIG. 20 shows an example of the one or more MAC CEs.

FIG. 21 shows examples of DCI formats.

FIG. 25 is an example figure of different types of non-terrestrial network platforms.

FIG. 26 examples of propagation delay corresponding to NTNs of different altitudes.

FIG. 28 shows an example of UL-DL timing relationship in a non-terrestrial network with transparent satellite.

FIG. 29 shows an example of UL-DL timing relationship in a non-terrestrial network with transparent satellite.

DETAILED DESCRIPTION

Figures 1A, 1B:
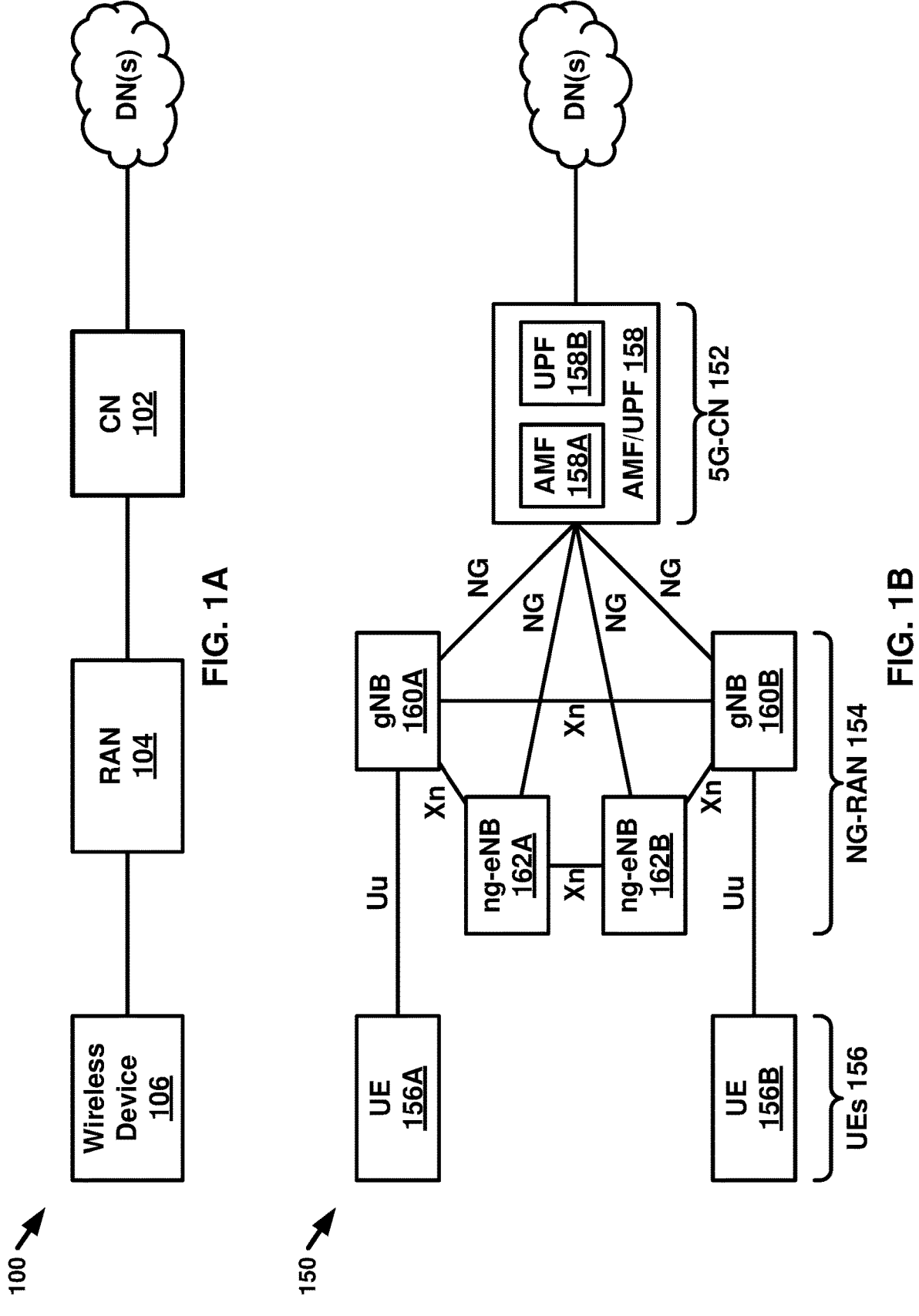
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN).

Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
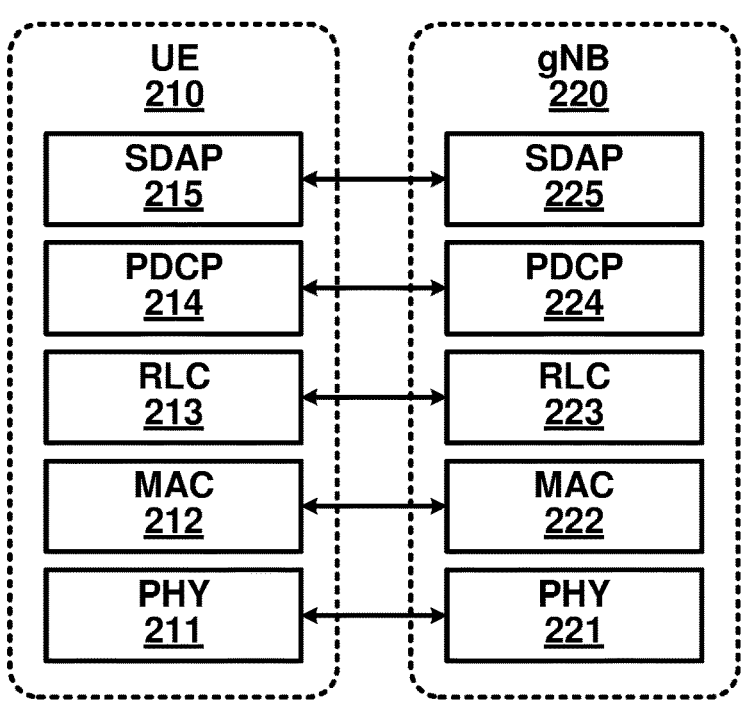
FIG. 2A and FIG. 2B respectively illustrate a New Radio (NR) user plane and control plane protocol stack.
Figure 2B:
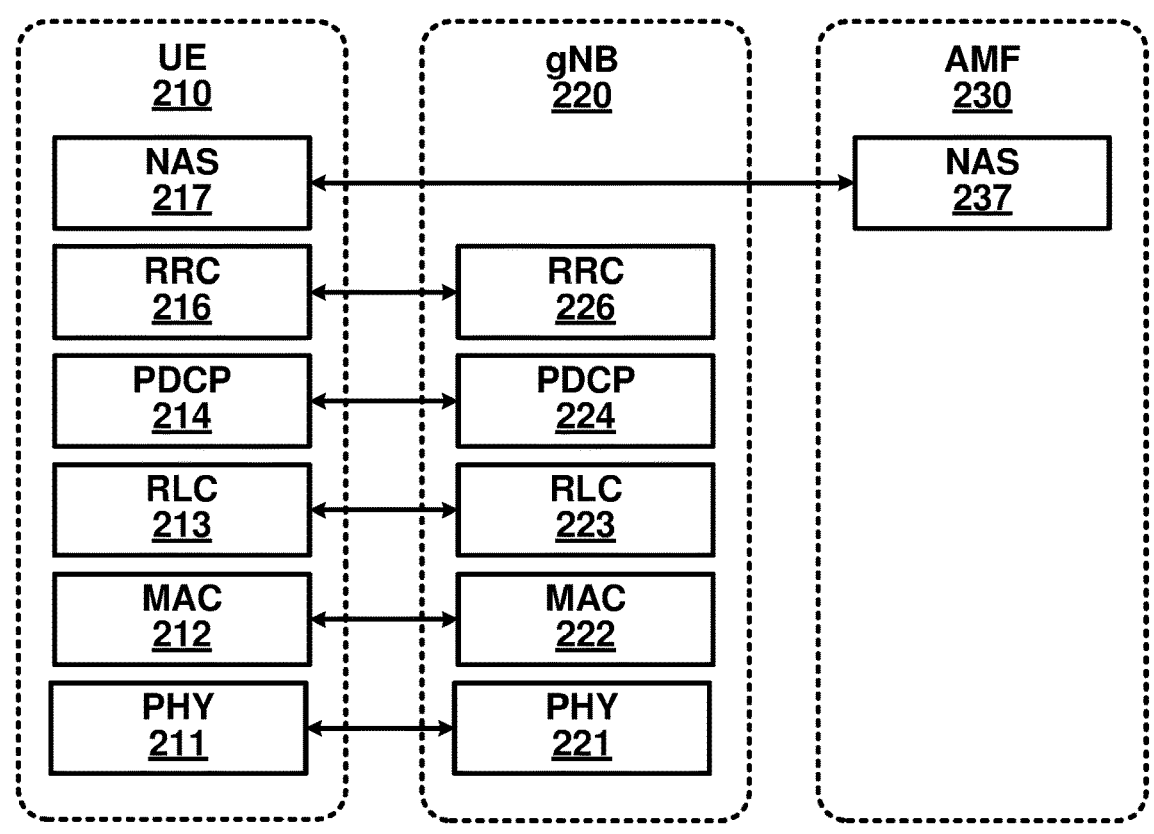

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
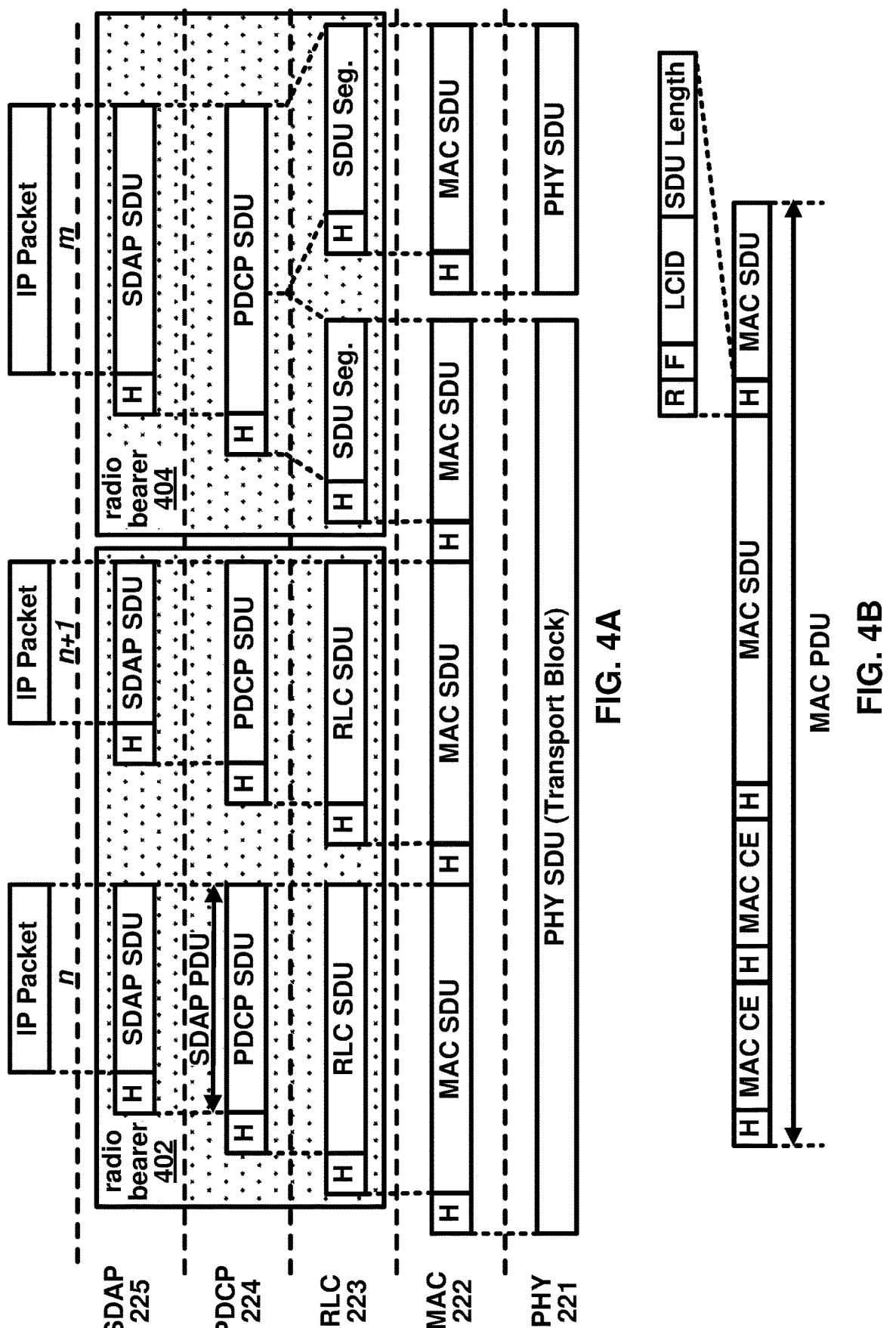
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
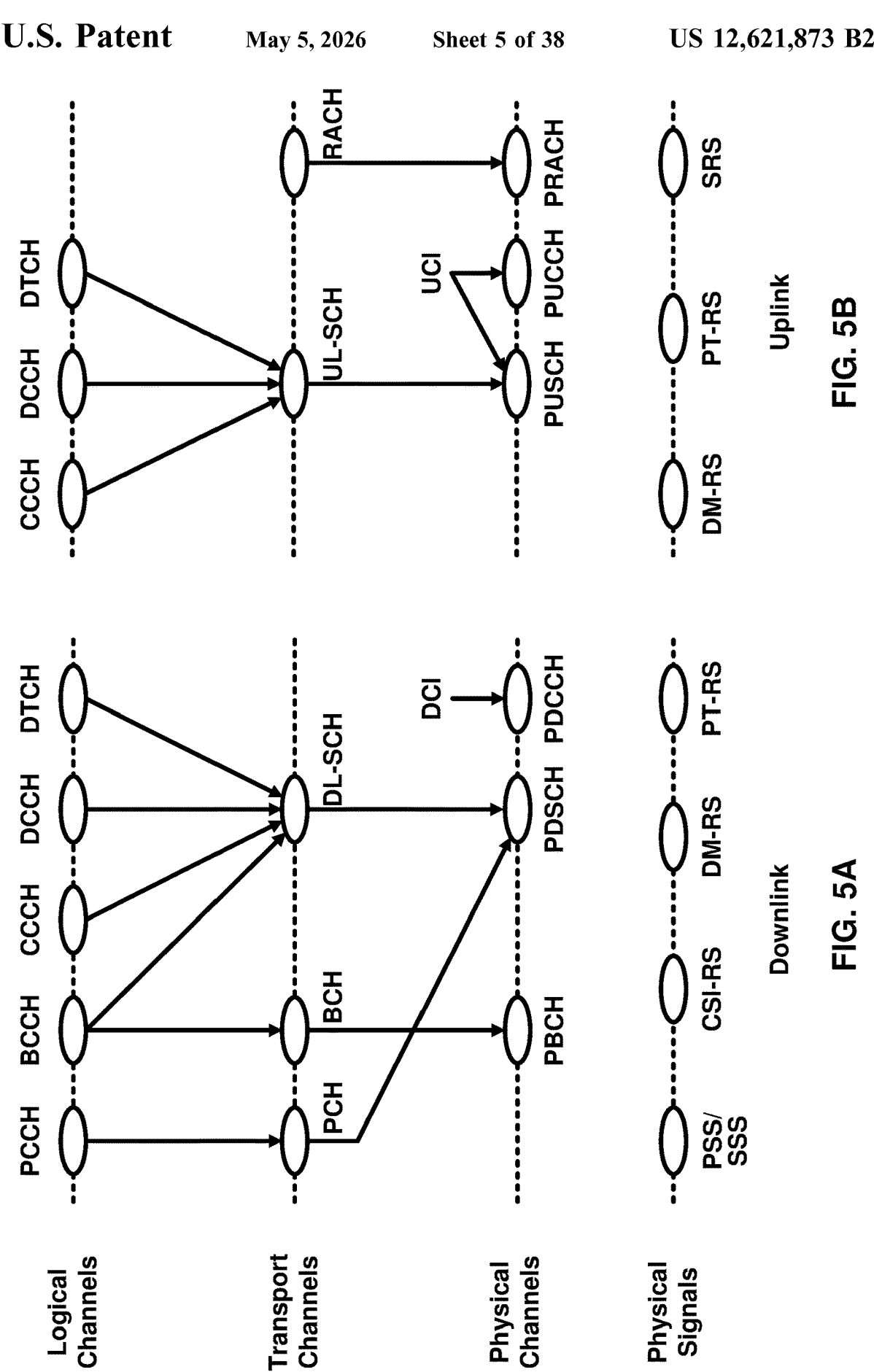
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
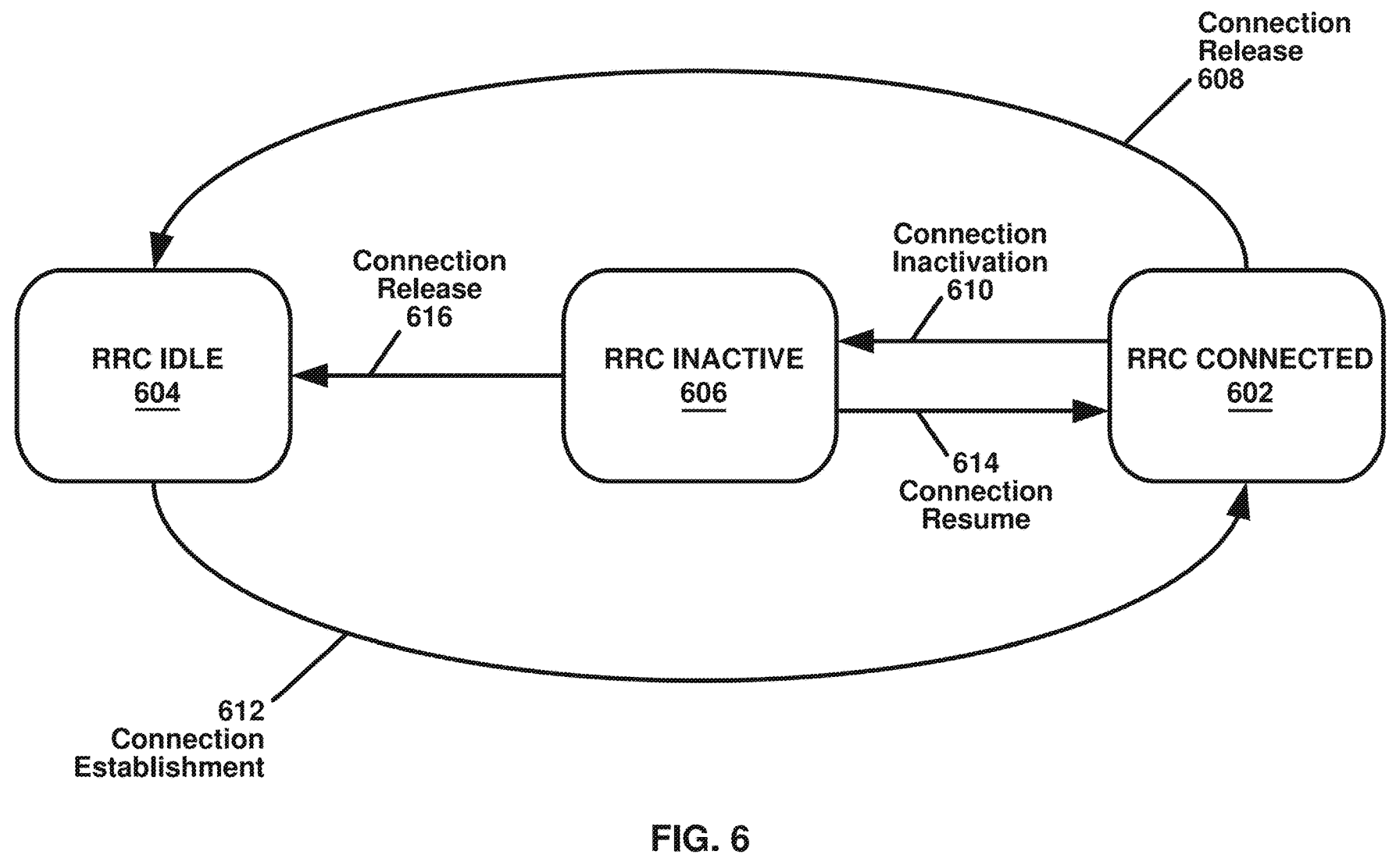

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1A, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
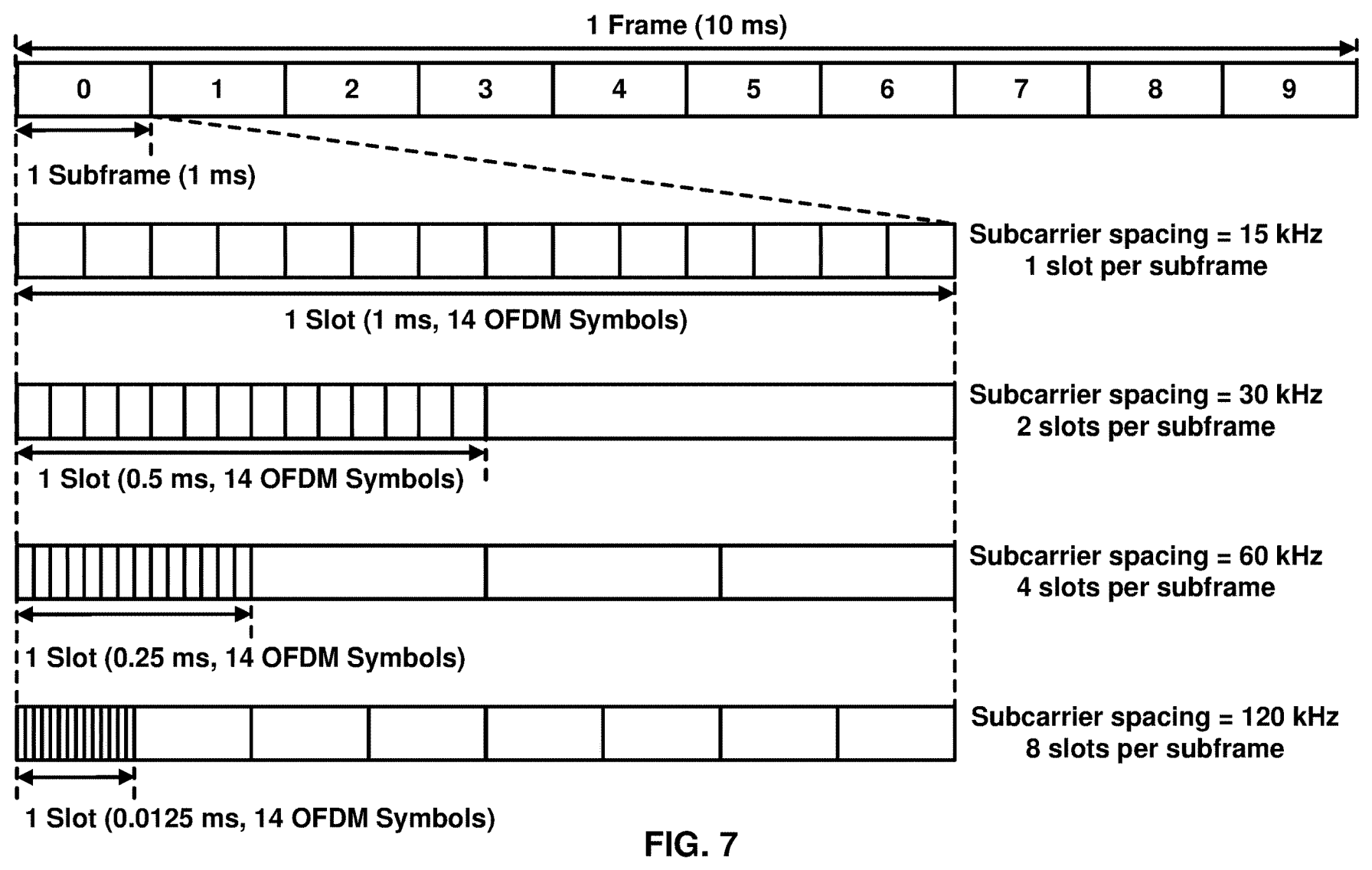

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
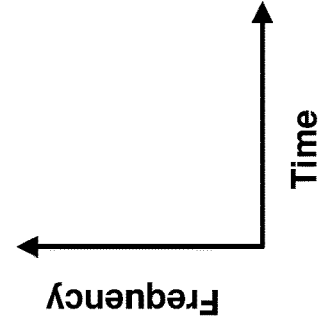
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
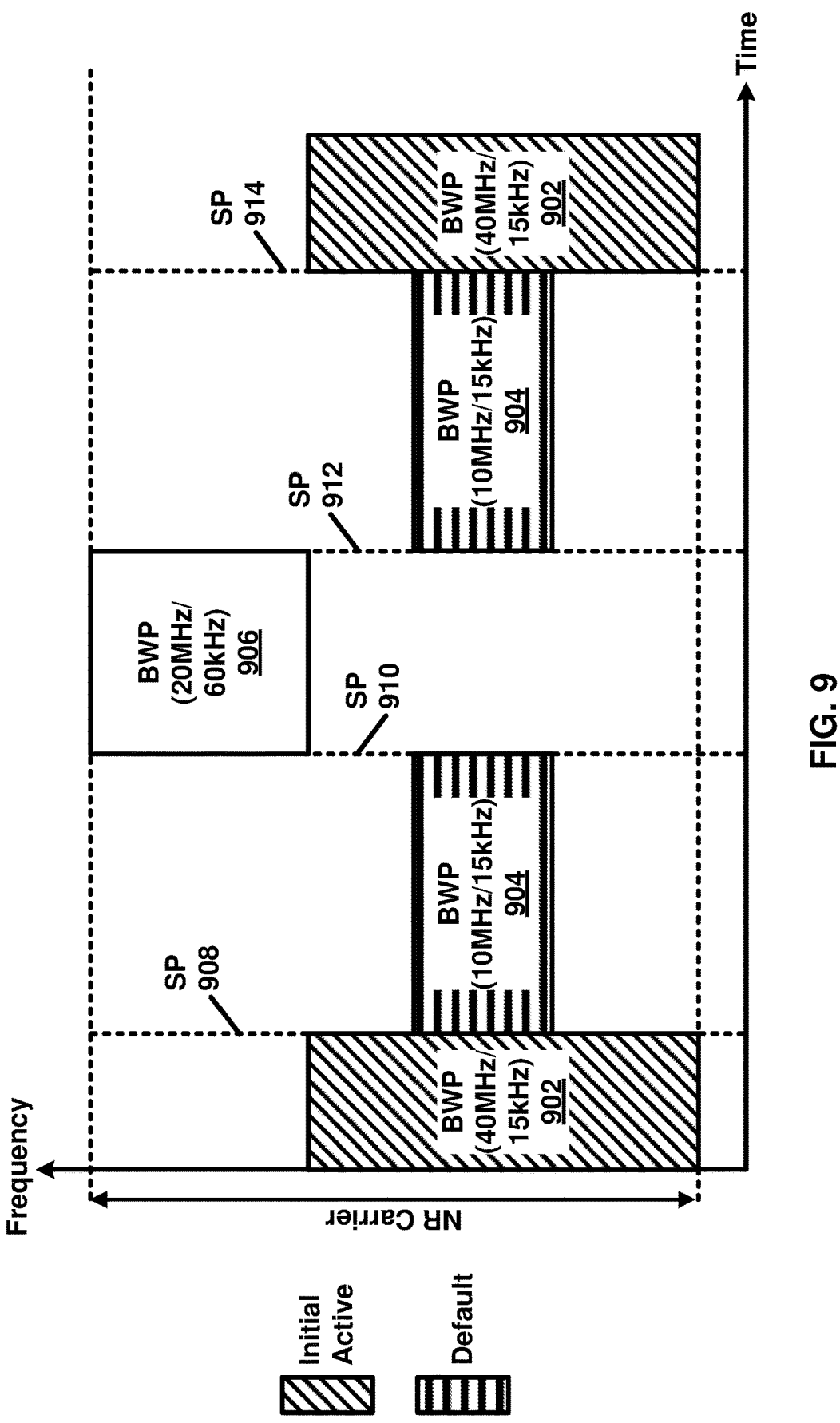
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
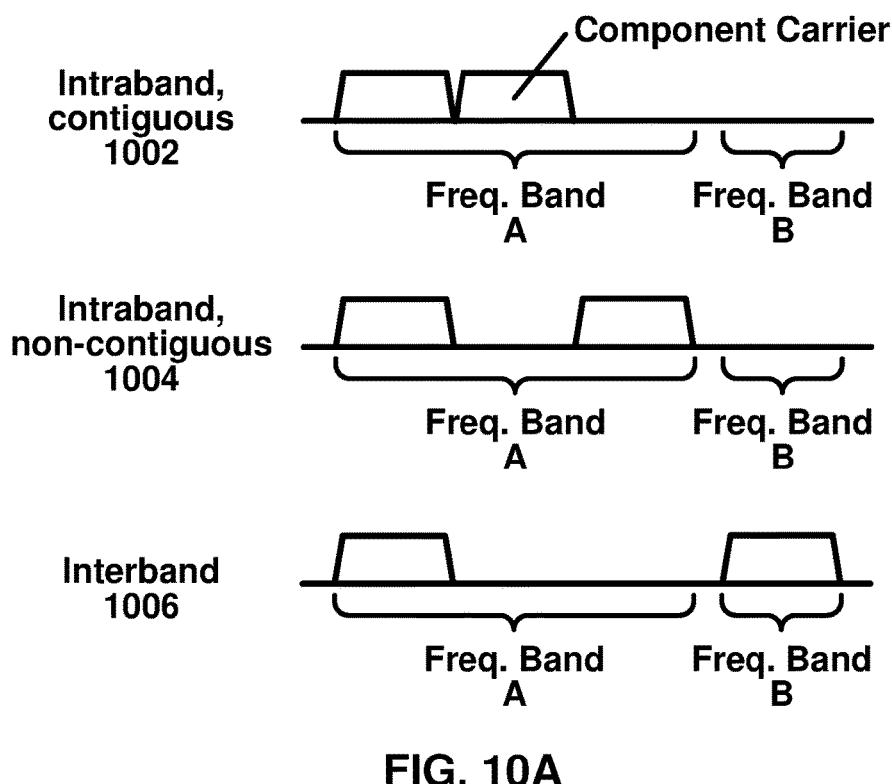
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
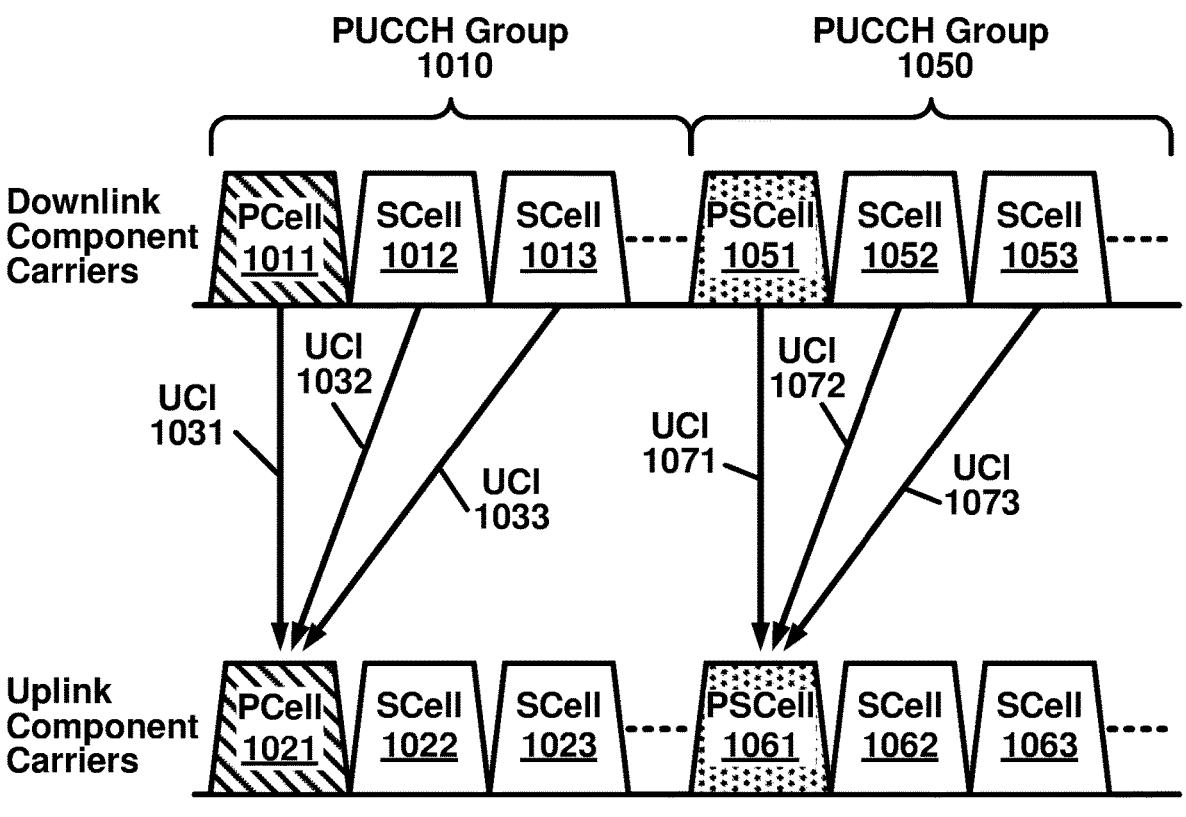
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
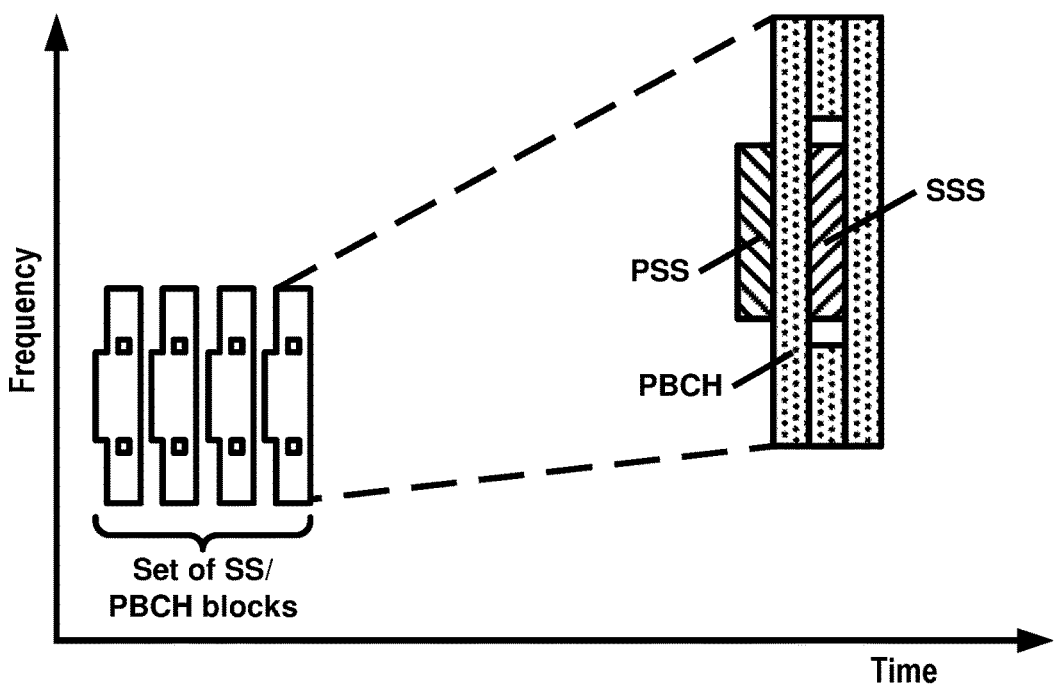
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
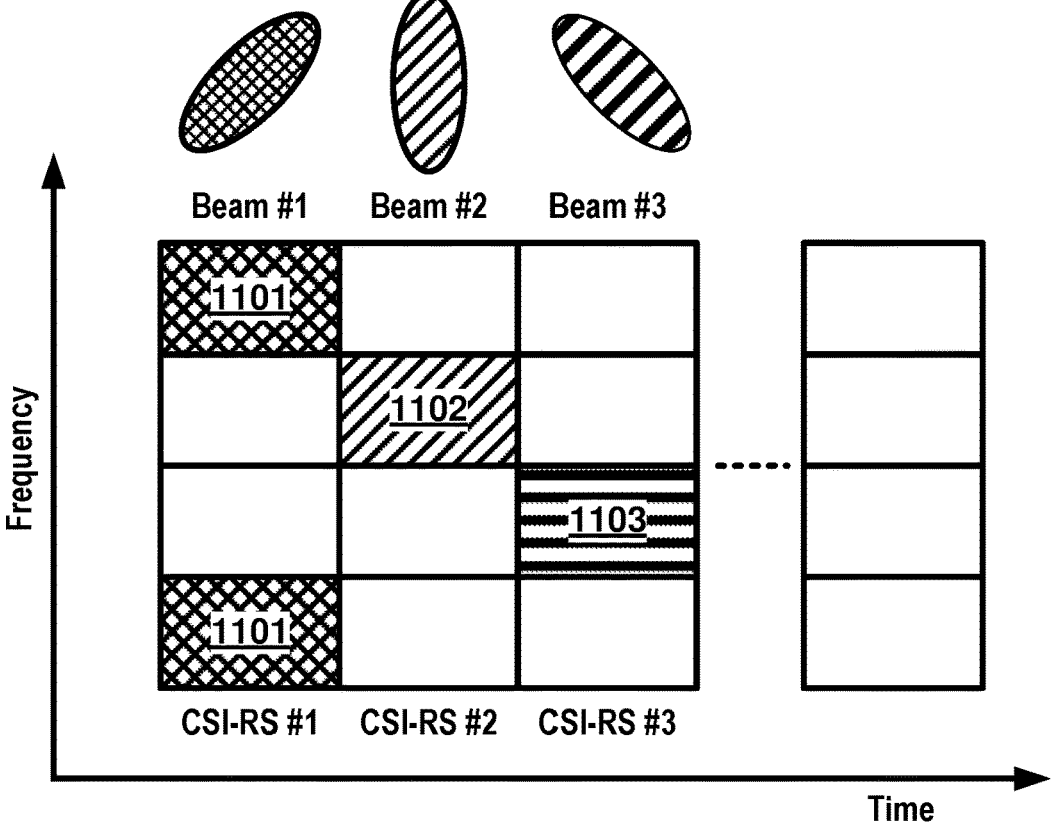
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
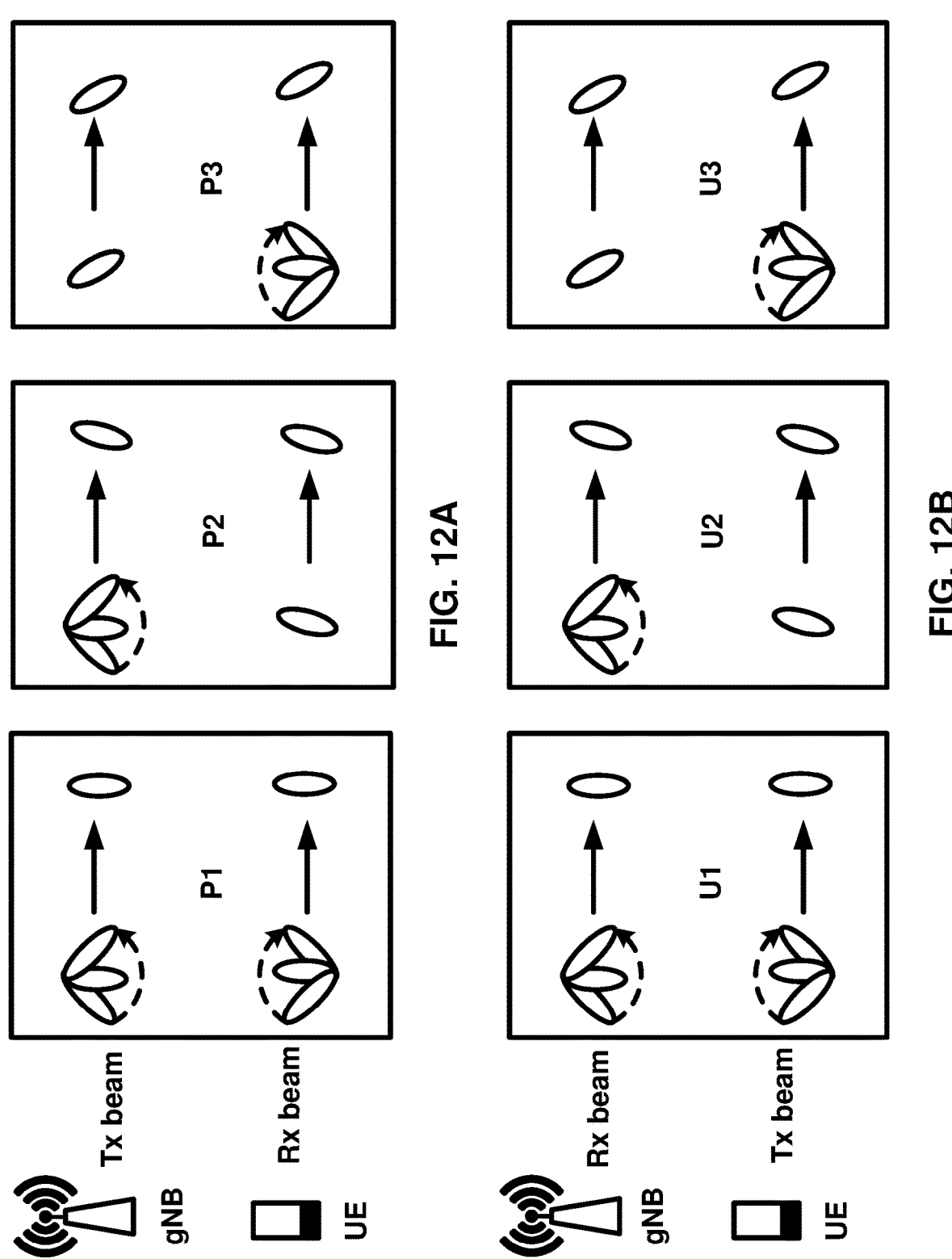
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
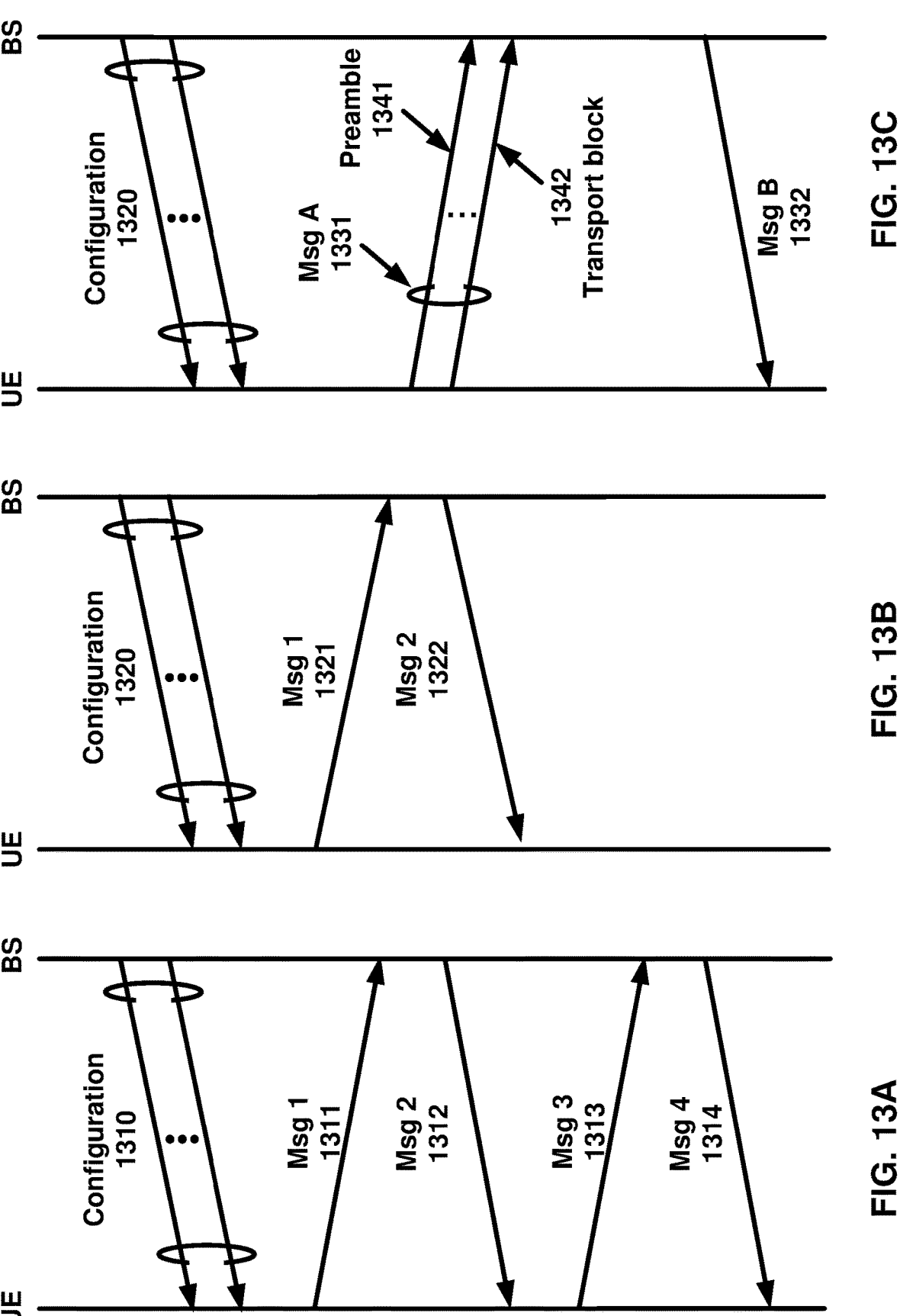
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb- OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI}=1+s\_\text{id}+14 \times t\_\text{id}+14 \times 80 \times f\_\text{id}+14 \times 80 \times 8 \times \text{ul\_carrier\_id}$$

where s_id may be an index of a first OFDM symbol of the PRACH occasion (e.g., $0 \le s\_\text{id} < 14$), t_id may be an index of a first slot of the PRACH occasion in a system frame (e.g., $0 \le t\_\text{id} < 80$), f_id may be an index of the PRACH occasion in the frequency domain (e.g., $0 \le f\_\text{id} < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is success-fully decoded and a MAC PDU comprises the UE conten-tion resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 31313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analo-gous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indi-cated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmis-sion is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illus-trated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two mes-sages: a Msg A 1331 and a Msg B 1332.

Msg A 1331 may be transmitted in an uplink transmission by the UE. Msg A 1331 may comprise one or more trans-missions of a preamble 1341 and/or one or more transmis-sions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access proce-dure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH param-eters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
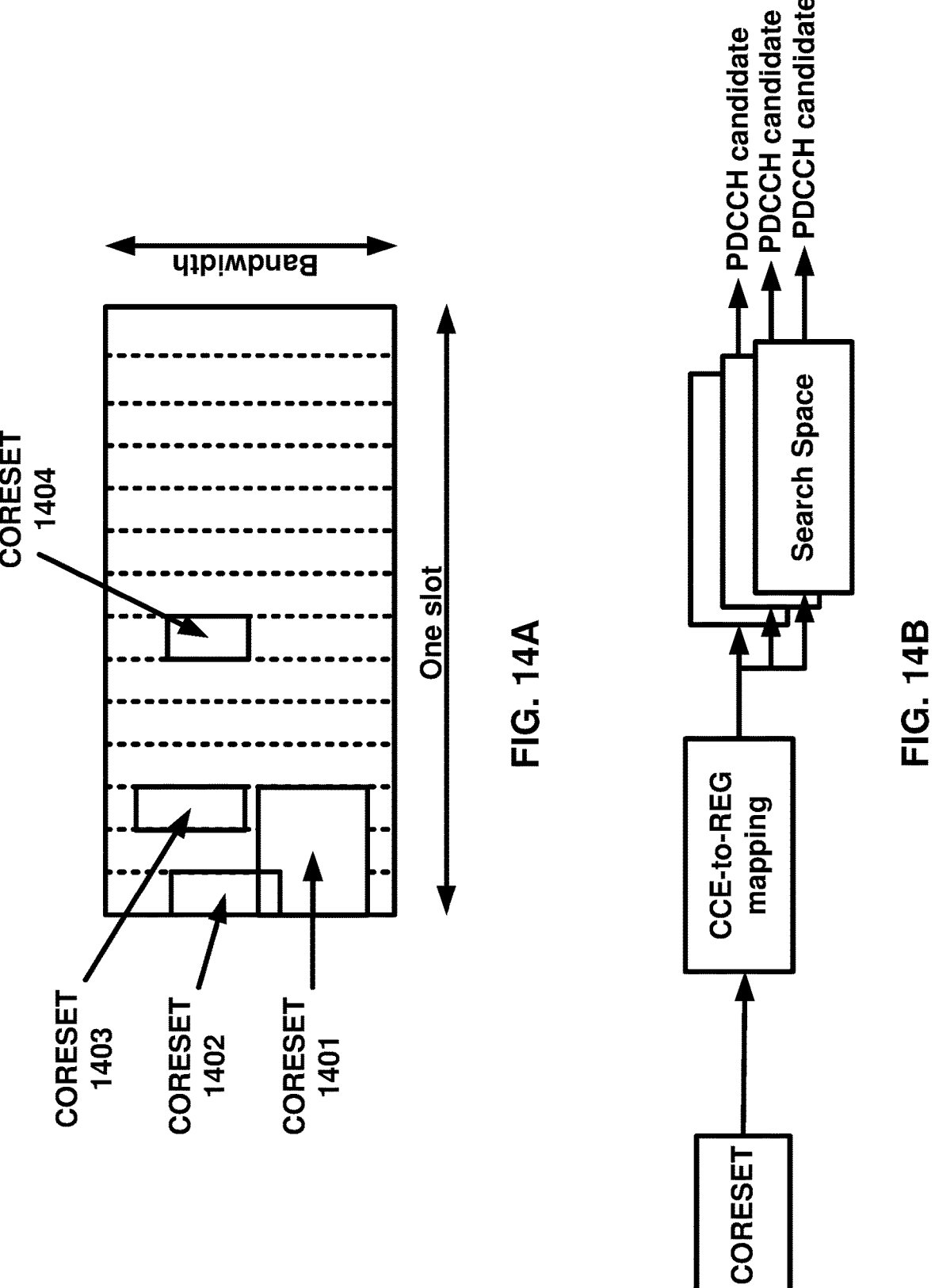
FIG. 14A illustrates an example of CORESET configurations fora bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUCCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
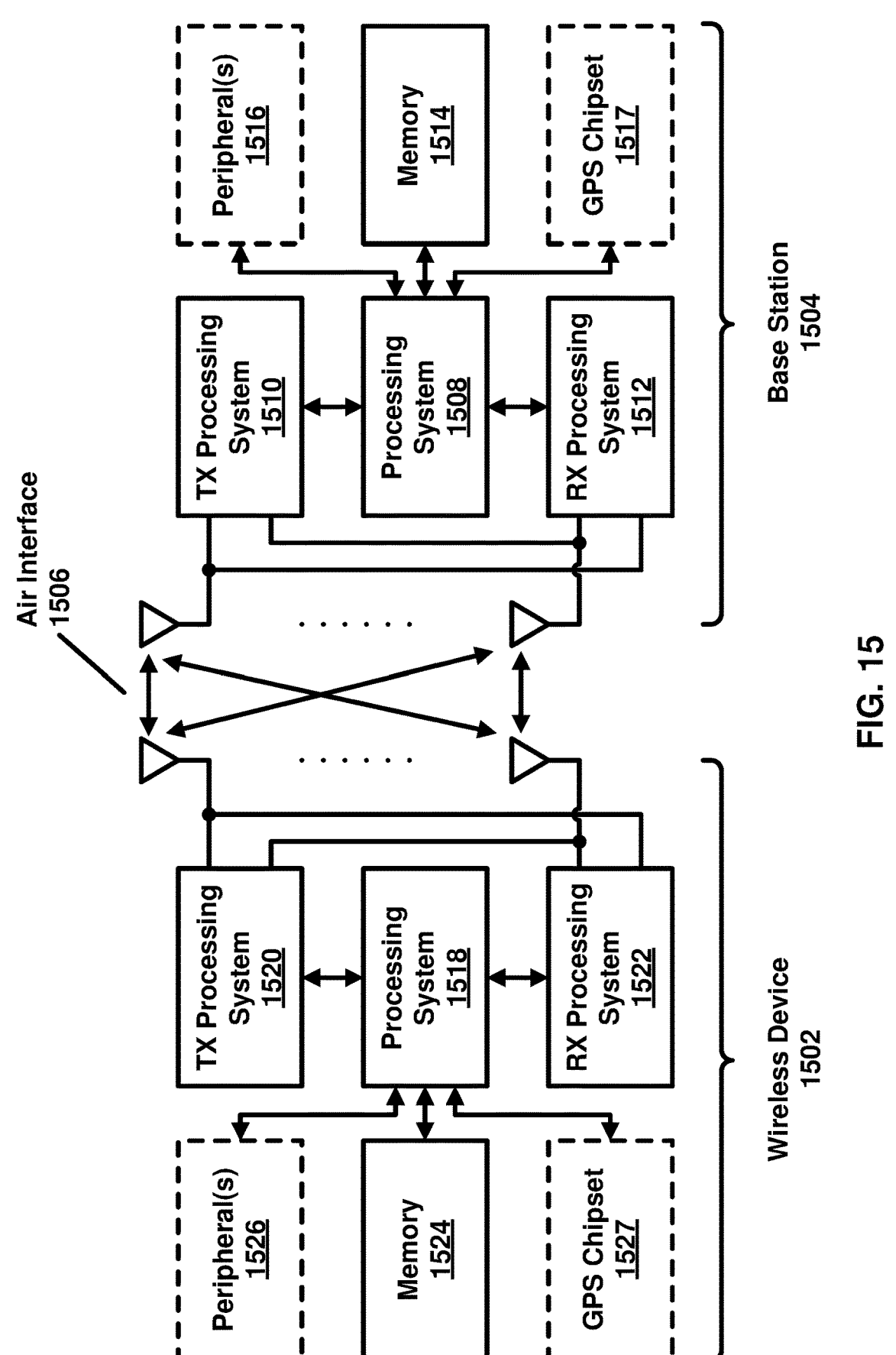
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
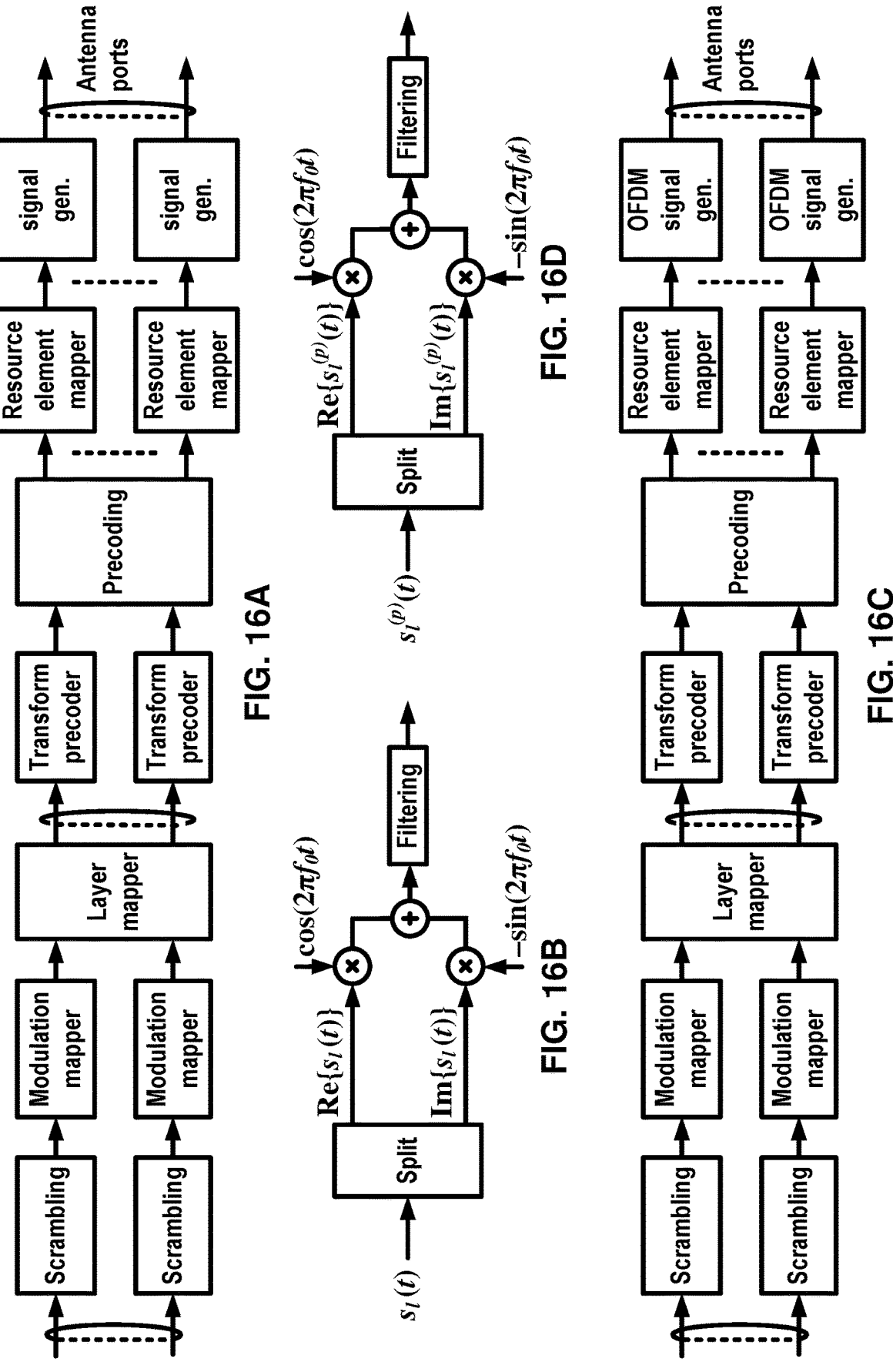
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

Figure 17A:
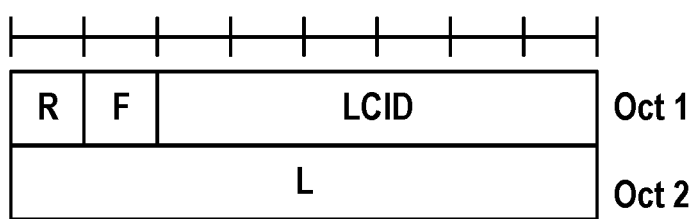
FIG. 17A, FIG. 17B and FIG. 17C show examples of MAC subheaders.
Figure 17B:
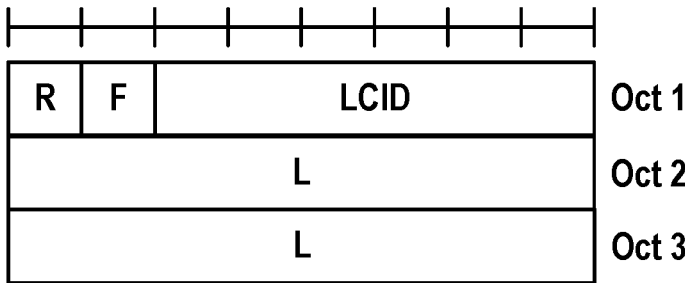
Figure 17C:
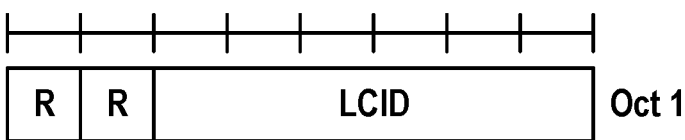

FIG. 17A shows an example of a MAC subheader with an R field, an F field, an LCID field, and an L field. In the example MAC subheader of FIG. 17A, the LCID field may be six bits in length, and the L field may be eight bits in length. FIG. 17B shows example of a MAC subheader with an R field, a F field, an LCID field, and an L field. In the example MAC subheader shown in FIG. 17B, the LCID field may be six bits in length, and the L field may be sixteen bits in length. When a MAC subheader corresponds to a fixed sized MAC CE or padding, the MAC subheader may comprise: an R field with a two-bit length and an LCID field with a multi-bit length. FIG. 17C shows an example of a MAC subheader with an R field and an LCID field. In the example MAC subheader shown in FIG. 17C, the LCID field may be six bits in length, and the R field may be two bits in length.

Figures 18A, 18B:
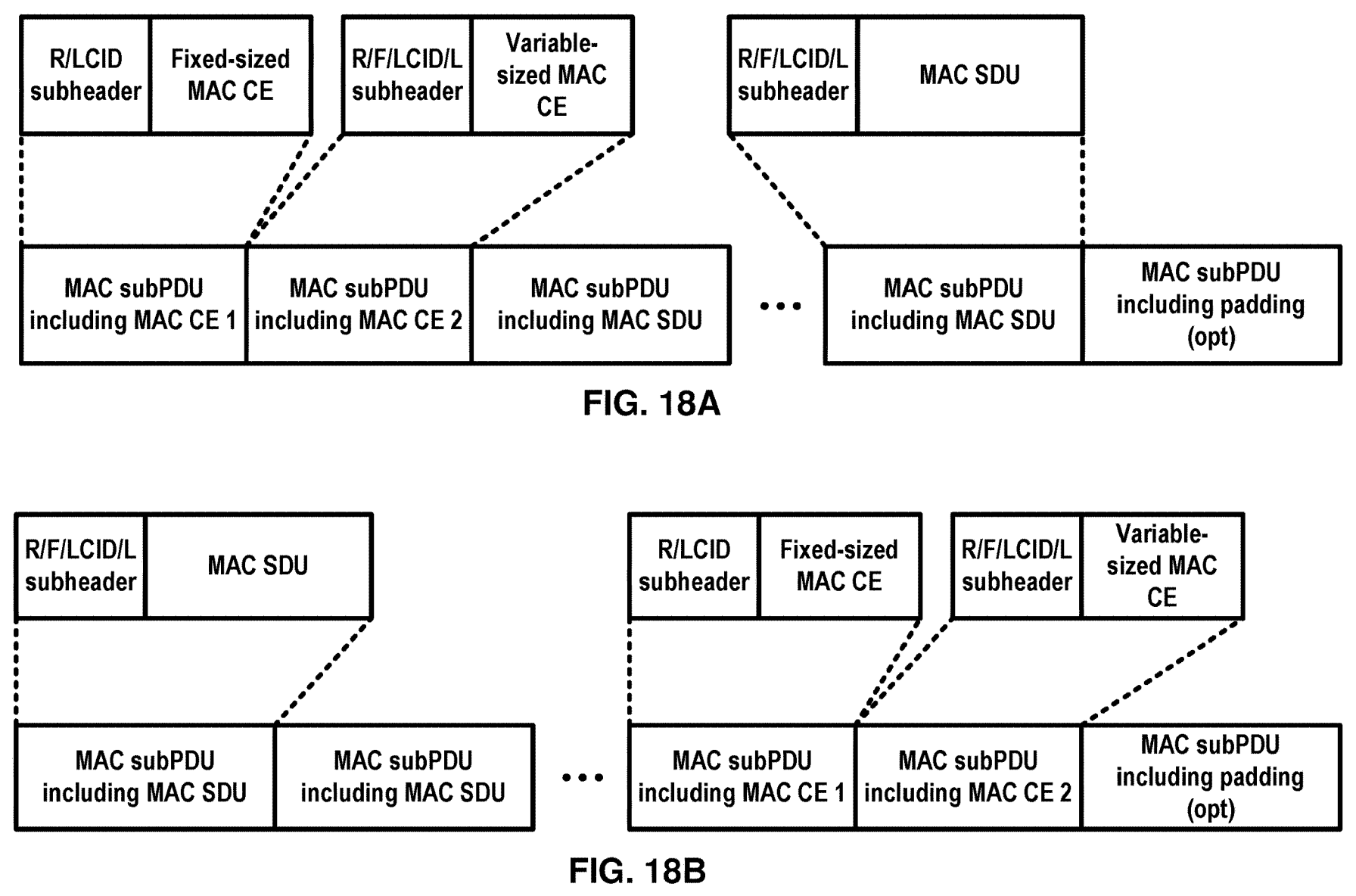

FIG. 18A shows an example of a DL MAC PDU. Multiple MAC CEs, such as MAC CE 1 and 2, may be placed together. A MAC subPDU, comprising a MAC CE, may be placed before: a MAC subPDU comprising a MAC SDU, or a MAC subPDU comprising padding. FIG. 18B shows an example of a UL MAC PDU. Multiple MAC CEs, such as MAC CE 1 and 2, may be placed together. In an example, a MAC subPDU comprising a MAC CE may be placed after all MAC subPDUs comprising a MAC SDU. In addition, the MAC subPDU may be placed before a MAC subPDU comprising padding.

In an example, a MAC entity of a base station may transmit one or more MAC CEs to a MAC entity of a wireless device. FIG. 19 shows an example of multiple LCIDs that may be associated with the one or more MAC CEs. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of a base station to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the base station one or more MAC CEs. FIG. 20 shows an example of the one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a short truncated BSR, and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an embodiment, a wireless device may support CA for contiguous CCs and/or for non-contiguous CCs. CCs may be organized into cells. For example, CCs may be organized into one primary cell (PCell) and one or more secondary cells (SCells). When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a base station may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a base station may activate or deactivate at least one of the one or more SCells. Upon configuration of an SCell, the SCell may be deactivated unless an SCell state associated with the SCell is set to "activated" or "dormant."

A wireless device may activate/deactivate an SCell in response to receiving an SCell Activation/Deactivation MAC CE. In an example, a base station may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/CRI reporting for the SCell; PDCCH monitoring on the SCell; PDCCH monitoring for the SCell; and/or PUCCH transmissions on the SCell. In response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivation- Timer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

When an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell. When at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g., a PCell or an SCell configured with PUCCH, i.e., PUCCH SCell) scheduling the activated SCell indicates an uplink grant or a downlink assignment for the activated SCell, a wireless device may restart the first SCell timer (e.g., sCellDeactivationTimer) associated with the activated SCell. In an example, when an SCell is deactivated, if there is an ongoing random access procedure on the SCell, a wireless device may abort the ongoing random access procedure on the SCell.

In an example, a base station may transmit to a wireless device one or more RRC messages comprising configuration parameters of DRX operation. A MAC entity of the wireless device, based on the configuration parameters of the DRX operation, may control PDCCH monitoring activity of the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When in RRC_CONNECTED, if DRX is configured, for all the activated Serving Cells, the MAC entity may monitor the PDCCH discontinuously using the DRX operation. Otherwise, the MAC entity may monitor the PDCCH continuously.

In an example, the configuration parameters of the DRX operation may comprise: drx-onDurationTimer indicating a duration at the beginning of a DRX cycle, drx-SlotOffset indicating a delay before starting the drx-onDurationTimer, drx-Invalidity Timer indicating a duration after a PDCCH occasion in which a PDCCH indicates a new UL or DL transmission for the MAC entity, drx-RetransmissionTimerDL (per DL HARQ process except for the broadcast process) indicating a maximum duration until a DL retransmission is received, drx-RetransmissionTimerUL (per UL HARQ process) indicating a maximum duration until a grant for UL retransmission is received, drx-LongCycleStartOffset indicating a Long DRX cycle and drx-StartOffset which defines a subframe where a Long and Short DRX cycle starts, drx-ShortCycle for a Short DRX cycle, drx-ShortCycleTimer indicating a duration the wireless device may follow the Short DRX cycle, drx-HARQ-RTT-TimerDL (per DL HARQ process except for the broadcast process) indicating a minimum duration before a DL assignment for HARQ retransmission is expected by the MAC entity, drx-HARQ-RTT-TimerUL (per UL HARQ process) indicating a minimum duration before a UL HARQ retransmission grant is expected by the MAC entity.

In an example, the configuration parameters of the power saving operation may comprise: ps-RNTI indicating a PS-RNTI for DCI format 2_6, dci-Format2-6 indicating a number of search space sets for monitoring PDCCH for detection of DCI format 2_6 on an active DL BWP of the PCell or of the SpCell according to a common search space, size-DCI-2-6 indicating a payload size for DCI format 2_6. The configuration parameters may comprise ps-Position-DCI-2-6 indicating a location in DCI format 2_6 of a Wake-up indication bit wherein the Wake-up indication bit setting to 0, when reported to higher layers, indicates to not start the drx-onDurationTimer for the next long DRX cycle, or the Wake-up indication bit setting to 1, when reported to higher layers, indicates start the drx-onDurationTimer for the next long DRX cycle.

In an example, Serving Cells of a MAC entity may be configured by RRC in two DRX groups with separate DRX parameters. When RRC does not configure a secondary DRX group, there may be only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-Invalidity Timer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycle Timer (optional), drx-HARQ-RTT-TimerDL, and drx-HARQ-RTT-TimerUL.

In an example, when a DRX cycle is configured, a wireless devcie may determine that the Active Time for Serving Cells in a DRX group includes the time while: drx-onDurationTimer or drx-Invalidity Timer configured for the DRX group is running, or drx-RetransmissionTimerDL or drx-RetransmissionTimerUL is running on any Serving Cell in the DRX group, or ra-ContentionResolutionTimer (or msgB-Response Window) is running, or a SR is sent on PUCCH and is pending; a PDCCH indicating a new transmission addressed to the C-RNTI of the MAC entity has not been received after successful reception of a RAR for the Random Access Preamble not selected by the MAC entity among the contention-based Random Access Preamble.

In an example, when DRX operation is configured, if drx-Invalidity Timer for a DRX group expires, a MAC entity of a wireless devcie may start or restart drx-ShortCycleTimer for this DRX group in the first symbol after the expiry of drx-Invalidity Timer and/or use the Short DRX cycle for this DRX group, if the Short DRX cycle is configured. If drx-Invalidity Timer for a DRX group expires, a MAC entity of a wireless devcie may use the Long DRX cycle for this DRX group, if the Short DRX cycle is not configured.

In an example, when DRX operation is configured, if a DRX Command MAC CE is received, a MAC entity of a wireless devcie may start or restart drx-ShortCycleTimer for each DRX group in the first symbol after the end of DRX Command MAC CE reception and/or use the Short DRX cycle for each DRX group, if the Short DRX cycle is configured. If a DRX Command MAC CE is received, a MAC entity of a wireless devcie may use the Long DRX cycle for this DRX group, if the Short DRX cycle is not configured.

In an example, when DRX operation is configured, if drx-ShortCycleTimer for a DRX group expires, a MAC entity of a wireless devcie may use the Long DRX cycle for this DRX group. If a Long DRX Command MAC CE is received, a MAC entity of a wireless devcie may stop drx-ShortCycleTimer for each DRX group and/or use the Long DRX cycle for each DRX group.

In an exmaple, regardless of whether the MAC entity is monitoring PDCCH or not on the Serving Cells in a DRX group, the MAC entity may transmit HARQ feedback, aperiodic CSI on PUSCH, and aperiodic SRS on the Serving Cells in the DRX group when such is expected. The MAC entity needs not to monitor the PDCCH if it is not a complete PDCCH occasion (e.g. the Active Time starts or ends in the middle of a PDCCH occasion).

A base station may configure a wireless device with uplink (UL) bandwidth parts (BWPs) and downlink (DL) BWPs to enable bandwidth adaptation (BA) on a PCell. If carrier aggregation is configured, the base station may further configure the wireless device with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the wireless device to operate on the SCell upon the SCell being activated. In paired spectrum (e.g., FDD), a base station and/or a wireless device may independently switch a DL BWP and an UL BWP. In unpaired spectrum (e.g., TDD), a base station and/or a wireless device may simultaneously switch a DL BWP and an UL BWP.

In an example, a base station and/or a wireless device may switch a BWP between configured BWPs by means of a DCI or a BWP invalidity timer. When the BWP invalidity timer is configured for a serving cell, the base station and/or the wireless device may switch an active BWP to a default BWP in response to an expiry of the BWP invalidity timer associated with the serving cell. The default BWP may be configured by the network. In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve wireless device battery consumption. BWPs other than the one active UL BWP and the one active DL BWP that the wireless device may work on may be deactivated. On deactivated BWPs, the wireless device may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time. In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP invalidity timer (e.g., bwp-Invalidity Timer). In an example, the BWP switching may be controlled by a MAC entity in response to initiating a random access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

In an example, a wireless device may receive, from a base station, at least one RRC message comprising parameters of a cell and one or more BWPs associated with the cell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1), one BWP as the default BWP (e.g., BWP 0). The wireless device may receive a command (e.g., RRC message, MAC CE or DCI) to activate the cell at an $n^{th}$ slot. In case the cell is a PCell, the wireless device may not receive the command activating the cell, for example, the wireless device may activate the PCell once the wireless device receives RRC message comprising configuration parameters of the PCell. The wireless device may start monitoring a PDCCH on BWP 1 in response to activating the cell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a random access procedure associated with this serving cell is not ongoing, a wireless device may perform the BWP switching to a BWP indicated by the PDCCH. In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a wireless device may be provided by a higher layer parameter Default-DL-BWP a default DL BWP among the configured DL BWPs. If a wireless device is not provided a default DL BWP by the higher layer parameter Default-DL-BWP, the default DL BWP is the initial active DL BWP. In an example, a wireless device may be provided by higher layer parameter bwp-Invalidity Timer, a timer value for the primary cell. If configured, the wireless device may increment the timer, if running, every interval of 1 millisecond for frequency range 1 or every 0.5 milliseconds for frequency range 2 if the wireless device may not detect a DCI format 1_1 for paired spectrum operation or if the wireless device may not detect a DCI format 1_1 or DCI format 0_1 for unpaired spectrum operation during the interval.

In an example, a set of PDCCH candidates for a wireless device to monitor is defined in terms of PDCCH search space sets. A search space set comprises a CSS set or a USS set. A wireless device monitors PDCCH candidates in one or more of the following search spaces sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-Config-Common for a DCI format with CRC scrambled by a SI-RNTI on the primary cell of the MCG, a Type1-PDCCH CSS set configured by ra-SearchSpace in PDCCH-Config-Common for a DCI format with CRC scrambled by a RA-RNTI, a MSGB-RNTI, or a TC-RNTI on the primary cell, a Type2-PDCCH CSS set configured by paging-SearchSpace in PDCCH-ConfigCommon for a DCI format with CRC scrambled by a P-RNTI on the primary cell of the MCG, a Type3-PDCCH CSS set configured by SearchSpace in PDCCH-Con fig with searchSpaceType=common for DCI formats with CRC scrambled by INT-RNTI, SFI-RNTI, TPC-PUSCH-RNTI, TPC-PUCCH-RNTI, TPC-SRS-RNTI, CI-RNTI, or PS-RNTI and, only for the primary cell, C-RNTI, MCS-C-RNTI, or CS-RNTI(s), and a USS set configured by SearchSpace in PDCCH-Con fig with searchSpaceType=ue-Specific for DCI formats with CRC scrambled by C-RNTI, MCS-C-RNTI, SP-CSI-RNTI, CS-RNTI(s), SL-RNTI, SL-CS-RNTI, or SL-L-CS-RNTI.

In an example, a wireless device determines a PDCCH monitoring occasion on an active DL BWP based on one or more PDCCH configuration parameters comprising: a PDCCH monitoring periodicity, a PDCCH monitoring off-set, and a PDCCH monitoring pattern within a slot. For a search space set (SS) s, the wireless device determines that a PDCCH monitoring occasion(s) exists in a slot with number $n_{s,f}^{\mu}$ in a frame with number $n_f$ if $(n_f \cdot N_{slot}^{frame,\mu} + n_{s,f} \mu - o_s)$mod $k_s = 0$, where $N_{slot}^{frame,\mu}$ is a number of slots in a frame when numerology $\mu$ is configured, $o_s$ is a slot offset indicated in the PDCCH configuration parameters, and $k_s$ is a PDCCH monitoring periodicity indicated in the PDCCH configuration parameters. The wireless device monitors PDCCH candidates for the search space set for $T_s$ consecu-tive slots, starting from slot $n_{s,f}^{\mu}$, and does not monitor PDCCH candidates for search space set s for the next $k_s - T_s$ consecutive slots. In an example, a USS at CCE aggregation level $L \in \{1, 2, 4, 8, 16\}$ is defined by a set of PDCCH candidates for CCE aggregation level L.

In an example, a wireless device decides, for a search space set s associated with CORESET p, CCE indexes for aggregation level L corresponding to PDCCH candidate $m_{s,n_{CI}}$ of the search space set in slot $$n_{s,f}^{\mu}$$

for an active DL BWP of a serving cell corresponding to carrier indicator field value $n_{CI}$ as $$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \lfloor N_{CCE,p}/L \rfloor \right\} + i,$$

where, $Y_{p,n_{s,f}^{\mu}}=0$ for any CSS; $Y_{p,n_{s,f}^{\mu}}=(A_p \cdot Y_{p,n_{s,f}^{\mu}-1})$mod D fora USS, $Y_{p,-1}=n_{RNTI} \neq 0$, $A_p=39827$ for p mod 3=0, $A_p=39829$ for p mod 3=1, $A_p=39839$ for p mod 3=2, and D=65537; i=0, . . . , L-1; $N_{CCE,p}$ is the number of CCEs, numbered from 0 to $N_{CCE,p}-1$, in CORESET p; $n_{CI}$ is the carrier indicator field value if the wireless device is config-ured with a carrier indicator field by CrossCarrierSchedulingConfig for the serving cell on which PDCCH is moni-tored; otherwise, including for any CSS, $n_{CI}=0$; $m_{s,n_{CI}}= 0, . . . ,$ $$m_{s,n_{CI}} = 0, \dots , M_{s,n_{CI}}^{(L)} - 1,$$

where $$M_{s,n_{CI}}^{(L)}$$

is the number of PDCCH candidates the wireless device is configured to monitor for aggregation level L of a search space set s for a serving cell corresponding to $n_{CI}$; for any CSS, $$M_{s,max}^{(L)} = M_{s,0}^{(L)};$$

for a USS, $$M_{s,max}^{(L)}$$

is the maximum of $$M_{s,n_{CI}}^{(L)}$$

over all configured n u values for a CCE aggregation level L of search space set s; and the RNTI value used for $n_{RNTI}$ is the C-RNTI.

In an example, a wireless device may monitor a set of PDCCH candidates according to configuration parameters of a search space set comprising a plurality of search spaces (SSs). The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common SSs, and/or number of PDCCH candidates in the UE-specific SSs) and possible (or configured) DCI formats. The decod-ing may be referred to as blind decoding. The possible DCI formats may be based on example embodiments of FIG. 21.

FIG. 21 shows examples of DCI formats. DCI formats shown in FIG. 21 may be used by a base station transmit control information to a wireless device or used by the wireless device for PDCCH monitoring. Different DCI for-mats may comprise different DCI fields and/or have different DCI payload sizes. Different DCI formats may have differ-ent signaling purposes. In an example, DCI format 0_0 may be used to schedule PUSCH in one cell. DCI format 0_1 may be used to schedule one or multiple PUSCH in one cell or indicate CG-DFI (configured grant-Downlink Feedback Information) for configured grant PUSCH, etc.

In an example, a wireless device may be configured with configuration parameters of a buffer status report (BSR). The configuration parameters may comprise at least one of: a periodic BSR timer (e.g., periodicBSR-Timer), a BSR retransmission timer (e.g., retxBSR-Timer), a SR delay timer application indicator (e.g., logicalChannelSR-Delay-TimerApplied), a SR delay timer (e.g., logicalChannelSR-DelayTimer), a SR mask parameter (e.g., logicalChannelSR-Mask), a logical channel group (LCG) group indication (e.g., logicalChannelGroup), etc.

In an example, a wireless device may trigger a first BSR in response to a MAC entity of the wireless device having new UL data available for a logical channel (LCH) which belongs to an LCG, either when the new UL data belongs to a LCH with higher priority than the priority of any LCH containing available UL data which belong to any LCG, or when none of the LCHs which belong to an LCG contains any available UL data. The first BSR may be referred to as a regular BSR (or a first type of BSR) in this specification.

In an example, a wireless device may trigger a second BSR in response to UL resources being allocated and number of padding bits being equal to or larger than the size of a BSR MAC CE plus its subheader. The second BSR may be referred to as a padding BSR (or a second type of BSR) in this specification. In an example, BSR MAC CE may comprise a Buffer Size field identifying the total amount of data available according to the data volume calculation procedure.

In an example, a wireless device may trigger a third BSR in response to a timer (e.g., retxBSR-Timer) expiring, and at least one of the LCHs which belong to an LCG containing UL data. The third BSR may be the same type of BSR as the first BSR. The third BSR may be referred to as a regular BSR in this specification.

In an example, a wireless device may trigger a fourth BSR in response to a timer (e.g., periodicBSR-Timer) expiring. The fourth BSR may be referred to as a periodic BSR (or a third type of BSR) in this specification.

In an example, for a BSR (e.g., a regular BSR), a wireless device may start or restart a SR delay timer (e.g., logical-ChannelSR-DelayTimer) in response to the BSR being triggered for a first LCH. The first LCH may be associated with a logicalChannelSR-DelayTimerApplied being set to value true. The wireless device may stop the SR delay timer, if running, in response to the BSR being triggered for a second LCH for which a logicalChannelSR-DelayTimerApplied is not configured or is set to value false if configured.

In an example, for a BSR (e.g., a regular BSR or a periodic BSR), a wireless device may report Long BSR for all LCGs which have data available for transmission in response to more than one LCG having data available for transmission when the MAC PDU containing the BSR is to be built, otherwise the wireless device may report Short BSR.

In an example, for a BSR (e.g., a padding BSR), a wireless device may report Short Truncated BSR of the LCG with the highest priority logical channel with data available for transmission if: the number of padding bits is equal to or larger than the size of the Short BSR plus its subheader but smaller than the size of the Long BSR plus its subheader, more than one LCG has data available for transmission when the BSR is to be built and the number of padding bits is equal to the size of the Short BSR plus its subheader.

In an example, for a BSR (e.g., a padding BSR), a wireless device may report Long Truncated BSR of the LCG(s) with the logical channels having data available for transmission following a decreasing order of the highest priority logical channel (with or without data available for transmission) in each of these LCG(s), and in case of equal priority, in increasing order of LCGID if: the number of padding bits is equal to or larger than the size of the Short BSR plus its subheader but smaller than the size of the Long BSR plus its subheader, more than one LCG has data available for transmission when the BSR is to be built and the number of padding bits is greater than the size of the Short BSR plus its subheader.

In an example, for a BSR (e.g., a padding BSR), a wireless device may report Short BSR if: the number of padding bits is equal to or larger than the size of the Short BSR plus its subheader but smaller than the size of the Long BSR plus its subheader, at most one LCG has data available for transmission when the BSR is to be built.

In an example, for a BSR (e.g., a padding BSR), a wireless device may report Long BSR for all LCGs which have data available for transmission if the number of padding bits is equal to or larger than the size of the Long BSR plus its subheader.

In an example, for a BSR triggered by a BSR retransmission timer (e.g., retxBSR-Timer) expiry, a MAC entity of a wireless device may determine that a LCH that triggered the BSR is the highest priority LCH that has data available for transmission at the time the BSR is triggered.

In an example, a wireless device may instruct a Multiplexing and Assembly procedure to generate BSR MAC CE(s), (re-)start a periodic BSR timer (e.g., periodicBSR-Timer) except when all generated BSRs are long or short Truncated BSRs and/or start or restart a BSR retransmission timer (e.g., retxBSR-Timer) in response to: at least one BSR having been triggered and not been cancelled, and UL-SCH resources being available for a new transmission and the UL-SCH resources accommodating the BSR MAC CE plus its subheader as a result of logical channel prioritization.

In an example, a wireless device may trigger a SR in response to: at least one BSR having been triggered and not been cancelled, a regular BSR of the at least one BSR having been triggered and a logicalChannelSR-DelayTimer associated with a LCH for the regular BSR not being running, and no UL-SCH resource being available for a new transmission (or the MAC entity being configured with configured uplink grant(s) and the Regular BSR being triggered for a LCH for which logicalChannelSR-Mask is set to false, or the UL-SCH resources available for a new transmission not meeting the LCP mapping restrictions configured for the LCH that triggered the BSR).

In an example, a wireless device may determine that UL-SCH resources are available if a MAC entity of the wireless device has an active configuration for either type (type 0 or type 1) of configured uplink grants, or if the MAC entity has received a dynamic uplink grant, or if both of these conditions are met. In an example, the wireless device may determine that one or more UL-SCH resources are available if the MAC entity has been configured with, receives, or determines an uplink grant. If the MAC entity has determined at a given point in time that UL-SCH resources are available, this need not imply that UL-SCH resources are available for use at that point in time.

In an example, a MAC PDU may contain at most one BSR MAC CE, even when multiple events have triggered a BSR. The Regular BSR and the Periodic BSR shall have precedence over the padding BSR.

In an example, a MAC entity of a wireless device may restart retxBSR-Timer upon reception of a grant for transmission of new data on any UL-SCH.

In an example, a wireless device may cancel all triggered BSRs when the UL grant(s) can accommodate all pending data available for transmission but is not sufficient to additionally accommodate the BSR MAC CE plus its subheader.

In an example, a wireless device may cancel all BSRs triggered prior to MAC PDU assembly when a MAC PDU is transmitted and this PDU includes a Long or Short BSR MAC CE which contains buffer status up to (and including) the last event that triggered a BSR prior to the MAC PDU assembly.

In an example, a MAC PDU assembly can happen at any point in time between uplink grant reception and actual transmission of the corresponding MAC PDU. BSR and SR can be triggered after the assembly of a MAC PDU which contains a BSR MAC CE, but before the transmission of this MAC PDU. In addition, BSR and SR can be triggered during MAC PDU assembly.

In an example, a base station may transmit to a wireless device RRC messages comprising configuration parameters of a plurality of SR configurations. A first SR configuration in the plurality of SR configurations may correspond to one or more first LCHs of the plurality of LCHs. In an example, the wireless device may trigger a BSR in response to data becoming available for the LCH. The wireless device may determine that a SR configuration of a LCH that triggers a BSR is a corresponding SR configuration for a triggered SR.

In an example, a wireless device may trigger a SR for requesting UL-SCH resource when the wireless device has new transmission (e.g., SR for BSR). A gNB may transmit to a wireless device at least one message comprising parameters indicating zero, one or more SR configurations. A SR configuration may comprise a set of PUCCH resources for SR on one or more BWPs, and/or one or more cells. On a BWP, at most one PUCCH resource for SR may be configured. Each SR configuration may correspond to one or more logical channels. Each logical channel may be mapped to zero or one SR configuration configured by the at least one message.

In an example, configuration parameters of a SR configuration may comprise at least one of: a SR prohibit timer (e.g., sr_ProhibitTimer); a maximum number of SR transmission (e.g., sr_TransMax); a parameter indicating a periodicity and offset of SR transmission; and/or a PUCCH resource. In an example, the SR prohibit timer may be a duration during which the wireless device may be not allowed to transmit the SR. In an example, the wireless device may stay active while sr_ProhibitTimer is running and may monitor PDCCH for detecting DCI indicating uplink scheduling grant(s). In an example, the maximum number of SR transmission may be a transmission number for which the wireless device may be allowed to transmit the SR at most.

In an example, when an SR is triggered, a wireless device may consider the SR pending until it is cancelled. In an example, when one or more UL grants accommodate all pending data available for transmission, all pending SR(s) may be cancelled.

In an example, a wireless device may cancel all pending SR(s) for BSR triggered before the MAC PDU assembly and/or stop each respective sr-ProhibitTimer in response to the MAC PDU being transmitted and this PDU comprising a Long or Short BSR MAC CE which contains buffer status up to (and including) the last event that triggered a BSR prior to the MAC PDU assembly. In an example, the wireless device may cancel all pending SR(s) for BSR triggered according to the BSR procedure and stop each respective sr-Prohibit Timer when the UL grant(s) can accommodate all pending data available for transmission.

In an example, a base station may transmit to a wireless device one or more RRC messages comprising configuration parameters of one or more PUCCH resources. A PUCCH resource may be identified by at least: frequency location (e.g., starting PRB); a PUCCH format associated with initial cyclic shift of a base sequence and time domain location (e.g., starting symbol index). A wireless device may transmit a PUCCH in a PUCCH resource for a corresponding SR configuration only when the wireless device transmits a positive SR. For a positive SR transmission using PUCCH format 0, a wireless device may transmit a PUCCH by setting the cyclic shift to a first value (e.g., 0). For a positive SR transmission using PUCCH format 1, a wireless device may transmit a PUCCH by setting a first bit, before BPSK modulated on a sequence, to a first value (e.g., 0). In an example, a wireless device may determine one or more PUCCH resources on an active BWP as valid PUCCH resources at a time of SR transmission occasion. In an example, a wireless device may transmit a PUCCH in a PUCCH resource associated with a SR configuration when the wireless device transmits a positive SR. In an example, a wireless device may transmit the PUCCH using PUCCH format 0, or PUCCH format 1, according to the PUCCH configuration.

In an example, a SR may be multiplexed with HARQ-ACK or CSI on a PUCCH format. When a positive SR multiplexed with HARQ-ACK, a wireless device may decide a cyclic shift of the base sequence based on the initial cyclic shift and a first cyclic shift based on one or more values of one or more HARQ-ACK bits. When a negative SR multiplexed with HARQ-ACK, a wireless device may decide a cyclic shift of the base sequence based on the initial cyclic shift and a second cyclic shift based on one or more value of the one or more HARQ-ACK bits. The first cyclic shift is different from the second cyclic shift.

In an example, a wireless device may maintain a SR transmission counter (e.g., SR_COUNTER) associated with a SR configuration. In an example, if an SR of a SR configuration is triggered, and there are no other SRs pending corresponding to the same SR configuration, a wireless device may set the SR_COUNTER of the SR configuration to a first value (e.g., 0). In an example, the SR_COUNTER may be incremented by one if a transmission of SR is unsuccessful, and the random access procedure may start in response to the counter reaching the first number (e.g., sr_TransMax). In an example, the wireless device may transmit a random access preamble in response to starting the random access procedure. In an example, the wireless device may carry out the following instructions the random access procedure is started is response to unsuccessful transmission of a SR: the wireless device may notify RRC to release PUCCH for all Serving Cells; the wireless device may notify RRC to release SRS for all Serving Cells; the wireless device may clear any configured downlink assignments and uplink grants; and the wireless device may clear any PUSCH resources for semi-persistent CSI reporting.

A random access channel (RACH) may be a wireless channel (medium) being shared by multiple wireless devices. For example, RACH may be used by the wireless devices to (randomly) access the network for communications. One or more events may trigger/initiate a random access (e.g., 2-step RA) procedure. For example, one or more events may be at least one of: initial access from RRC_IDLE, RRC connection re-establishment procedure, handover, DL or UL data arrival during RRC_CONNECTED 602 when UL synchronization status is non-synchronized, transition from RRC INACTIVE 604, beam failure recovery procedure, request for other system information, and/or when the wireless device requires or requests an UL grant for a transmission of delay-sensitive data and there are no physical-layer uplink control channel resources available to transmit a scheduling request.

In an example, a PDCCH order, an MAC entity of the wireless device, and/or a beam failure indication may initiate a random access procedure.

In an example, a wireless device may be in one or more conditions based on which one or more random access procedure need to be initiated. For example, based on determining that one random access procedure ongoing at any point in time in a MAC entity, a wireless device may continue with the ongoing procedure (e.g., not interrupting the ongoing random access procedure by initiating a new random access procedure) or start with the new random access procedure (e.g., for SI request). For example, in response to receiving, by an MAC entity of a wireless device, a request for a new random access procedure while another random access procedure being already ongoing in the MAC entity, the MAC entity may abort/cancel the ongoing random access procedure and initiate/perform/trigger the new random access procedure. In an example, in response to receiving, by an MAC entity of a wireless device, a request for a random access procedure while another random access procedure being already ongoing in the MAC entity, the MAC entity may continue with the ongoing random access procedure and cancel the new random access procedure.

A wireless device may receive, from a base station, one or more RRC messages comprising one or more random access parameters. For example, the one or more RRC messages comprise a common (or generic) random access configuration message (e.g., RACH-ConfigCommon and/or RACH-ConfigGeneric) indicating at least one of: a total number of random access preambles (e.g., totalNumberOfRA-Preambles), one or more PRACH configuration index (e.g., prach-ConfigurationIndex), a number of PRACH occasions that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (e.g., preambleReceivedTargetPower), a maximum number of random access preamble transmission that may be performed (e.g., preambleTransMax), a window length for a random access response (e.g., ra-ResponseWindow and/or msgB-ResponseWindow), a number of SSBs per random access channel (RACH) occasion and a number of contention-based preambles per SSB (e.g., ssb-perRACH-OccasionAndCB-PreamblesPerSSB). For example, the total number of random access preambles may be a multiple of the number of SSBs per RACH occasion. For example, the window length for RAR may be in number of slots. For example, a dedicated random access configuration message (e.g., RACH-ConfigDedicated) may comprise one or more RACH occasions for contention-free random access (e.g., occasions), and one or more PRACH mask index for random access resource selection (e.g., ra-ssb-OccasionMaskIndex). In an example, a wireless device may initiate a random access procedure at least based on parameter(s) configured in at least one of RACH-ConfigCommon, RACH-ConfigGeneric, and RACH-ConfigDedicated. For example, a wireless device may initiate/conduct a random access procedure, for example, after or in response to receiving a PDCCH order from a base station, by the MAC entity of the wireless device and/or by RRC of the wireless device.

In an example, a wireless device may employ (or use or maintain) one or more parameters (or variables) for a random access procedure. For example, the one or more parameters (or variables) comprise at least one of: PREAMBLE_INDEX; PREAMBLE_TRANSMISSION COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, an MAC entity of the wireless device may instruct the physical layer to transmit a Random Access Preamble (RAP) using the selected PRACH, corresponding RA-RNTI (e.g., if available), PREAMBLE_INDEX and PREAMBLE_RECEIVED_TARGET_POWER. For example, the wireless device may determine an RA-RNTI associated with the PRACH occasion in which the RAP being transmitted. In an example, the RA-RNTI may be determined in terms of index of the first OFDM symbol of the specified PRACH, an index of the first slot of the specified PRACH in a system frame, an index of the specified PRACH in the frequency domain, and/or uplink carrier indicator.

A wireless device may perform a random access resource selection for selecting one or more preambles and one or more PRACH occasion (or resources comprising time, frequency, and/or code). In an example, there may be one or more cases that a random access procedure may be initiated for beam failure recovery; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select one or more SSBs with corresponding one or more SS-RSRP values above rsrp-ThresholdSSB amongst the SSBs in candidateBeamRSList or one or more CSI-RSs with corresponding one or more CSI-RSRP values above rsrp-ThresholdCSI-RS amongst the CSI-RSs in candidateBeamRSList.

In an example, a wireless device may receive, via PDCCH or RRC, a ra-PreambleIndex which may not be a particular preamble index (that may be predefined or configured, e.g., 0b000000). In this case, the wireless device may set the PREAMBLE_INDEX to the signaled ra-PreambleIndex.

In an example, when initiating a random access procedure, a wireless device may determine the next available PRACH occasion. For example, an MAC entity of the wireless device may select a PRACH occasion (e.g., randomly with equal probability) amongst the PRACH occasions occurring simultaneously but on different subcarriers. The MAC entity may determine the next available PRACH occasion based on (e.g., by taking into account) the possible occurrence of measurement gaps.

In an example, a wireless device may perform a RAP transmission based on a selected PREABLE INDEX and PRACH occasion. For example, based on the notification of suspending power ramping counter not being received from lower layers (e.g., physical layer); and/or based on an SSB and/or a CSI-RS selected not being changed (e.g., same as the previous Random Access Preamble transmission), a wireless device may increment PREAMBLE_POWER_RAMPING_COUNTER, e.g., by one or to the next value (e.g., counter step size may be predefined and/or semi-statically configured). In an example, the wireless device may select a value of DELTA_PREAMBLE that may be predefined and/or semi-statically configured by a base station.

For a 2-step RA procedure, a wireless device may receive, from a base station, one or more RRC messages comprising 2-step RACH configuration parameters. The one or more RRC messages may broadcast (e.g., via system information broadcast messages), multicast (e.g., via system information broadcast messages), and/or unicast (e.g., via dedicated RRC messages and/or lower layer control signal(s) such as PDCCH) to a wireless device. The one or more RRC messages may be wireless device-specific messages, e.g., a dedicated RRC message transmitted to a wireless device with RRC INACTIVE 604 or RRC CONNECTED 602. The one or more RRC messages may comprise parameters required for transmitting an RA message.

For example, the parameter may indicate at least one of following: PRACH resource allocation, preamble format, SSB information (e.g., total number of SSBs, downlink resource allocation of SSB transmission, transmission power of SSB transmission, uplink radio resources (time-frequency radio resource, DMRS, MCS, etc.) for one or more transport block transmissions, and/or association between PRACH resource allocation and the uplink radio resources (or associations between the uplink radio resources and downlink reference signals), PUSCH resource(s) (in terms of time, frequency, code/sequence/signature) for one or more TB transmissions, association between each of PRACH occasion(s) and each of PUSCH resource(s), and/or power control parameters of one or more TB transmissions. The power control parameters of one or more TB transmissions may comprise at least one of following: power parameter value(s) for cell and/or UE specific power adjustments used for determining a received target power, a scaling factor (e.g., inter-cell interference control parameter) of a pathloss measurement, reference signal power used for determining a pathloss measurement, a power offset with respect to a power of preamble transmission, and/or one or more power offsets. For example, the wireless device measures received signal power(s) (e.g., RSRP) and/or quality (e.g., RSRQ) of one or more SSBs that a base station transmits. The wireless device may select at least one SSB based on the measurement and determine at least one PRACH occasion associated with the at least one SSB and/or at least one PUSCH resource associated with the at least one PRACH occasion and/or associated with the at least one SSB (this association may be configured explicitly by the message(s) and/or implicitly through a first association between the at least one SSB and the at least one PRACH occasion and a second association between the at least one PRACH occasion and the at least one PUSCH resource). The wireless device may transmit the at least one RAP via the at least one PRACH occasion and/or transmit at least one TB via the at least one PUSCH resource.

In an example, there may be one or more ways for a wireless device to generate one or more candidate preambles that may be used for a 2-step RA procedure. For example, a wireless device may receive, from a base station, a control message (e.g., SIB message, RRC message dedicated to a wireless device, and/or a PDCCH order for a secondary cell addition) indicating one or more preamble indices of one or more RAPs to be used for a 2-step RA procedure of the wireless device. The one or more candidate preambles may be grouped into one or more groups. For example, each group may be associated with a specific amount of data for transmission. For example, the amount of data may indicate a size of one or more transport blocks a wireless device being required to transmit and/or may indicate a size of uplink data being remained in the buffer. Each of the one or more groups may be associated with a range of data size. In an example, a first group of the one or more groups may comprise RAPs indicating small data transmission(s) of transport block(s) during the 2-step RA procedure, and a second group may comprise RAPs indicating larger data transmission(s) of transport block(s) during the 2-step RA procedure, and so on. A base station may transmit an RRC message comprising one or more thresholds based on which a wireless device may determine from which group of RAPs the wireless device may select an RAP. For example, the one or more thresholds may indicate one or more data sizes determining the one or more groups. Based on a size of uplink data that a wireless device may potentially transmit; the wireless device may compare the size of uplink data with the one or more data sizes and determine a particular group from the one or more groups. By transmitting an RAP selected from the specific group, the wireless device may indicate, to a base station, a (e.g., estimated) size of uplink data that the wireless device may transmit to the base station. The indication of the size of uplink data may be used by a base station to determine a proper size of uplink radio resources for (re)transmission of the uplink data.

For a 2-step RA procedure, a resource allocation for a payload transmission in a PUSCH occasion may be predefined and/or configured. For example, a size of a resource in a PUSCH occasion may be predefined and/or configured. The resource may be continuous or non-continuous (e.g., a base station may flexibly configure the resource). The resource may be partitioned into a plurality of resource groups. For example, a size of each of resource groups within a PUSCH occasion may be the same or different (e.g., depending on the configuration of the 2-step RA procedure). Each resource group index may be mapped to one or more preamble index.

In an example, in a 2-step RA procedure, a wireless device may transmit an RAP via a PRACH occasion indicated by a 2-step RACH configuration. The wireless device may transmit one or more TBs via an UL radio resource (e.g., PUSCH) indicated by a 2-step RACH configuration. A first transmission of the RAP and a second transmission of the one or more TBs may be scheduled in a TDM (time-division multiplexing) manner, a FDM (frequency-division multiplexing) manner, a CDM (code-division multiplexing) manner, and/or any combination thereof. The 2-step RACH configuration may indicate one or more UL radio resources associated with one or more RAPs (or RAP groups) and/or the PRACH occasion. For example, each of one or more downlink reference signals (SSBs or CSI-RSs) may be associated with one or more PRACH occasions and/or one or more RAPs. A wireless device may determine at least one PRACH occasion among the one or more PRACH occasions and/or at least one RAP among the one or more RAPs. For example, a wireless device may measure RSRP and/or RSRQ of the one or more downlink reference signals and select a first downlink reference signal from the one or more downlink reference signals. The wireless device may select at least one RAP and/or at least one PRACH occasion, that are associated with the first downlink reference signal, as a radio resource for Preamble 1341. Based on a selection of the at least one RAP and/or the at least one PRACH occasion, the wireless device may determine at least one UL radio resource (e.g., PUSCH occasions) where the wireless device may transmit one or more TBs as a part of a 2-step RACH procedure. In an example, the wireless device may determine the at least one UL radio resource (e.g., PUSCH occasions) based on the first downlink reference signal, e.g., in response to determining that, by the wireless device, a control message and/or a control signal, received by the wireless device from the base station, may indicate associations between one or more UL radio resources (e.g., PUSCH occasions) and the one or more downlink reference signals.

In an example, a wireless device may receive, from a base station, one or more 2-step RA configurations for Transport block (e.g., payload) transmission. The one or more 2-step RA configuration may indicate one or more combinations of payload size, MCS, and/or resource size. The number of the one or more 2-step RA configurations and one or more parameter values (e.g., payload size, MCS, and/or resource size) for each of the one or more 2-step RA configurations may depend on the content of Msg A and/or an RRC state of a wireless device. Based on configured 2-step RA configuration parameters, a wireless device may transmit a RA message. In some aspects, the RA message may include some or all of the contents of message 1 (Msg 1 1311) and message 3 (Msg 3 1313) of a four-step RA procedure (e.g., FIG. 13A). The RA message may be referred to as message A, Msg A 1331, a MSGA, a first message, an initial message, and/or the like in a two-step RA procedure. Furthermore, the Msg A preamble may be referred to as a message A preamble, a msgA preamble, a MSGA preamble, a preamble, a physical RA channel (PRACH) preamble, and/or the like.

In some aspects, the RA message payload may be referred to as a message A payload, a msgA payload, a payload, and/or the like. In an example the Msg A may comprise at least one preamble via a PRACH occasion and/or a Transport block (e.g., payload) via a PUSCH occasion, to a base station. The Msg A may comprise an identifier for contention resolution. For example, a wireless device may construct a MAC header as the Msg A payload with a plurality of bits (e.g., 56 and/or 72 bits). For example, Msg A may comprise BSR MAC CE, PHR MAC CE, RRC messages, connection request, etc.

In an example, a PUSCH occasion for 2-step RA procedure may be an uplink radio resource for a transport block (e.g., payload) transmission associated with a PRACH preamble in Msg A of 2-step RA procedure. One or more examples of a resource allocation of a PUSCH occasion may be (but not limited to) that PUSCH occasions are separately configured from PRACH occasions. For example, a PUSCH occasion may be determined based on a periodic resource indicated by a configured grant (e.g., configured grant Type 1/Type 2 and/or SPS). A wireless device may determine the PUSCH occasion further based on an association between the PRACH and PUSCH for Msg A transmission.

In an example, a base station may configure a wireless device with one or more parameters indicating a starting point of time and/re frequency for a PUSCH occasion, a number of resource groups, and a size of each of the resource groups. An index of each of the resource groups may be mapped to a preamble index (e.g., a particular preamble) and/or a particular PRACH occasion, for example. The wireless device may determine a location of each of resource groups at least based on a preamble index (e.g., in case RO and PUSCH occasion are 1-to-1 mapping) and/or based on an RO index and a preamble index (e.g., in the case of multiple ROs are associated with one PUSCH occasion).

In an example, a number of resource groups and/or the detailed mapping among preamble(s), resource group(s), and DMRS port(s) may be pre-defined and/or semi-statically configured (and/or indicated by DCI dynamically), e.g., to avoid a blind detection from a base station when multiple preambles are mapped to the same resource group.

There may be a case that a wireless device may receive, from a base station, configuration parameters indicating different (or independent) PRACH occasions between 2-step RA and four-step RA. The different (or independent) PRACH occasions may reduce receiver uncertainty and/or reduce the access delay. The base station may configure the wireless device with different (or independent) PRACH resources such that the base station being able to identify, based on PRACH occasion that the base station receives the received preamble, whether a received preamble being transmitted by a wireless device for 2-step RA or four-step RA. In an example, a base station may flexibility determine whether to configure shared PRACH occasions or separate PRACH occasions between 2-step RA and four-step RA procedures. A wireless device may receive, from the base station, RRC message(s) and/or DCI indicating an explicit or implicit indication of whether to configure shared PRACH occasions or separate PRACH occasions between 2-step RA and four-step RA procedures. There may be a case that a base station configures one or more PRACH occasions shared between 2-step RA and four-step RA and preambles partitioned for the 2-step RA and the four-step RA.

In an example, a base station may employ an RAP receive from a wireless device to adjust UL transmission timing of one or more TBs for the wireless device in a cell and/or to aid in UL channel estimation for one or more TBs. A portion of the UL transmission for one or more TBs in a 2-step RACH procedure may comprise, e.g., a wireless device ID, a C-RNTI, a service request such as buffer state reporting (e.g., a buffer status report) (BSR), one or more user data packets, and/or other information. A wireless device, e.g., in an RRC CONNECTED 602 state, may use a C-RNTI as an identifier of the wireless device (e.g., a wireless device ID). A wireless device, e.g., in an RRC INACTIVE 604 state, may use a C-RNTI (if available), a resume ID, or a short MAC-ID as an identifier of the wireless device. A wireless device, e.g., in an RRC IDLE 606 state, may use a C-RNTI (if available), a resume ID, a short MAC-ID, an IMSI (International Mobile Subscriber Identifier), a T-IMSI (Temporary-IMSI), and/or a random number (e.g., generated by the wireless device) as an identifier of the wireless device.

In a 2-step RA procedure, a wireless device may receive two separate responses corresponding to Msg A; a first response for RAP (e.g., Msg A preamble) transmission; and a second response for a transmission of one or more TBs (e.g., Msg A payload). A wireless device may monitor a PDCCH (e.g., common search space and/or a wireless device specific search space) to detect the first response with a random access RNTI (RA-RNTI) generated based on time and/or frequency indices of PRACH resource where the wireless device may transmit an RAP. A wireless device may monitor a common search space and/or a wireless device specific search space to detect the second response. The wireless device may employ a second RNTI to detect the second response. For example, the second RNTI is a C-RNTI if configured, a random access RNTI generated based on time and/or frequency indices of PRACH occasion where the wireless device transmits an RAP, or an RNTI generated based on time and/or frequency indices (and/or DM-RS ID) of PUSCH resource(s) where the wireless device transmits the or more TBs. The wireless device specific search space may be predefined and/or configured by an RRC message received from a base station.

For example, the wireless device may monitor the set of candidates for the one or more downlink control channels in a Type1-PDCCH common search space set. For example, the Type1-PDCCH common search space set may be configured by the one or more search space sets, e.g., the ra-searchSpace in the PDCCH-ConfigCommon. For example, the Type1-PDCCH common search space set may be configured for a second format of a second downlink control information scrambled by a second radio network temporary identifier, e.g., a random access-radio network temporary identifier (RA-RNTI), a temporary cell-radio network temporary identifier (TC-RNTI), C-RNTI, and/or an RNTI that generated by a wireless device based on a 2-step RA procedure, e.g., MSGB-RNTI.

In an example, a wireless device may start a random access window (e.g., ra-Response Window) configured in a random access configuration parameter (e.g., RACH-ConfigCommon) at a first downlink control channel occasion from an end of a random access preamble transmission (e.g., Msg1 1311 or Msg1 1321 for a case of four-step RA procedure) or from an end of one or more TBs transmission (e.g., Transport block 1342 for a case of 2-step RA procedure), e.g., based on not performing, by a wireless device, a contention-free random access procedure for beam a failure recovery request. The wireless device may monitor the first downlink control channel occasion of the SpCell for random access response(s) identified by a particular RNTI (e.g., RA-RNTI or C-RNTI) while a random access response window (e.g., ra-Response Window) is running. In an example, a wireless device may receive a PDCCH based on the RA-RNTI. The PDCCH may indicate a downlink assignment based on which the wireless device may receive one or more TBs comprising an MAC PDU. For example, the MAC PDU comprises at least one MAC subPDU with a corresponding subheader comprising a Random Access Preamble identifier (e.g., RAPID) matched to a preamble that a wireless device transmits to a base station. In this case, the wireless device may determine that a random access response reception is successful. For example, the at least one MAC subPDU comprises a Random Access Preamble identifier (e.g., RAPID) only, e.g., for a random access procedure being started, by a wireless device, for a system information request.

In an example, a wireless device may monitor for the first downlink control information (e.g., DCI format 1_0) during a time window. The time window may be indicated by the one or more RRC messages. For example, the time window may start at a particular symbol (e.g., a first or a last symbol) of a first control resource set. The wireless device may receive, from a network or base station, one or more RRC messages comprising one or more parameters required for receiving the first downlink control information on the first control resource set. The wireless device may determine a length of the time window based on the one or more parameters (e.g., ra-ResponseWindow). The length of the time window may be defined in terms of a number of slots, OFDM symbols, and/or any combination thereof. In this case, the length may depend on a duration of slot and/or OFDM symbol that may be determined based on a numerology. In an example, the length of the time window may be defined based on an absolute time duration, e.g., in terms of millisecond(s). In an example, the wireless device may stop the ra_ResponseWindow, e.g., after or in response to a reception of the one or more random access responses being determined as successful. A reception of the one or more random access responses may be determined as successful, for example, when the one or more random access responses comprise a preamble index (e.g., RAPID) corresponding to a preamble that the wireless device transmits to a base station. For example, the RAPID may be associated with the PRACH transmission. The one or more random access responses may comprise an uplink grant indicating one or more uplink resources granted for the wireless device. The wireless device may transmit one or more transport blocks (e.g., Msg 3 1313) via the one or more uplink resources.

In an RA procedure, a wireless device may receive from a base station at least one RAR (e.g., Msg2 1312, Msg2 1322, or MsgB 1332) as a response of Msg1 1313, Msg1 1321, or Msg A 1331. The wireless device may monitor a search space set (e.g., the Type1-PDCCH common search space) for a first downlink control information (e.g., DCI format 1_0). The first downlink control information may be scrambled by a particular radio network temporary identifier (e.g., RA-RNTI, C-RNTI, or MSGB-RNTI). The first downlink control information may comprise a downlink assignment indicating scheduling of PDSCH comprising the at least one RAR. The wireless device may use the downlink assignment to identify parameters required for decoding/detecting the PDSCH. For example, the downlink assignment may indicate at least one of following: time and frequency resource allocation of the PDSCH, a size of the PDSCH, MCS, etc.

In an example, an RAR may be in a form of MAC PDU comprising one or more MAC subPDUs and/or optionally padding. A MAC subheader may be octet aligned. Each MAC subPDU may comprise at least one of following: a MAC subheader with Backoff Indicator only; a MAC subheader with RAPID only (e.g., acknowledgment for SI request); a MAC subheader with RAPID and MAC RAR. In an example, a MAC subPDU with backoff indicator may be placed at the beginning of the MAC PDU, if the MAC subPDU comprises the backoff indicator. MAC subPDU(s) with RAPID only and MAC subPDU(s) with RAPID and MAC RAR may be placed anywhere after MAC subPDU with Backoff Indicator and, if exist, before padding. In an example, a MAC subheader with RAPID may comprise one or more header fields, e.g., E/T/RAPID. Padding may be placed at the end of the MAC PDU if present. Presence and length of padding may be implicit based on TB size, size of MAC subPDU(s).

In an example, one or more header fields in a MAC subheader may indicate as follow: An E field may indicate an extension field that may be a flag indicating if the MAC subPDU including this MAC subheader being the last MAC subPDU or not being in the MAC PDU. The E field may be set to "1" to indicate at least another MAC subPDU follows. The E field may be set to "0" to indicate that the MAC subPDU including this MAC subheader being the last MAC subPDU in the MAC PDU; a T filed may be a flag indicating whether the MAC subheader contains a Random Access Preamble ID or a Backoff Indicator (one or more backoff values may predefined and BI may indicate one of backoff value). The T field may be set to "0" to indicate the presence of a Backoff Indicator field in the subheader (BI). The T field may be set to "1" to indicate the presence of a Random Access Preamble ID field in the subheader (RAPID); an R filed may indicate a reserved bit that may be set to "0"; a BI field may be a backoff indicator field that identifies the overload condition in the cell. The size of the BI field may be 4 bits; an RAPID field may be a Random Access Preamble IDentifier field that may identify the transmitted Random Access Preamble. The MAC subPDU may not comprise a MAC RAR, for example, when the RAPID in the MAC subheader of a MAC subPDU corresponds to one of the Random Access Preambles configured for SI request.

In an example, there may be one or more MAC RAR format. At least one of following MAC RAR format may be employed in a four-step or a 2-step RA procedure. The MAC RAR may be fixed size and may comprise at least one of the following fields: an R field that may indicate a Reserved bit, set to "0" or "1"; a Timing Advance Command field that may indicate the index value TA employed to control the amount of timing adjustment; a UL Grant field that may indicate the resources to be employed on the uplink; and an RNTI field (e.g., Temporary C-RNTI and/or C-RNTI) that may indicate an identity that is employed during Random Access. For example, for a 2-step RA procedure, an RAR may comprise at least one of following: a wireless device contention resolution identity, an RV ID for retransmission of one or more TBs, decoding success or failure indicator of one or more TB transmission, and one or more.

In an example, a wireless device may perform one or more retransmission of one or more preambles during a random access procedure (e.g., 2-step RA procedure and/or four-step RA procedure). There may be one or more conditions at least based on which the wireless device may determine whether to conduct the one or more retransmission of one or more preambles. In an example, the wireless device may determine the one or more retransmission of one or more preambles, e.g., in response to determining, by the wireless device, that a random access response (RAR) reception not being successful. In an example, for a 2-step RA procedure, a wireless device may start a timer (e.g., RAR window, Msg B response window, or contention resolution timer), e.g., after or in response to transmitting Transport block 1342 comprising a contention resolution identifier of the wireless device. In an example, the wireless device may determine the requirement for the one or more retransmission of Msg A 1331 (e.g., Preambles 1341 and/or Transport block 1342), e.g., in response to not receiving at least one Msg B comprising the contention resolution identifier, which the wireless device may include in Msg A payload, until the expiry of the timer. In an example, Msg B (e.g., the RAR message) may include some or all of the contents of message 2 (Msg 2 1312) and message 4 (Msg 4 1314) of a four-step RACH procedure shown in FIG. 13A. In an example, a RAR message may be referred to as message B, msgB, Msg B, MSGB, or a second message in a two-step RACH procedure.

In an example, the wireless device may determine that a random access response reception not being successful, e.g., based on determining that at least one random access response comprising one or more random access preamble identifiers, matching the transmitted PREAMBLE_INDEX, has not been received until an RAR window (e.g., ra-Response Window configured by RRC such as RACH-ConfigCommon IE) being expired.

In an example, the wireless device may determine that a random access response reception not being successful, for example, based on determining that a PDCCH addressed to the C-RNTI has not been received on the Serving Cell where the preamble was transmitted until a RAR window for a beam failure recovery procedure (e.g., ra-Response Window configured in BeamFailureRecoveryConfig) being expired.

In an example, a wireless device may determine the one or more retransmission of one or more preambles, e.g., in response to determining, by the wireless device, that a contention resolution not being successful. For example, the wireless device may determine, based on Msg 3 1313 for four-step RA procedure and/or Msg B 1332 for 2-step RA procedure, whether the contention resolution not being successful or being successful.

In an example, a MAC entity of the wireless device may start a contention resolution timer (e.g., ra-ContentionReso-lutionTimer) and may restart the contention resolution timer (e.g., ra-ContentionResolutionTimer) at each HARQ retransmission in the first symbol after the end of a Msg3 transmission, for example, once a wireless device transmits, to a base station, Msg3 1313. A wireless device may determine that a contention resolution not being successful, for example, based on not receiving an indication of a contention resolution while a contention resolution timer (e.g., ra-ContentionResolutionTimer) is running. For example, the wireless device may determine that a contention resolution not being successful, for example, in response to not receiving, by the wireless device, the indication of the contention resolution until the contention resolution timer (e.g., ra-ContentionResolutionTimer) expires. The wireless device may discard a TEMPRARY_C-RNTI indicated by an Msg2 1312 (or Msg B 1332) after or in response to an expiry of the contention resolution timer (and/or in response to a determination of the contention resolution being unsuccessful).

For 2-step RA procedure, a wireless device may fallback to four-step RA procedure based on an explicit and/or implicit indication of Msg B. In an example, in response to receiving, by the wireless device, a Msg B comprising an explicit indication and/or an RNTI used for detecting a PDCCH scheduling the Msg B (e.g., RA-RNTI or msg B RNTI), the wireless device may determine to fall back to the four-step RA procedure. The wireless device may transmit Msg3, e.g., after or in response to determining the fallback to the four-step RA procedure via resource(s) indicated by UL grant in Msg B. In this case the wireless device may follow the four-step RA procedure, e.g., starting the contention resolution timer, and/or determining whether the contention resolution being successful or not being successful. The wireless device may monitor a PDCCH while the contention resolution timer (e.g., ra-ContentionResolution-Timer) being running. The wireless device may start/restart the contention resolution timer (e.g., ra-ContentionResolu-tionTimer) at each HARQ retransmission in the first symbol after the end of a Msg3 transmission. In an example, a wireless device may stop the contention resolution timer and determine that a contention resolution being successful, in response to receiving a notification of a reception of a PDCCH transmission of a cell (e.g., SpCell) received from lower layers, where the PDCCH transmission may be identified, by the wireless device, as an indication of a contention resolution corresponding to a Msg3 transmission (or Msg B transmission) performed by the wireless device.

A wireless device may maintain (e.g., increment) a counter counting a number of preamble transmissions (e.g., PREAMBLE_TRANSMISSION_COUNTER) by a value of counter step (e.g., by 1), for example, after or in response to a random access response reception being unsuccessful and/or after or in response to a contention resolution being unsuccessful. The wireless device may determine that a random access procedure being unsuccessfully completed and/or a MAC entity of the wireless device may indicate a random access problem to upper layer(s), for example, in response to determining that the number of preamble transmissions reached a predefined or semi-statically configured value, (e.g., if PREAMBLE_TRANSMISSION_ COUNTER=preambleTransMax+1 where preambleTrans-Max may be a predefined or semi-statically configured value). In an example, the wireless device may determine that a random access procedure not being completed and/or one or more retransmission of one or more Msg1 1311, Msg1 1321, or Msg A 1331 may be performed, in response to determining that the number of preamble transmissions being smaller than a predefined or semi-statically configured value, (e.g., if PREAMBLE_TRANSMISSION_COUNTER<preambleTransMax+1).

In an example, a wireless device may delay a particular period of time (e.g., a backoff time) for performing a retransmission of one or more Msg1 1311, Msg1 1321, or Msg A 1331. For example, the wireless device may set the backoff time to 0 milliseconds when a random access procedure being initiated. The wireless device may set (or update) the backoff time based on the PREAMBLE_BACK-OFF determined by a value in an BI field of the MAC subPDU. In an example, a value (or a bit string) in the BI field may indicate a particular backoff time in a predefined or semi-statically configured table. For example, the wireless device may set the PREAMBLE_BACKOFF to a value indicated by the BI field of the MAC subPDU using the predefined or semi-statically configured table. The wireless device may set the PREAMBLE_BACKOFF to a value indicated by the BI field of the MAC subPDU multiplied with a scaling factor, (e.g., SCALING_FACTOR_BI), for example, based on receiving, by the wireless device, from a base station, one or more RRC messages indicating the scaling factor. The wireless device may set (or update) the PREMABLE_BACKOFF based on the BI field, for example, based on determining that a downlink assignment being received on the PDCCH for the RA-RNTI and the received TB being successfully decoded, and/or based on determining that the Random Access Response being comprised a MAC subPDU with the BI. The wireless device may set the PREAMBLE_BACKOFF to 0 milliseconds, for example, based on determining that a downlink assignment not being received on the PDCCH for the RA-RNTI and/or the received TB not being successfully decoded, and/or the RAR not being comprised a MAC subPDU with Backoff Indicator.

In an example, a wireless device may determine the backoff time based on determining that a RAR not being successful and/or a contention resolution not being successful. The wireless device may employ a particular selection mechanism to determine the backoff time. For example, the wireless device may determine the backoff time based on a uniform distribution between 0 and the PREAMBLE_BACKOFF. The wireless device may employ any type of distribution to select the backoff time based on the PRE-AMBLE_BACKOFF. For example, the wireless device may determine whether to apply the backoff time to a retransmission of at least one preamble based on an event type initiating the random access procedure (e.g., Beam Failure Recovery request, handover, etc.) and/or a type of the random access procedure (e.g., four-step or 2-step RA and/or CBRA or CFRA). For example, the wireless device may apply the backoff time to the retransmission, for example, in response to the random access procedure being CBRA (e.g., where a preamble being selected by a MAC entity of the wireless device) and/or based on determining, by the wireless device, that a random access procedure not being completed in response to a successful reception random access (RAR). In an example, the backoff time to the retransmission may be applied, by the wireless device, based on determining that that a random access procedure not being completed in response to an unsuccessful contention resolution.

Figure 22:
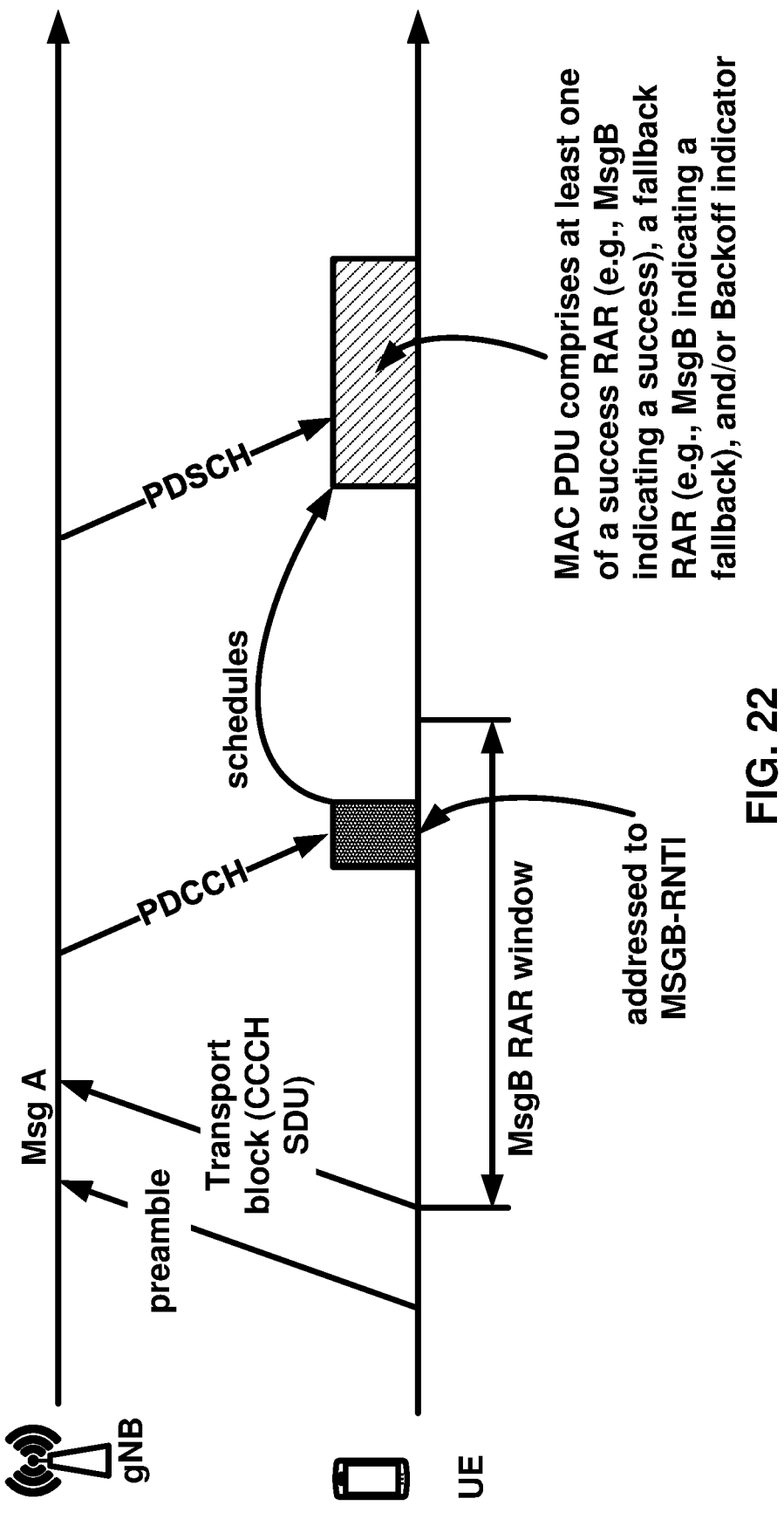
FIG. 22 shows an example of a 2-step RA procedure performed between a wireless device and a base station.

FIG. 22 provides an example of a 2-step RA procedure performed between a wireless device and a base station. As shown in FIG. 22, the wireless device may transmit a Msg A comprising a first transmission of a preamble and a second transmission of a transport block. The transport block may comprise a CCCH SDU. The CCCH SDU may comprise an RRC (re)establishment request, an RRC setup request, and/or an RRC resume request. The wireless device may start to monitor a downlink control channel (PDCCH) addressed to a particular RNTI. The wireless device may start a Msg B RAR window after or in response to transmitting the Msg A or the transport block. The particular RNTI may be referred to as MSGB-RNTI or a RA-RNTI. The wireless device may determine the particular RNTI based on the timing (e.g., OFDM symbol, slot, subframe, and/or SFN numbers) and/or frequency indices of radio resources of the first transmission for the preamble and/or the second transmission for the transport block. The wireless device may determine the particular RNTI further based on a preamble index of the preamble and/or a DMRS port index.

In an example shown in FIG. 22, the wireless device may detect and/or receive a PDCCH addressed to the particular RNTI during the MsgB RAR window. A DCI received via the PDCCH may comprise a downlink assignment indicating a PDSCH reception. The DCI may be a particular DCI whose format being predefined. For example, the DCI may be a DCI format 1_0 or DCI format 1_1. The wireless device may receive and/or decode the PDSCH based on the downlink assignment. The physical layer may decode the PDSCH and send the decoded data to the MAC entity in the form of a MAC PDU. The wireless device may identify a response (e.g., a Msg B) to the Msg A in the MAC PDU. The response to the Msg A may comprise a preamble identifier (e.g., RAPID) that may match the preamble identifier of the preamble that the wireless device transmitted to the base station via the Msg A. The response to the Msg A may comprise an explicit or implicit indicator that indicates a success RAR or a fallback RAR. For example, the response to the Msg A may comprise a field indicating a type (success or fallback) of RAR. The wireless device may identify the type of RAR based on a format of the received RAR. For example, the success RAR and the fallback RAR may comprise one or more different types and/or sizes of fields based on which the wireless device may identify the type of RAR.

For a 2-step RA procedure, like the 2-step RA procedure in FIG. 22, a wireless device may determine, at least based on a C-RNTI, whether a contention resolution is successful or not and/or whether a Msg B is received successfully or not. The wireless device, based on having an assigned C-RNTI, may transmit a Msg A comprising a C-RNTI to a base station. For example, the wireless device may have received a message comprising the C-RNTI from the base station prior to transmission of the Msg A. The Msg A (or a transport block of the Msg A) may comprise a C-RNTI MAC CE indicating the C-RNTI to the base station. The wireless device may start to monitor a downlink control channel for a Msg B with one or more RNTIs, e.g., after or in response to transmitting the Msg A (or a transport block of Msg A). For example, the wireless device may monitor a downlink control channel (e.g., PDCCH) with one or more RNTIs, after or in response to transmitting the Msg A indicating the C-RNTI (e.g., C-RNTI MAC CE). The one or more RNTIs may comprise a first RNTI (e.g., MSGB-RNTI) determined (or calculated) based on uplink radio resources used for the Msg A transmission. For example, the first RNTI may be an RA-RNTI. For example, the first RNTI may be determined based on uplink radio resources used for a preamble and/or transport block of the Msg A. The uplink radio resources may comprise time (e.g., in terms of any combination of OFDM symbol, slot number, subframe number, and/or SFN) and/or frequency indexes of a PRACH occasion for transmission of the Msg A preamble), a preamble identifier of the Msg A preamble, time (e.g., in terms of any combination of OFDM symbol, slot number, subframe number, SFN, and/or time offset with respect to associated PRACH occasion) and/or frequency indexes a PUSCH occasion for transmission of the Msg A transport block, and/or DMRS index(es) (e.g., DMRS port identifier(s)) of the PUSCH occasion for transmission of Msg A transport block). For example, the wireless device may monitor PDCCH(s) addressed to the C-RNTI for a success response to the Msg A and monitor PDCCH(s) addressed to the first RNTI (e.g., MSGB-RNTI) for a failure (or fallback) response to the Msg A. The wireless device may start a timer (e.g., contention resolution timer) and/or monitor a downlink control channel while the timer is running. For example, the timer may determine how long (e.g., for a particular time interval/window/duration) the wireless device monitors the downlink control channel to receive a response (e.g., a success response and/or a fallback response) to the Msg A from the base station.

In an example, the wireless device may stop monitoring the downlink channel based on receiving, by the wireless device, at least one response, e.g., a PDCCH addressed to the C-RNTI and/or a PDCCH addressed to the first RNTI. The wireless device may determine that a contention resolution being successful based on one or more conditions. For example, the wireless device may determine that a contention resolution being successful based on detecting a PDCCH addressed to the C-RNTI, included in the Msg A, where indicating a PDSCH (e.g., via a downlink assignment of a DCI) comprising a TA command. For example, the wireless device may determine that a contention resolution being successful based on determining that a PDCCH addressed to the C-RNTI included in the Msg A being detected, indicating a PDSCH (e.g., via a downlink assignment of a DCI) comprising an UL grant (e.g., if the wireless device is already synchronized). The PDCCH addressed to the C-RNTI may be an indication of a success response.

In an example, the wireless device may receive at least one response, e.g., a PDCCH addressed to the C-RNTI and/or a PDCCH addressed to the first RNTI while monitoring the downlink channel in response to and/or after transmitting a Msg A comprising C-RANTI. In an example, the wireless device may determine that the ongoing 2-step RA procedure successfully completed based on detecting a PDCCH addressed to the C-RNTI, included in the Msg A, where indicating a PDSCH (e.g., via a downlink assignment of a DCI) comprising a TA command.

In an example, the wireless device may receive at least one response, e.g., a PDCCH addressed to the C-RNTI and/or a PDCCH addressed to the first RNTI while monitoring the downlink channel in response to and/or after transmitting a Msg A comprising C-RANTI. In an example, the wireless device may determine that the ongoing 2-step RA procedure successfully completed based on determining that a PDCCH addressed to the C-RNTI included in the Msg A being detected, indicating a PDSCH (e.g., via a downlink assignment of a DCI) comprising an UL grant (e.g., if the wireless device is already synchronized). The PDCCH addressed to the C-RNTI may be an indication of a success response.

In an example, the wireless device may detect and/or receive a PDCCH addressed to the particular RNTI (e.g., MSGB-RANTI) during the MsgB RAR window. The wireless device may receive and/or successfully decode the PDSCH based on the downlink assignment. The physical layer may decode the PDSCH and send the decoded data to the MAC entity in the form of a MAC PDU. The wireless device may identify a response (e.g., a Msg B) to the Msg A in the MAC PDU. The response to the Msg A may comprise a preamble identifier (e.g., RAPID) that may match the preamble identifier of the preamble that the wireless device transmitted to the base station via the Msg A. The response to the Msg A may comprise an explicit or implicit indicator that indicates a success RAR or a fallback RAR (e.g., fallbackRAR MAC subPDU). In an example, based on determining that the Msg A comprises the fallbackRAR MAC subPDU and the Random Access Preamble (RAP) was not selected by the MAC entity among the contention-based Random Access Preamble(s), the wireless device may consider the ongoing 2-step RA procedure successfully completed. In an example, the wireless device may process the received timing advance command (e.g., TAC MAC CE) and UL grant value and indicate it to the lower layers (e.g., physical layer).

In an example shown in FIG. 22, the wireless device may stop monitoring for a detecting a PDCCH addressed to the C-RNTI in response to receiving, by the wireless device, a fallback response (e.g., RAR). In this case, the contention resolution may not be successful, and the wireless device may fall back to Msg 3 transmission based on fallback operation. The wireless device may identify the fallback response based on a PDCCH addressed to the first RNTI (e.g., MSGB RNTI).

In an example, while the wireless device monitoring the PDCCH, the wireless device may detect the PDCCH addressed to the first RNTI (e.g., MSGB RNTI). The PDCCH (e.g., DCI with a downlink assignment) may comprise a downlink assignment based on which the wireless device may be scheduled a PDSCH comprising the fallback response. The PDSCH may comprise one or more responses. The wireless device may identify a response from the one or more responses based on one or more identifiers. For example, the wireless device may identify a response from the one or more responses based on determining that an identifier of the response being matched to a preamble index of the Msg A preamble. The response may comprise an UL grant indicating uplink radio resource(s) where the wireless device may use to transmit the Msg 3 based on the fallback operation. The wireless device may determine that the Msg B reception (or contention resolution or Msg A transmission attempt) being failed in response to neither receiving the fallback response nor detecting a PDCCH addressed C-RNTI within the timer (e.g., Msg B response window). The wireless device, in this case, may perform a back off operation based on the backoff indicator in response to receiving the backoff indicator via Msg B.

Figures 23A, 23B:
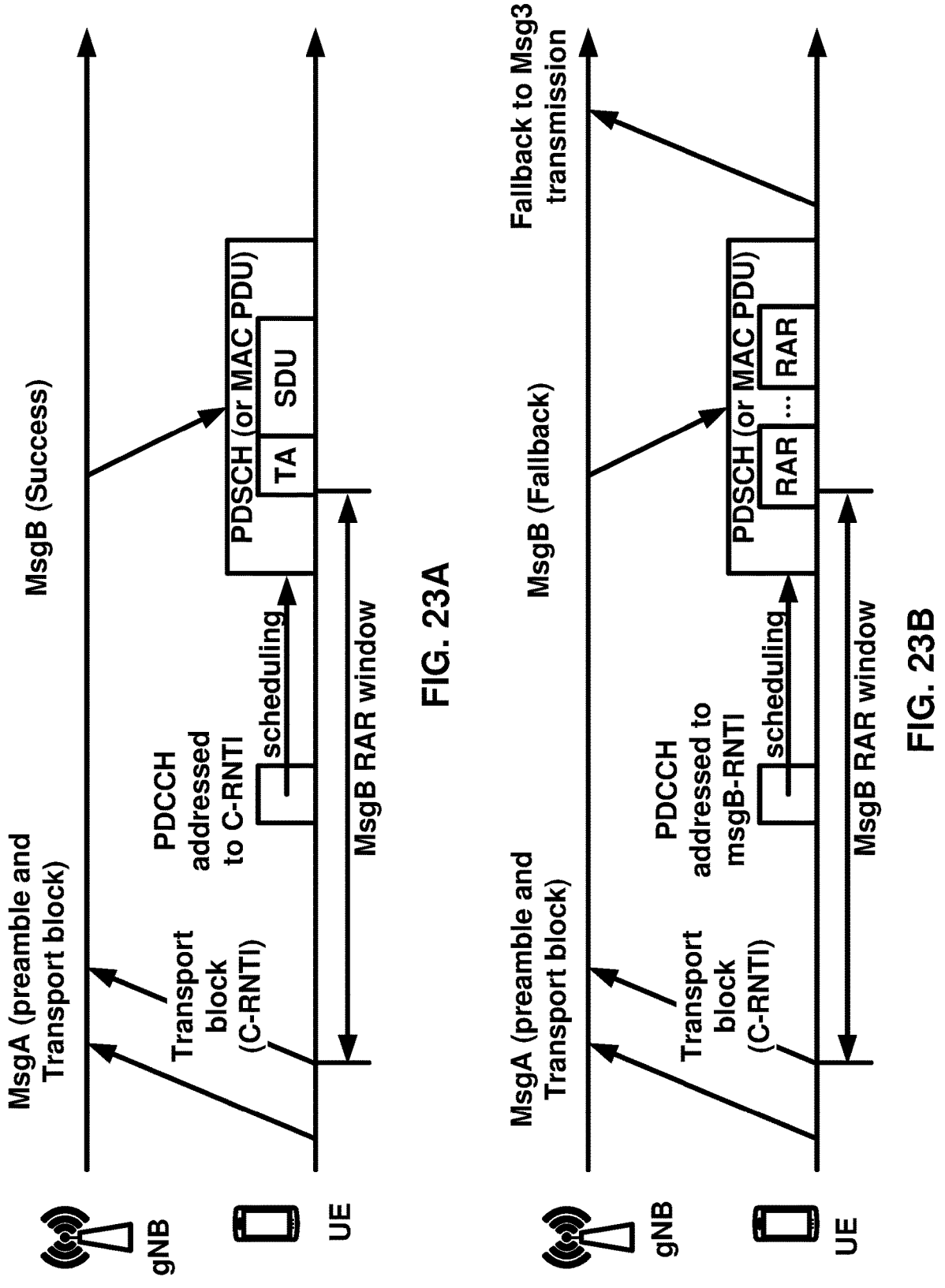
FIG. 23A and FIG. 23B are example diagrams illustrating 2-step RA procedures performed between a wireless device and a base station.

FIG. 23A and FIG. 23B are example diagrams illustrating 2-step RA procedures performed between a wireless device and a base station. The wireless device may transmit the C-RNTI (e.g., C-RNTI MAC CE indicating the C-RNTI) to the base station via a Msg A during the 2-step RA procedure. The wireless device may start a Msg B RAR window after or in response to transmitting the Msg A (or the transport block). The wireless device may monitor the downlink control channel during the Msg B RAR window. The wireless device may monitor the downlink control channel with C-RNTI and/or a Msg B-RNTI (or RA-RNTI). The wireless device may stop monitoring the downlink control channel based on receiving, via the downlink control channel during the MsgB RAR window, at least one PDCCH addressed to the C-RNTI and/or MSGB-RNTI (or RA-RNTI).

FIG. 23A is an example diagram illustrating that the wireless device may receive, via the downlink control channel, a PDCCH addressed to the C-RNTI of the wireless device. The wireless device, which may transmit the C-RNTI (e.g., C-RNTI MAC CE indicating the C-RNTI) via the Msg A, may monitor a downlink control channel with C-RNTI and/or MSGB-RNTI (or RA-RNTI). The wireless device may stop monitoring the downlink control channel with the C-RNTI and/or MSGB-RNTI (or RA-RNTI) after or in response to receiving the PDCCH addressed to the C-RNTI. The detected PDCCH may comprise a DCI comprising a downlink assignment based on which the wireless device may receive a PDSCH (e.g., MAC PDU). The received PDSCH (or MAC PDU) may comprise a TA command (e.g., TA command MAC CE). The wireless device may stop monitoring the downlink control channel with the C-RNTI and/or MSGB-RNTI (or RA-RNTI) after or in response to receiving the PDCCH addressed to the C-RNTI and/or the corresponding PDSCH (or MAC CE) comprising the TA command. In this case, the wireless device may determine that the 2-step RA procedure being completed successfully, a reception of Msg B being successful, and/or a contention resolution being completed successfully.

FIG. 23B is an example diagram illustrating that the wireless device may receive, via the downlink control channel, a PDCCH addressed to the MSGB-RNTI (or RA-RNTI). The wireless device, which transmits the C-RNTI (e.g., C-RNTI MAC CE indicating the C-RNTI) via a Msg A, may monitor a downlink control channel with the C-RNTI and/or MSGB-RNTI (or RA-RNTI). The wireless device may stop monitoring the downlink control channel with the C-RNTI and/or MSGB-RNTI (or RA-RNTI) after or in response to receiving the PDCCH addressed to MSGB-RNTI (or RA-RNTI). The detected PDCCH may comprise a DCI indicating a downlink assignment based on which the wireless device may receive a PDSCH (e.g., MAC PDU). The received PDSCH (or MAC PDU) may comprise one or more RARs (e.g., one or more MsgBs). The wireless device may stop monitoring the downlink control channel with the C-RNTI and/or MSGB-RNTI (or RA-RNTI) after or in response to receiving the PDCCH addressed to C-RNTI and/or the corresponding PDSCH (or MAC PDU) comprising the one or more RARs (e.g., one or more MsgBs). The wireless device may identify an RAR (e.g., Msg B) corresponding to the Msg A based on a preamble identifier matching to a preamble identifier of the preamble transmitted by the wireless device in the Msg A. For example, the RAR (e.g., Msg B) may comprise at least one preamble identifier. The wireless device may determine that an RAR (e.g., Msg B) in the PDSCH (or MAC PDU) may correspond to the Msg A based on determining that a preamble identifier of the RAR (e.g., Msg B) being matched to the preamble identifier of the preamble that the wireless device transmitted to the base station via the Msg A. The wireless device may stop monitoring the downlink control channel with the C-RNTI and/or MSGB-RNTI (or RA-RNTI) after or in response to identifying the RAR (e.g., Msg B) from the PDSCH (or MAC PDU) based on the preamble identifier. The RAR may indicate a fallback to a Msg 3 transmission of a four-step RA procedure. For example, the RAR may comprise an UL grant and a TA command. The wireless device may transmit the Msg 3 via radio resource(s) indicated by the UL grant with a UL transmission timing being adjusted based on the TA command. The Msg 3 may comprise at least a portion of transport block. For example, the Msg 3 and the transport block may be the same. For example, the Msg 3 may comprise the C-RNTI.

In an example, a (communication) satellite may comprise a space-borne vehicle (e.g., satellite, balloons, air ships, high altitude platform stations, unmanned aircraft system, and the like) embarking a bent pipe payload (e.g., transparent payload), etc. The satellite may forward a received signal from another satellite (e.g., over inter-link satellite communication links) or a gateway on the ground (e.g., over the feeder communication link) back to the earth. The satellite may forward a received signal from a wireless device on the earth to another satellite or a gateway on the ground. The signal may be forwarded back with amplification and/or a shift between service link frequency (point or a bandwidth) and feeder link frequency. The signal may be forwarded back with an on board processing. The satellite may comprise a regenerative payload telecommunication transmitter with the on board processing used to demodulate and decode the received signal and/or regenerate the signal before sending it back to the earth. Otherwise, the satellite may comprise a transparent payload telecommunication transmitter without the capability of on board digital signal processing (e.g., modulation and coding).

Figure 24A:
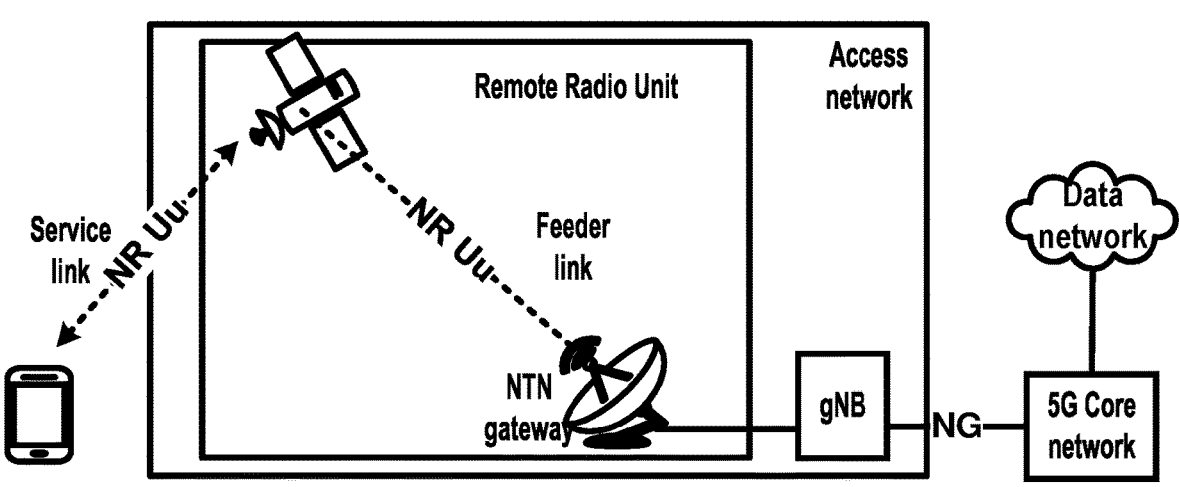
FIG. 24A is an example non-terrestrial network architecture with transparent satellite as an aspect of an embodiment of the present disclosure.

FIG. 24A is an example non-terrestrial network architecture with transparent satellite as an aspect of an embodiment of the present disclosure. In an example, an NTN architecture may comprise a wireless device, a satellite, an NTN gateway, a base station, a 5G core network, and/or a data network. The satellite may behave as a remote radio unit (RRU) communicating with the NTN gateway. The satellite may implement frequency conversion and radio frequency amplification in the uplink and/or downlink directions. The NTN gateway may connect to a base station on the ground. A wireless device may transmit and receive via the satellite. The satellite (e.g., an RRU) may correspond to an analogue RF repeater that repeats the NR-Uu radio interface from a service link (between the satellite and the wireless device) to a feeder link (between the NTN gateway and the satellite), and vice-versa.

Figure 24B:
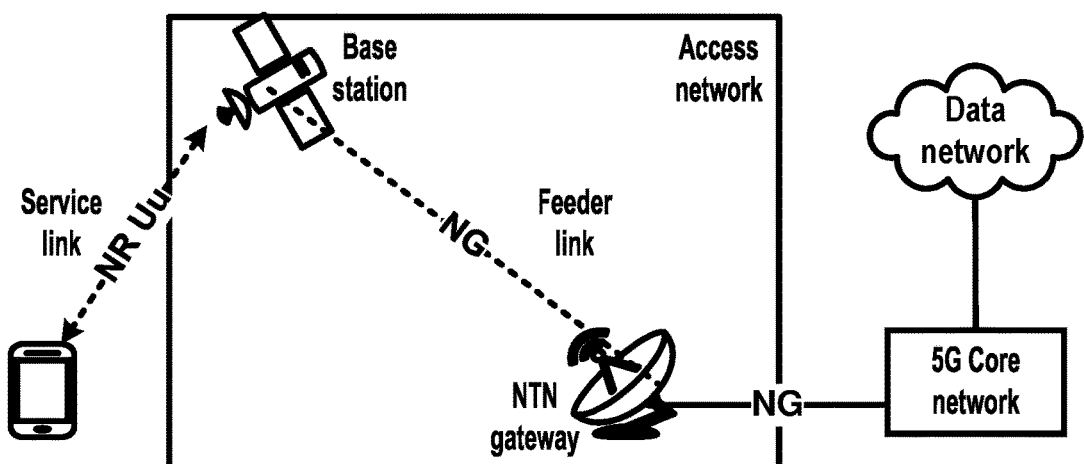
FIG. 24B is an example non-terrestrial network architecture with regenerative satellite as an aspect of an embodiment of the present disclosure.

FIG. 24B is an example non-terrestrial network architecture with regenerative satellite as an aspect of an embodiment of the present disclosure. In an example, an NTN architecture may comprise a wireless device, a satellite, an NTN gateway, a 5G core network, and/or the like. The satellite may regenerate signals received from earth (e.g., from a wireless device or from an NTN gateway). In an example, the satellite may behave as a base station.

FIG. 25 is an example figure of different types of non-terrestrial network platforms. In an example, a satellite may be placed into a low-earth orbit (LEO) at an altitude between 250 km to 1500 km, with orbital periods ranging from 90-130 minutes. A mean orbital velocity needed to maintain a stable LEO may be 7.8 km/s and may be reduced with increased orbital altitude. A mean orbital velocity for circular orbit of 200 km may be 7.79 km/s. A mean orbital velocity for circular orbit 1500 km may be 7.12 km/s. From the perspective of a given point on the surface of the earth, the position of the LEO satellite may change.

In an example, a satellite may be placed into a medium-earth orbit (MEO) at an altitude between 5000 to 20000 km, with orbital periods ranging from 2 hours to 14 hours.

In an example, a satellite may be placed into a geostationary satellite earth orbit (GEO) at 35,786 km altitude, and directly above the equator. This may equate to an orbital velocity of 3.07 km/s and an orbital period of 1,436 minutes, which equates to almost one sidereal day (23.934461223 hours). From the perspective of a given point on the surface of the earth, the position of the GEO may not move.

In an example, a satellite network may be a network or network segment that uses a space-borne vehicle to embark a transmission equipment relay node or a base station. While a terrestrial network is a network located on the surface of the earth, an NTN may be a network which uses a satellite as an access network, a backhaul interface network, or both. A (communication) satellite may generate several beams over a given area.

In an example, a footprint of a beam of a satellite may be in an elliptical shape (e.g., which may be considered as a cell). The footprint of a beam may be referred to as a spotbeam. The footprint of a beam may move over the Earth's surface with the satellite movement. The footprint of a beam may be Earth fixed with some beam pointing mechanism used by the satellite to compensate for its motion. The size of a spotbeam may depend on the system design and may range from tens of kilometers to a few thousand kilometers.

In an example, a propagation delay (e.g., between a satellite and the ground or between multiple satellites) may be the amount of time it takes for the head of the signal to travel from a sender to a receiver or vice versa. For uplink, the sender may be a wireless device and the receiver may be a base station/access network. For downlink, the sender may be a base station/access network and the receiver may be a wireless device. The propagation delay may vary depending on a distance between the sender and the receiver.

FIG. 26 shows examples of propagation delay corresponding to NTNs of different altitudes. The propagation delay in the figure may be one-way latency. In an example, one-way latency may be an amount of time required to propagate through a telecommunication system from a terminal to the receiver (e.g., base station, eNB, gNB, RRU of a base station).

In an example, for the transparent satellite model of GEO case, the round-trip propagation delay (RTD) may comprise service link delay (e.g., between the satellite and the wireless device) and feeder link delay (e.g., between the NTN gateway and the satellite). The RTD may be four times of 138.9 milliseconds (approximately 556 milliseconds).

In an example, a RTD of the GEO satellite may be more than a few seconds if processing time and congestion are considered. In an example, a RTD of a terrestrial network (e.g., NR, E-UTRA, LTE) may be negligible. The RTD of a terrestrial network may be less than 1 millisecond. In an example, the RTD of a GEO satellite may be hundreds of times longer than the one of terrestrial network.

In an example, a maximum RTD of a LEO satellite with transparent payload with altitude of 600 km may be 25.77 milliseconds. The differential RTD may be 3.12 milliseconds. The differential RTD within a beam of the satellite may be calculated based on the maximum diameter of the beam footprint at nadir. In an example, the differential RTD may imply the difference between communication latency that two wireless devices (one is located close to the edge of the cell/beam and one is located close to the center of the cell/beam) may experience while communicating with an NTN node. In an example, for a LEO satellite with transparent payload with altitude of 1200 km, the maximum RTD of may be 41.77 milliseconds. The differential RTD may be 3.18 milliseconds.

Figure 27A:
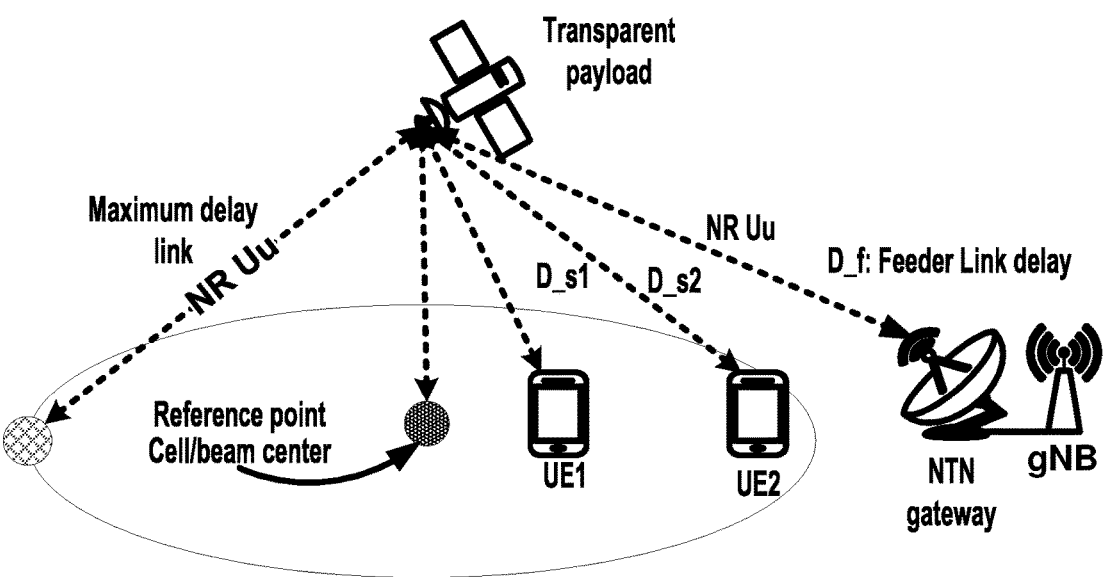
FIG. 27A shows an example of a cell/beam and reference point in a non-terrestrial network architecture with transparent satellite.
Figure 27B:
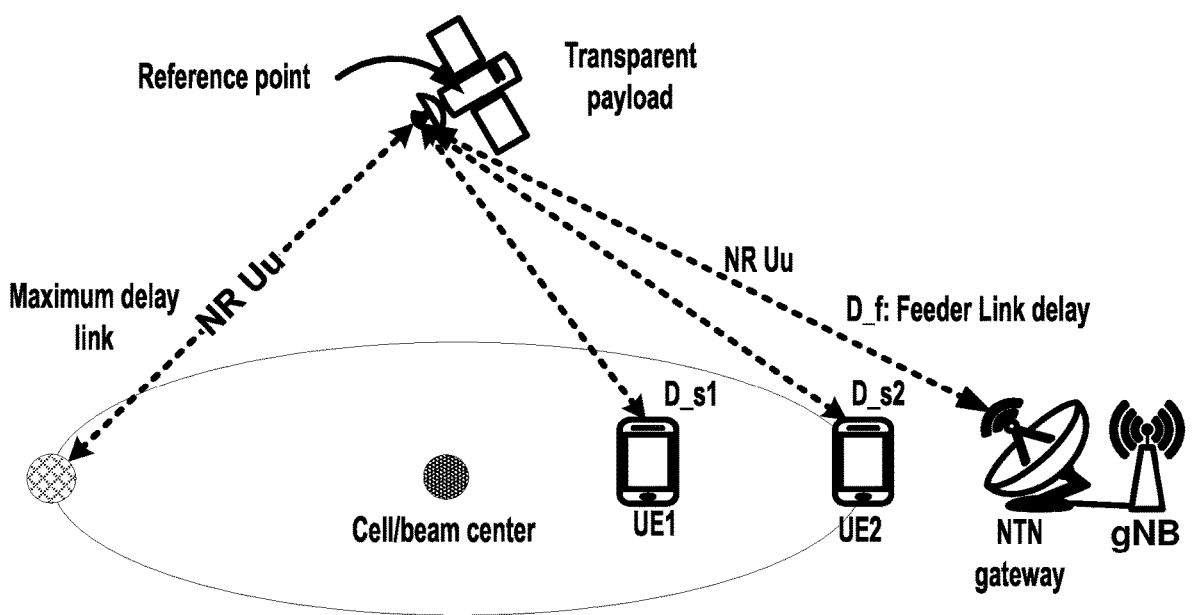
FIG. 27B shows an example of a cell/beam in a non-terrestrial network architecture with transparent satellite when the reference point is the satellite.

FIG. 27A shows an example of a cell/beam and reference point in a non-terrestrial network architecture with transparent satellite. FIG. 27B shows an example of a cell/beam in a non-terrestrial network architecture with transparent satellite when the reference point is the satellite. In an example, a satellite network may comprise at least one of: a (transparent) satellite, feeder link, ground gNB, a cell/beam, and service links of two wireless users.

In an example, as shown in FIG. 27A and/or FIG. 27B, a first wireless device (e.g., UE1) may be located closer to the cell/beam center. UE1 may experience smaller RTD compared to a second wireless device (e.g., UE2) that is located closer to the cell/beam edge. The link with maximum propagation delay (e.g., for UE2) may experience higher propagation delay than UE1 in the cell/beam. The link to a cell/beam center may experience the minimum propagation delay in the cell/beam. A cell/beam center may be referred to as a reference point.

In an example, a reference point of a satellite network may be provided to the wireless devices in order to facilitate the estimation of the delay of the propagation delay in the service link.

In an example of FIG. 27A, the reference point may be on the ground and have an altitude larger than all the wireless devices in the cell/beam to make sure that the propagation delay to the reference point stays the smallest propagation delay in the cell/beam. In the example of FIG. 27B, the reference point may be a satellite.

In an example, the propagation delay between the gNB and the reference point in the examples of FIG. 27A and FIG. 27B may be considered as common delay (e.g., the delay that is experienced with all the wireless devices in the cell/beam). The gNB may provide the value of the common delay to all wireless devices in the cell/beam allowing them to estimate their corresponding RTD. The satellite network may provide resources/signaling in order to compensate for the changes that may happen to the value of the common delay as a result of the satellite movement, feeder link switch, or the change in the location of the reference point.

In an example, a Timing Advance (e.g., in NTN 5G NR) may be based on the orthogonal frequency-division multiple access (OFDMA) as a multi-access scheme in the uplink. Transmissions from different UEs in a cell/beam may need to be time-aligned at the gNB and/or the satellite to maintain uplink orthogonality. Time alignment may be achieved by using different timing advance (TA) values at different UEs to compensate for their different propagation delays or RTD.

Figure 28:
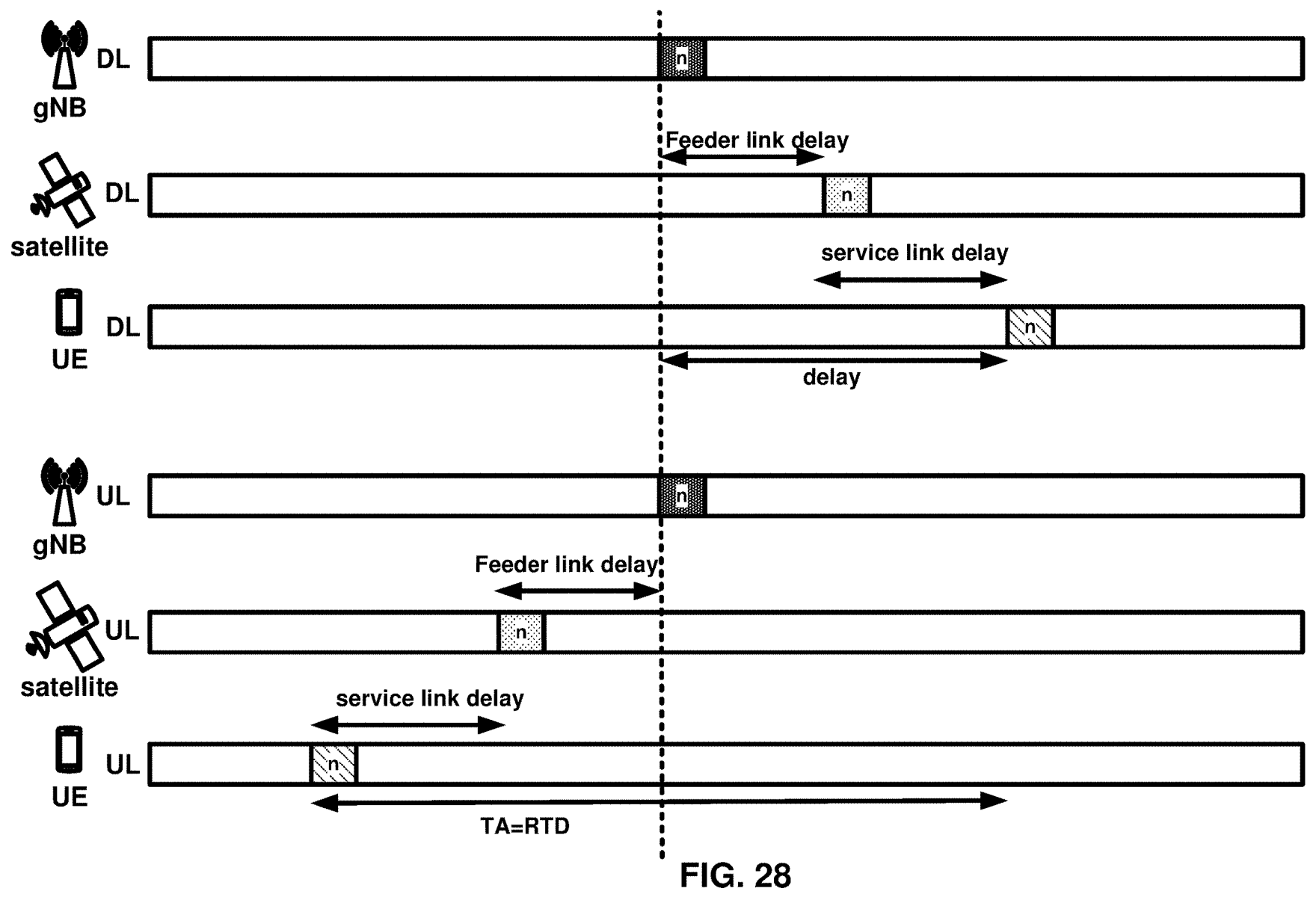

FIG. 28 shows an example of UL-DL timing relationship in a non-terrestrial network with transparent satellite. In an example, a gNB may not compensate a feeder link delay. The wireless device may compensate for a RTD (e.g., a summation of feeder link delay and service link delay).

In an example, UL and DL frame timing may be aligned at a gNB. The UL and DL frame timing may not be aligned at the satellite. As shown in FIG. 28, the wireless device may set TA value equal to the RTD. The wireless device may require measuring the RTD before applying TA. In an example, the gNB may provide a value of a common delay of the cell/beam to all the wireless devices in the cell/beam by the means of broadcast system information (e.g., SIB1).

In an example, a common delay may comprise a feeder link delay between a satellite and a gNB. The common delay may further comprise part of a (common) service link delay. The (common) service link delay may be common to all the service links of the cell/beam. The (common) service link delay may be between the satellite and a reference point of FIG. 27A at the center of the cell/beam with a given altitude close the surface of the earth. The wireless device may calculate the service link delay by estimating a propagation delay between itself and the reference point, e.g., when the reference point is provided as part of the broadcast system information.

In an example, a common delay may comprise a feeder link delay between a satellite and a gNB. The common delay may not comprise the service link delay, e.g., when the satellite is not the reference point, as the example of FIG. 27B. The wireless device may calculate the service link delay by estimating a propagation delay associated with the satellite, e.g., when the reference point is not configured or if the satellite is the reference point, as the example of FIG. 27B.

Figure 29:
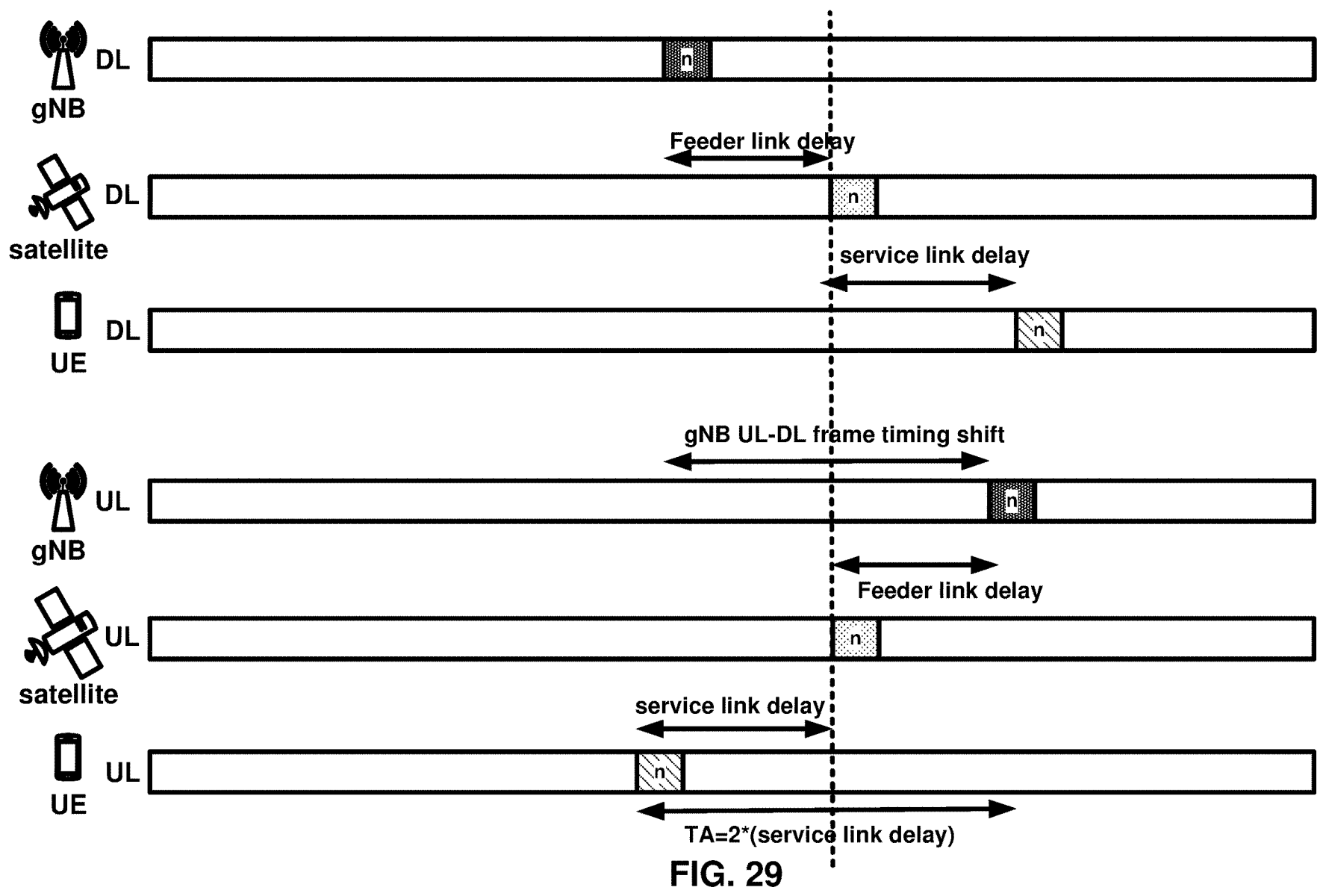

FIG. 29 shows an example of UL-DL timing relationship in a non-terrestrial network with transparent satellite. In an example, a gNB may compensate the feeder link delay. The wireless device may compensate for the delay in the service link as it is not compensated by the gNB. As shown in FIG. 29, based on compensating the feeder link delay by the gNB, the UL and DL frame timing may be aligned at the satellite. The time alignment between the UL and DL channels at the gNB may not hold as a result of an UL-DL frame timing alignment shift. The UL-DL frame timing alignment shift may be provided by the gNB.

In an example, as shown in FIG. 29, the wireless device may set TA value equal twice a service link delay. The wireless device may require measuring the service link delay before applying TA. In an example, the gNB may provide a value of a common delay of the cell/beam to all the wireless devices in the cell/beam by the means of broadcast system information (e.g., SIB1).

In an example, a common delay may comprise a part of a (common) service link delay. The (common) service link delay may be common to all the service links of the cell/beam. The (common) service link delay may be between the satellite and a reference point at the center of the cell/beam with a given, as the example of FIG. 27A. The wireless device may calculate the service link delay by estimating a propagation delay between itself and the reference point, e.g., when the reference point is provided as part of the broadcast system information.

In an example, a wireless device may estimate a propagation delay of a service link with an aid of a reference point, if provided. The wireless device may be provided by the orbital movement of the satellites (e.g., ephemeris of the satellites) or other required information. The ephemeris of the satellite may provide the wireless device with the movement pattern of the satellite allowing the wireless device to update the TA during a time period. In an example, the ephemeris may be periodically broadcasted by the satellite along with an indication indicating the rate by which the TA calculations carried out by the wireless device using the ephemeris should be updated in order to account for the movement of the satellite. In an example, the ephemeris may not accurately provide the location of the satellite if the periodicity during which the ephemeris is broadcasted is relatively long. In an example, the ephemeris may not accurately provide the location of the satellite if the movement of the satellite gradually drifts from the predicted orbital movement at the wireless device using the ephemeris. In an example, a wireless device may require to frequently update the gNB with associated RTD by the means of MAC CE commands, if such mechanisms are provisioned. In an example, if the wireless device moves (e.g., a passenger in a high-speed train or a commercial airplane), signaling overhead to update the gNB regarding the value of RTD may become significant.

In an example, a 2-step RA procedure between a wireless device and an NTN gNB may be comprising of transmitting, by the wireless device, a Msg A comprising a preamble and a corresponding PUSCH message associated with a RACH procedure to NTN node (e.g., gNB). The wireless device may start monitoring a PDCCH for a contention resolution message (e.g., msgB RAR window) during a contention resolution window, wherein the wireless device may start to monitor the PDCCH a (variable) time period/window after the PUSCH message is transmitted. The (variable) time period/window may be adopted to account for the long propagation delay in NTN.

In an example, in terrestrial networks, the start time of a RAR window (e.g., started in response to the transmission of a Msg 1 or Msg A) may be specified as the time between a last symbol (or slot) of a PRACH occasion and a starting symbol (or slot) of an RAR window. In a terrestrial network, the RAR window start time may be fixed. In an NTN scenario, a fixed RAR window start time may not be proper as a result of large (and/or variable) RTD.

Figure 30:
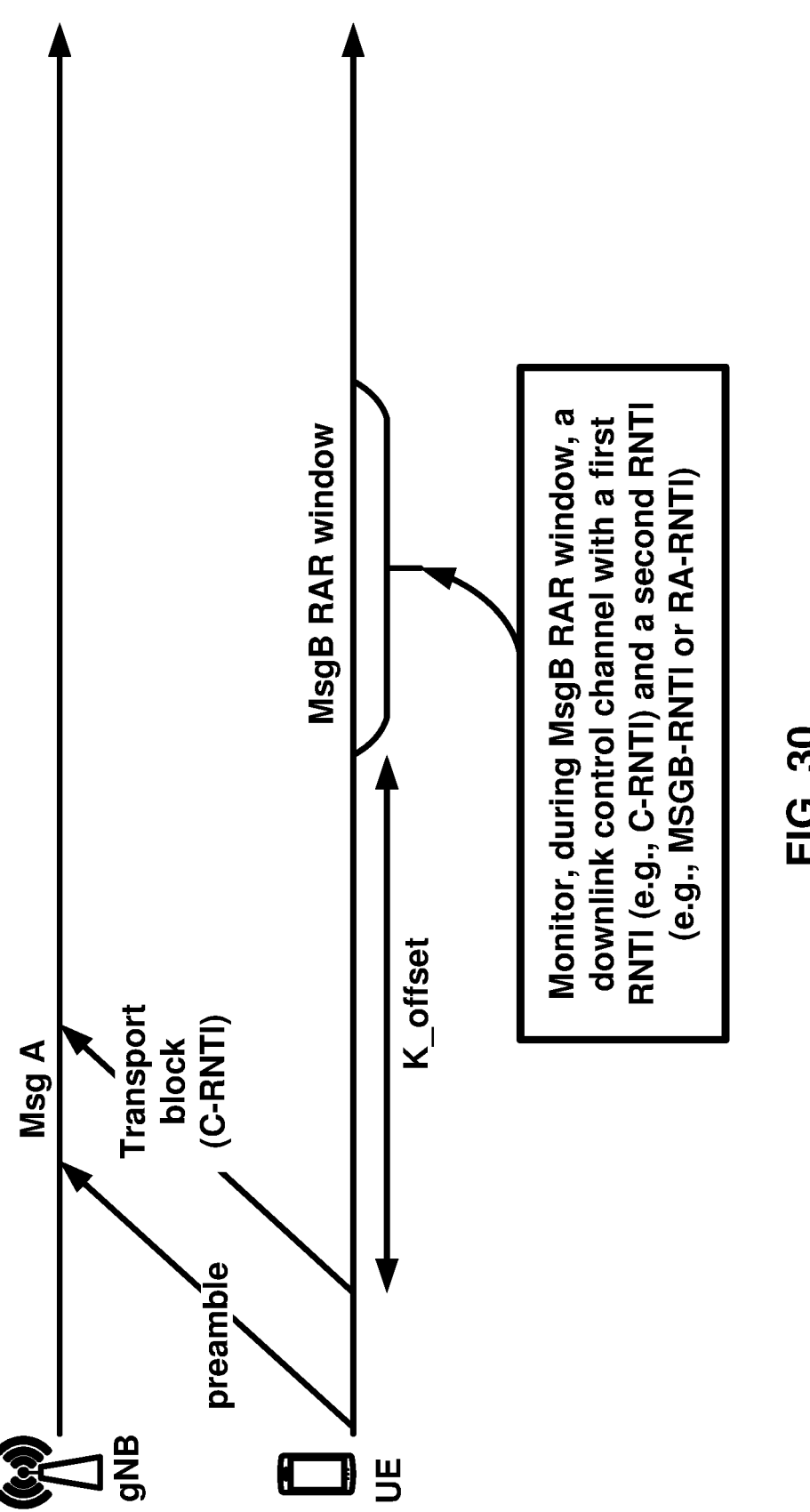
FIG. 30 is an example diagram illustrating a 2-step RA procedure performed between a wireless device and an NTN base station.

FIG. 30 is an example diagram illustrating a 2-step RA procedure performed between a wireless device and an NTN base station. Although not shown in FIG. 30, the wireless device may receive a message comprising a C-RNTI from the base station prior to starting monitoring PDCCH. In an example, an UL transmission (e.g., Msg A in FIG. 30) of a 2-step RA procedure, a wireless device may transmit, via a cell and to a base station, at least one Random Access Preamble (RAP) (e.g., Preamble 1341) and/or one or more transport blocks (e.g., Transport block 1342). For example, the one or more transport blocks may comprise one of data, security information, device information such as IMSI/TMSI, and/or other information such as BSR MAC CE. For example, the one or more transport blocks may comprise a wireless device identifier (ID) that may be used for a contention resolution. In the DL transmission of the 2-step RA procedure, a base station may transmit Msg B (e.g., a random access response (RAR) corresponding to Msg A) that may comprise at least one of following: a timing advance command indicating the TA value, a power control command, an UL grant (e.g., radio resource assignment, and/or MCS), the identifier for contention resolution, an RNTI (e.g., C-RNTI or TC-RNTI), and/or other information. The Msg B 1332 may comprise a preamble identifier corresponding to the preamble in FIG. 30, a positive or negative acknowledgement of a reception of the one or more transport blocks 1342, an implicit and/or explicit indication of a successful decoding of the one or more transport blocks 1342, an indication of fallback to a 4-step RA procedure (e.g., contention-based RA procedure in FIG. 13A or contention-free RA procedure in FIG. 13B), and/or combination thereof.

In an example, a wireless device, by initiating/conducting 2-step RA procedure, may transmit Msg A comprising at least one preamble and at least one transport block. The at least one transport block may comprise an identifier that the wireless device may use for a contention resolution. For example, the identifier may be a C-RNTI (e.g., for a wireless device with RRC Connected). The wireless device may indicate the C-RNTI to the base station based on a particular message format that may be predefined. In an example, the at least one transport block may comprise a C-RNTI MAC CE (e.g., 16 bits fields indicate the C-RNTI) with an LCID in a subheader corresponding to the C-RNTI MAC CE. In an example, the LCID may be used for a base station to identify (detect, parse, and/or decode) the C-RNTI MAC CE from a received signal or message (e.g., MAC PDU) transmitted from the wireless device. The identifier may be sequence(s) and/or number(s) that the wireless device may generate (e.g., for a case that C-RNTI has not been assigned, by the base station, to the wireless device yet). The wireless device may start to monitor a downlink control channel for Msg B corresponding to the Msg A, e.g., after or in response to transmitting the Msg A. A control resource set and/or a search space for monitoring the downlink control channel may be indicated and/or configured by message(s), e.g., broadcast RRC message and/or wireless device specific RRC message, transmitted by a base station. The Msg B may be scrambled by a particular RNTI. The wireless device may determine the particular RNTI based on at least one of following: a time resource index (e.g., an index of a first OFDM symbol of and/or an index of a first slot) of PRACH occasion that the at least one preamble being transmitted, a frequency resource index of PRACH occasion that the at least one preamble being transmitted, a time resource index (e.g., an index of a first OFDM symbol of and/or an index of a first slot) PUSCH occasion that the at least one transport block being transmitted, a frequency resource index of PUSCH occasion that the at least one transport block being transmitted, an indicator (e.g., 0 or 1) of an uplink carrier where the Msg A being transmitted.

In an example, in a 2-step RA procedure, a wireless device may transmit a C-RNTI (e.g., C-RNTI MAC CE indicating the C-RNTI) to a base station via a transmission of Msg A comprising a first transmission of a preamble and a second transmission of a transport block. For example, the transport block may comprise the C-RNTI (e.g., C-RNTI MAC CE indicating the C-RNTI). The wireless device may start to monitor a downlink control channel after or in response to transmitting the Msg A. In an example, the wireless device may start a window (e.g., MsgB RAR window) after or in response to transmitting the Msg A (e.g., the transport block) and monitor the downlink control channel for a response of the Msg A during the window (e.g., MsgB RAR window). The wireless device may receive and/or detect, via the downlink control channel during the window, a PDCCH addressed to C-RNTI. The PDCCH may comprise a DCI indicating a downlink assignment of PDSCH. The wireless device may attempt to receive and/or decode the PDSCH based on the downlink assignment. The downlink assignment may indicate parameters based on which the wireless device receives the PDSCH. For example, the downlink assignment may indicate at least one of following: a frequency domain resource assignment indicator (e.g., in terms of one or more frequency offsets), a time domain resource assignment indicator (e.g., in terms of OFDM symbol and/or slot offsets from a reception timing of the PDCCH, and/or duration of the PDSCH transmission), modulation and coding scheme, redundancy version indicator, a downlink assignment index, PUCCH resource indicator for ACK/NACK transmission of a reception of the PDSCH, transmit power control command of scheduled PUCCH for the ACK/NACK transmission, PDSCH-toHARQ feedback (e.g., the ACK/NACK transmission) timing indicator.

In an example shown in FIG. 30, the wireless device may transmit the C-RNTI (e.g., C-RNTI MAC CE indicating the C-RNTI) to the base station via a Msg A during the 2-step RA procedure. For example, during the 2-step RA procedure, the wireless device may transmit the Msg A comprising a first transmission of a preamble and a second transmission of a transport block. The transport block may comprise the C-RNTI (e.g., C-RNTI MAC CE indicating the C-RNTI). As shown in FIG. 30, the wireless device may start to monitor a downlink control channel with a plurality of RNTIs with an offset (e.g., a time period/window). In an example, the offset may be determined via at least a cell/beam-specific offset received by the wireless device as part of a broadcast system information in order to account for the long propagation delay in an NTN system. In another example, the offset may be determined at least based on the user-specific offset (e.g., K_offset_UE). In another example, the wireless device may autonomously consider the value of offset based on the estimated value of the RTD.

In an example, the plurality of RNTIs may comprise the C-RNTI. The plurality of RNTIs may comprise a MSGB-RNTI. The plurality of RNTIs may comprise an RA-RNTI. The wireless device may determine a MSGB-RNTI and/or RA-RNTI based on the timing (e.g., OFDM symbol, slot, subframe, and/or SFN numbers) and/or frequency indices of radio resources of the first transmission for the preamble and/or the second transmission for the transport block. The wireless device may determine the particular RNTI further based on a preamble index of the preamble and/or a DMRS port index. The wireless device may monitor the downlink control channel during the MSGB RAR window. The wireless device may stop monitoring the downlink control channel is response to receiving, via the downlink control channel during the MSGB RAR window, at least one PDCCH addressed to the C-RNTI and/or MSGB-RNTI (or RA-RNTI).

In an example, the wireless device may successfully receive (and/or detect) the PDCCH addressed to the C-RNTI that wireless device transmitted to the base station but may fail to decode the PDSCH received based on the downlink assignment. The problem in this case is that the wireless device may not transmit a negative acknowledgement (NACK) (e.g., NACK indication using UCI) to the base station in response to determining that the wireless device may not have a valid TA value available for the transmission of the NACK. For example, the wireless device may not transmit a NACK indicating (e.g., using UCI) the reception of the PDSCH to the base station is response to a TA timer of the wireless device being expired. The TA timer of the wireless device may start (or restart) after or in response to receiving a TA command prior to the transmission of the Msg A. The wireless device may not transmit a NACK indication (e.g., using UCI) of a reception of the PDSCH to the base station, if no TA value has been received or the TA timer (e.g., tiemAlignmentTimer) not being running or expired. This may be a case that the wireless device cannot transmit a transport block (or packet, PUSCH) or a control signal (e.g., UCI and/or PUCCH) to the base station after or in response to determining (or identifying), based on detecting a PDCCH addressed to C-RNTI, that a contention resolution being successful (or the base station received Msg A successfully).

In an example, the wireless device may receive the Msg B indicating a retransmission of the at least one transport block. For example, the Msg B indicating a retransmission of the at least one transport block may comprise an UL grant indicating uplink resource(s) used for the retransmission of the at least one transport block.

In an example, the wireless device may consider (or determine) that the 2-step RA procedure being successfully completed based on one or more conditions. At least one of the one or more conditions may be that the Msg B being comprised of a preamble index (or identifier) matching to the at least one preamble that the wireless device transmitted to the base station. At least one of the one or more conditions may be that the Msg B being comprised and/or indicated a contention resolution identifier matched to the identifier that the wireless device transmitted to the base station for the contention resolution.

A wireless device may trigger a BSR in response to uplink data being available for transmission. The wireless device may trigger an SR in response to no uplink radio resource(s) being available for transmission of the uplink data and/or BSR. In response to no uplink radio resource being available for transmission of the uplink data and/or BSR, the wireless device may trigger the SR or trigger/initiate an RA procedure (e.g., 2-step RA procedure) for the triggered BSR. Based on initiating/triggering the 2-step RA procedure for BSR, the wireless device may transmit uplink data (e.g., one or more TBs) and/or BSR MAC CE via a PUSCH resource associated with the 2-step RA procedure. The wireless device may cancel the BSR in response to transmitting a BSR MAC CE (and/or the uplink data when the size of the uplink grant may accommodate the uplink data) via uplink resources. The wireless device may cancel the BSR in response to the BSR MAC CE (and/or the uplink data) being transmitted in the Msg A.

When the wireless device is communicating with an NTN base station with a long propagation delay and a large cell/beam size, using the 2-step RA based BSR may not reduce the data transmission latency, compared with SR based BSR. In an example, RA resources may need to be shared among many wireless devices in a large cell/beam size, each of which may conduct an RA procedure for a particular application (e.g., handover, system information acquisition, beam failure recovery, synchronization, and/or BSR). In some existing technologies, a wireless device may trigger/initiate a 2-step RA procedure in response to data being available for transmission without considering that the RA resources being congested (e.g., due to being shared among many wireless devices). When a communication between a wireless device and a base station is handled via a network with a very large cell/beam (e.g., with radius ranging from several tens of kilometers to several thousand kilometers) such as NTN, performing a 2-step RA procedure for BSR, by a wireless device, may increase the interference on other wireless devices that are using the same RA resources simultaneously (e.g., for handover or SI acquisition or BSR). When each of the several wireless devices initiates a respective RA procedure, collision probability on the RA resources may increase due to the interference. Based on existing technologies, triggering/initiating a 2-step RA for BSR by a wireless device may increase the load on a limited RA resources. This may lead less efficient 2-step RA procedure, e.g., retransmission of Msg A prior to the completion of the RA procedure and/or falling back of the 2-step RA procedure to a 4-step RA procedure. Based on some existing technologies, in an NTN scenario, the 2-step RA procedure for BSR, if not improved, may lead to a reduced RA resource efficiency, increased uplink interferences and/or increased data transmission delay. There is a need to improve RA procedure for a BSR in an NTN network for improving the data transmission latency, reducing power consumption of a wireless device and/or reducing uplink interferences to other wireless devices.

According to embodiments of the present disclosure, a wireless device may trigger/initiate a first 2-step RA procedure, for example, as a result of new data arrival belonging to a first logical channel (e.g., a BSR trigger). The wireless device may trigger/initiate the first 2-step RA procedure, for example, based on the MAC entity selecting the 2-step RA procedure as a response to the triggered BSR.

In an example, the wireless device may trigger/initiate the first 2-step RA procedure based on determining that no SR configurations being configured for the first logical channel triggering the BSR.

In an example, the wireless device may trigger/initiate the first 2-step RA procedure based on determining that no SR configurations being configured for the first logical channel triggering the BSR and the first logical channel being configured with 2-step RA for BSR.

In an example, the wireless device may trigger/initiate the first 2-step RA procedure based on determining that the first logical channel belong to a logical channel group (LCG) configured with a 2-step RA procedure for BSR.

Based on initiating/triggering the first 2-step RA procedure for BSR, the wireless device may transmit uplink data (e.g., one or more TBs) and/or BSR MAC CE via a PUSCH resource associated with the 2-step RA procedure. The wireless device may cancel the BSR in response to transmitting a BSR MAC CE (and/or the uplink data when the size of the uplink grant may accommodate the uplink data) via uplink resources. The wireless device may cancel the BSR in response to the BSR MAC CE (and/or the uplink data) being transmitted in the Msg A. In an example, the BSR MAC CE may be a Long or Short BSR MAC CE.

In an example, the wireless device may determine that a first 2-step RA procedure for a BSR is completed. In an example, the first 2-step RA procedure may be successfully completed e.g., by receiving an UL grant via a Msg B in response and/or after transmitting a Msg A.

In an example, the first 2-step RA procedure may be successfully completed e.g., by receiving an UL grant via Msg 4 in response and/or after transmitting a Msg 3 that is transmitted based on receiving a fallbackRAR MAC sub-PDU via Msg B. In an example, the Msg B may be received in response and/or after transmitting a Msg A.

In an example, the first RA procedure may be successfully completed based on determining that a MAC PDU is transmitted using one or more UL grants other than one or more UL grants provided via the Msg B (e.g., the Msg B is received in response and/or after transmission of the Msg A). In an example, the MAC PDU may accommodate one or more pending data (e.g., all pending data) available for transmission.

In an example, the first RA procedure may be successfully completed based on determining that a MAC PDU is transmitted using one or more UL grants other than one or more UL grants provided via the Msg 4 (e.g., the Msg 4 is received in response and/or after transmission of a Msg 3 that is transmitted based on a MsgB fallbackRAR MAC subPDU). In an example, the MAC PDU may accommodate one or more pending data (e.g., all pending data) available for transmission.

In an example, the first 2-step RA procedure may be unsuccessfully completed, e.g., by receiving a command from the MAC entity ordering abortion/cancellation of the first RA procedure prior to receiving one or more UL grants for the transmission of the UL data.

In an example, the first 2-step RA procedure may be unsuccessfully completed, e.g., by reaching the maximum preamble transmission limit under the first 2-step RA procedure.

In an example, the first 2-step RA procedure may be unsuccessfully completed based on determining that it is aborted/cancelled as a result of initiating/triggering a new random access procedure by the wireless device. In an example, the new RA procedure may not be triggered/initiated as a result of a triggering BSR.

In an example, the new RA procedure may be a 2-step RA procedure. In an example, Msg A may not comprise a BSR MAC CE. In an example, a MAC PDU of the Msg A transmitted by initiating/triggering the new RA procedure may comprise a Long or Short Truncated BSR MAC CE. In an example, the MAC PDU of the Msg A transmitted by initiating/triggering the new RA procedure may not comprise a Long or Short BSR MAC CE.

In an example, the new RA procedure may be a 4-step RA procedure. In an example, a MAC PDU of a Msg 3 transmitted by initiating/triggering the new RA procedure may comprise a Long or Short Truncated BSR MAC CE. In an example, the MAC PDU of the Msg 3 transmitted by initiating/triggering the new RA procedure may not comprise a Long or Short BSR MAC CE.

In an example, after the completion of the first RA procedure a new data belonging to a second LCH may arrive. The arrival of new data may trigger a second BSR in response to determining, by the wireless device, that no UL-SCH resource(s) being available for the transmission of the UL data. In an example, the determining the no UL-SCH resources being available for the UL data transmission may be as a result of logical channel prioritization (LCP) procedure. In an example, the wireless device may trigger an SR in response to the second BSR.

In an example, the wireless device may prohibit (e.g., not initiate/trigger) a second RA procedure based on determining that the first RA procedure being successfully or unsuccessfully completed. In an NTN scenario with a large cell/beam size, the wireless device may restrict the use of a 2-step RA procedure for BSR, for example, in order to reduce a congestion of the RA resources and/or reduce the interferences on the other wireless devices.

In an example, when a first 2-step RA procedure for a first BSR being completed, by prohibiting (e.g., not triggering/ initiating) the second RA procedure for a second BSR, the wireless device may receive one or more uplink grants which may accommodate a transmission of the uplink data, or a transmission of a BSR MAC CE. Considering the long propagation delay of an NTN network and/or the large cell/beam size of the NTN network, prohibiting (e.g., not triggering/initiating) the second RA procedure may improve the data transmission latency of the wireless device. In an example, the wireless device by prohibiting (e.g., not triggering/initiating) the second RA procedure may use available UL resource(s) (e.g., Type1 and/or Type 2 configured grants) for reporting BSR MAC CE or the available data. In the example embodiment, based on transmitting uplink data via the uplink grant, the wireless device may not trigger the second RA procedure for improving the RA resource efficiency. Example embodiments may reduce uplink interferences to other wireless devices. In the example embodiment, based on transmitting uplink data via the uplink grant, the wireless device may not trigger the second RA procedure for improving the power consumption of the wireless device. Example embodiments may reduce power consumption of the wireless device.

In an example embodiment, the wireless device may delay the triggering/initiating the second RA procedure. By delaying triggering the second RA procedure for the second BSR, the wireless device may reduce a possibility of RA congestion in an NTN scenario with many wireless devices in a large cell/beam. Example embodiments may reduce a possibility of congesting RA resources in an NTN scenario.

In an example embodiment, when a communication between a wireless device and a base station being handled via an NTN network with a long propagation delay, the wireless device, by delaying triggering the second RA procedure for the second BSR, may reduce possibility of unnecessary triggering the second 2-step RA procedure, e.g., when the second logical channel triggering the BSR has small data volume or tolerable latency requirement.

In the present disclosure, when a wireless device not initiating/triggering an RA procedure, the RA procedure may be considered as cancelled/aborted. For a cancelled/ aborted 2-step RA procedure, the wireless device may cancel transmission of the corresponding Msg A. In an example, for a cancelled/aborted RA procedure (e.g., 4-step RA procedure), the wireless device may cancel the transmission of a preamble. In an example, for a cancelled/aborted RA procedure, the wireless device may cancel the transmission of a Msg 3.

In an example, the wireless device, prior to the cancelation/abortion of an RA procedure, may perform random access resource selection.

Based on determining that an RA procedure being cancelled/aborted the wireless device may not monitor PDCCH for receiving one or more DL messages (e.g., DCI) in response to a transmitted preamble. In an example, based on determining that an RA procedure being cancelled/aborted the wireless device may not monitor PDCCH for receiving one or more DL messages (e.g., DCI) in response to a transmitted Msg A. In another example, based on determining that an RA procedure being cancelled/aborted the wireless device may not monitor PDCCH for receiving one or more DL messages (e.g., DCI) in response to a transmitted Msg 3.

In the present disclosure, the wireless device may initiate/ trigger a 2-step RA procedure by preforming resource selection for transmitting a preamble on a valid RACH occasion and one or more payload (e.g., transport blocks) using associated PUSCH occasion that is mapped to the preamble occasion of the RACH preamble. In an example, the initiation of a 2-step RA procedure may imply the transmission of a Msg A comprising a preamble and one or more TBs via an UL resource of the 2-step RA procedure. In another example, the initiation of a 2-step RA procedure may imply the transmission of a preamble corresponding to a Msg A.

In the present disclosure, the wireless device may initiate/ trigger a 4-step RA procedure by preforming resource selection for transmitting a preamble on a valid RACH occasion. In an example, the initiation of a 4-step RA procedure may imply the transmission of the preamble.

Figure 31:
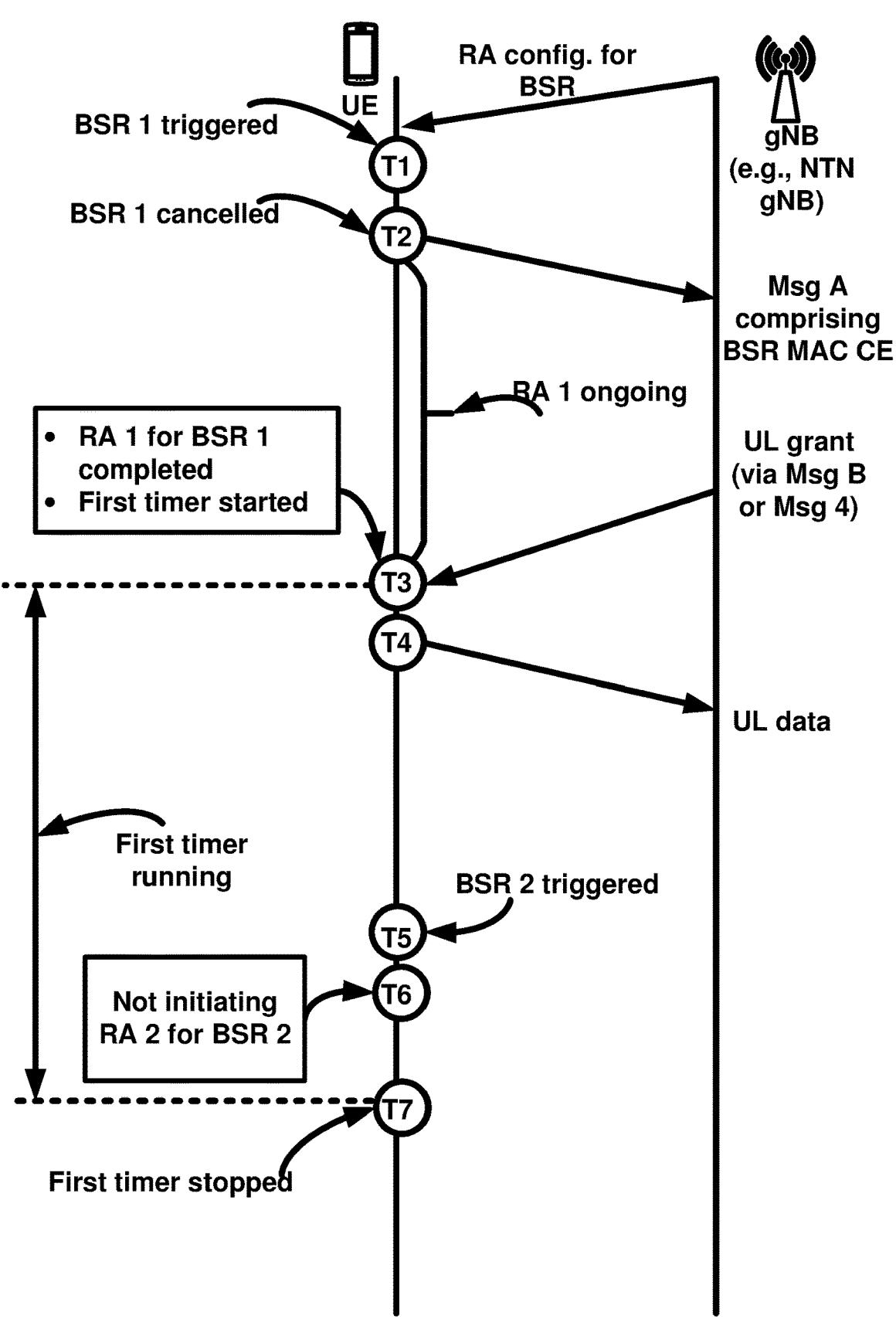
FIG. 31 shows an example of RA based BSR procedure in an NTN network, in accordance with certain aspects of the present disclosure.

FIG. 31 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment, the configuration parameters may indicate that the wireless device may initiate/trigger an RA procedure with a 2-step RA (e.g., based on example embodiments described above with respect to FIG. 13C) for a BSR. In an example, the BSR may be triggered by arrival of a new data (e.g., regular BSR) belonging to a logical channel.

For example, the configuration parameters may indicate that the wireless device may initiate/trigger a 2-step RA procedure for a BSR triggered by the arrival of a new data (e.g., regular BSR) belonging to one or more logical channels. In an example, the one or more logical channel may belong to a logical channel group (LCG).

In an example, the configuration parameters may comprise first configuration parameters of one or more RACH resources (occasions) of the 2-step RA for the BSR. The configuration parameters may indicate one or more preambles and/or one or more SSBs associated with the BSR. The configuration parameters may further comprise second configuration parameters of one or more PUSCH resources of the 2-step RA associated with the BSR.

In an example, the configuration parameters may indicate that the wireless device may perform an SR for the BSR triggered by arrival of a new data (e.g., regular BSR) belonging to a logic channel. In an example, the configuration parameters may indicate that the wireless device may perform an SR for the BSR triggered by arrival of a new data (e.g., regular BSR) belonging to one or more logic channels. In an example, the configuration parameters may comprise a third configuration parameters of the SR associated with the BSR.

In an example embodiment, the configuration parameters may indicate that the wireless device may not perform an SR for the BSR triggered by arrival of a new data (e.g., regular BSR) belonging to a logical channel or one or more logical channels (e.g., belonging to a logical channel group). The third configuration parameters of the SR may be absent in the configuration parameters.

In an example embodiment, the configuration parameters may further comprise the fourth configuration parameters indicating a first timer. In another example, the configuration parameters may further comprise the fourth configuration parameters indicating the first timer and a priority threshold. In another example embodiment, the priority threshold may be absent from the configuration parameters.

The fourth configuration parameters may be configured for a logical channel being configured with a 2-step RA procedure for BSR. In an example, the fourth configuration parameters may be configured for one or more logical channels being configured with a 2-step RA procedure for BSR. In another example, the fourth configuration parameters may be configured for one or more logical channels belonging to one or more logical channel groups.

In an example embodiment shown in FIG. 31, the wireless device may trigger a first BSR in response to a new uplink data becoming available at time T1 (e.g., BSR 1). In an example, the new data may belong to a first LCH, being available for transmission.

In an example, the wireless device may trigger an SR in response to no uplink radio resource(s) being available for transmission of the uplink data. In an example, wireless device may trigger a 2-step RA for the first BSR in response to no uplink radio resource(s) being available for transmission of the uplink data.

In an example, in response to both SR and 2-step RA being configured, a wireless device may determine whether to trigger a 2-step RA based BSR or to trigger a SR based BSR, based on at least one of: whether the SR is absent from the configuration parameters, whether the 2-step RA for BSR is configured, RSRP of the downlink pathloss reference, a propagation delay parameter, whether an SR transmission occasion (e.g., a PUCCH resource) is earlier than a 2-step RACH transmission occasion, QoS and/or delay requirement of the logical channel, whether the priority of the logical channel triggered the first BSR is higher than a configured threshold, whether the volume of the data in the buffer is larger than a configured threshold, whether the triggered BSR is due to the expiry of the BSR retransmission timer (e.g., retxBSR-Timer).

In response to both SR and 2-step RA being configured for the first BSR, the wireless device may determine whether to trigger a 2-step RA based BSR based on determining that the first timer not being running. In an example, the wireless device upon (or based on) determining that the first timer is running may not initiate/trigger a first 2-step RA procedure for the first BSR. In an example, the wireless device upon (or based on) determining that the first timer is not running may initiate/trigger the first 2-step RA procedure for the first BSR.

As shown in FIG. 31, the wireless device may trigger the first 2-step RA procedure (e.g., RA 1 procedure) at time T2. Based on initiating/triggering the RA 1 procedure, the wireless device may transmit a Msg A comprising a preamble and a PUSCH resource associated with the first 2-step RA procedure. The wireless device may cancel the first BSR in response to the transmitting the Msg A comprising BSR MAC CE. In an example, the wireless device may not cancel the first BSR based on determining that the Msg A comprises a Long or Short Truncated BSR MAC CE.

In an example shown in FIG. 31, the wireless device may determine that (at time T3) the ongoing RA procedure (e.g., RA 1 procedure) is completed.

In an example, the wireless device may start monitoring a PDCCH for a contention resolution message during a contention resolution window (e.g., MsgB RAR window), wherein the wireless device may start to monitor the PDCCH over a (variable) time period/window after the PUSCH message comprising the BSR MAC CE (e.g., the Msg A or a retransmission of the Msg A) being transmitted. In an example, the ongoing RA procedure may be successfully completed based on determining that one or more UL grants for transmission of UL data being indicated via a Msg B in response to and/or after the transmission of the Msg A or a retransmission of the Msg A.

In an example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., Msg A) being transmitted. In an example, the wireless device may receive a fallbackRAR MAC subPDU indicating an UL grant for the transmission of a Msg 3. The wireless may obtain a MAC PDU for transmitting the Msg 3 from a buffer of the Msg A comprising BSR MAC CE. The wireless device may store the MAC PDU of the Msg 3 in a buffer of the Msg 3. In an example, the wireless device may transmit the Msg 3 comprising the BSR MAC CE and, in response to the transmission of the Msg 3, start monitoring the PDCCH over a (variable) time window for a contention resolution message during a contention resolution window (e.g., when contention resolution timer being running). In an example, the wireless device may receive an indication of one or more UL grants, for transmission of UL data, via Msg 4 while monitoring PDCCH over the contention resolution window. Upon (or based on) receiving the one or more UL grants, the ongoing RA procedure may be successfully completed.

In an example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., the Msg A or a retransmission of the Msg A) being transmitted. In an example, the wireless device may receive the Msg B comprising a backoff indicator MAC subPDU indicating a retransmission of Msg A. In an example, the wireless device may choose a backoff time (e.g., based on the received backoff indicator MAC subPDU) and retransmit the Msg A in response and/or after the backoff time being expired. In an example, the wireless device may start monitoring a PDCCH for a contention resolution message during a contention resolution window (e.g., msgB RAR window) after and/or in response to the retransmitting the Msg A. In an example, the ongoing RA procedure may be successfully completed based on determining that an UL grant for transmission of UL data being received via Msg B in response to and/or after the retransmission of the Msg A.

The description provided hereinabove regarding the determining the successful or unsuccessful completion of an ongoing RA procedure for BSR may not be considered limited to examples provided in this disclosure. While, by way of the provided examples, several details of the exemplary set of embodiments regarding the successful or unsuccessful completion of an RA procedure for BSR are provided, it will be recognized by those of skill in the art that any number of variations on or alternatives to the specific details of the exemplary embodiments may be implemented if desired.

Based on determining that the RA 1 procedure being successfully completed, the wireless device may process the one or more UL grants and instruct the physical layer to transmit the UL data (at time T4 in FIG. 31).

As shown in FIG. 31 the wireless device may start the first timer based on determining that the first RA procedure, initiated/triggered in response to the first triggering BSR, being successfully completed.

In an example, while the first timer is running new data belonging to a second LCH may arrive, triggering a second BSR (BSR 2 in FIG. 31 at time T5). In an example, BSR 2 may be triggered in response to an expiry of the BSR retransmission timer (e.g., retxBSR-Timer) when data belonging to one or more logical channels (e.g., including the first LCH) is available. In an example, the BSR 2 may be triggered in response to determining, by the wireless device, that the UL grant(s) received at time T3 not being enough to accommodate the available data in the buffer for the first LCH. In an example, the second LCH is the first LCH.

In an example embodiment, the wireless device, based on determining that the first timer is running and BSR 2 is triggered may not initiate/trigger a second RA procedure (e.g., the RA 2 procedure). In another example embodiment, the wireless device, based on determining that the first timer is running and BSR 2 is triggered may not trigger/initiate the second RA procedure (e.g., the RA 2 procedure) when the second LCH being configured with a 2-step RA configuration.

In an example, the wireless device by not initiating/triggering the RA 2 procedure may initiate an SR procedure based on determining that the second LCH being configured with an SR configuration. In an example, when RA resources being congested in an NTN scenario with a large cell/beam size, triggering the SR procedure instead of triggering the RA 2 may reduce the probability of collisions over the RA resources and/or reduce the interferences over the other wireless devices.

In an example embodiment, the wireless device, based on determining that the first timer is running and the second BSR is triggered, may not initiate/trigger the second RA procedure (e.g., 4-step RA procedure) in response to determining that the second LCH not being configured with an SR configuration.

In an example, by not triggering/initiating the second RA procedure, the wireless device, after triggering the second BSR at time T5 in FIG. 31 and before the expiry of the first timer, may receive one or more uplink grants. In an example, the received one or more UL grants may accommodate the uplink data. In an example, the received one or more UL grants may accommodate a BSR MAC CE. In an example, the wireless device by not initiating/triggering the second RA procedure may use available UL resource(s) (e.g., one or more UL-SCH resources may become available after triggering the second BSR at time T5 in FIG. 31 and before the expiry of the first timer at time T7) for reporting the available data or the BSR MAC CE. In an example, the wireless device by not triggering the second RA procedure may improve the RA resource efficiency and/or reduce data transmission latency.

In an example, the wireless device may wait until the expiry of the first timer (at time T7 in FIG. 31) and initiate/trigger the RA 2 based on determining that BSR 2 being pending at time T7. By delaying triggering the second RA procedure for the second BSR, the wireless device may reduce interferences over other wireless devices using the RA resources.

In an example embodiment, configuring the first timer may strike a balance between the load of RA resources across different applications (e.g., handover, SI request, beam failure recovery, and/or BSR) and QoS requirement of a logical channel triggering an BSR. In an example, when the value range of the first timer being sufficiently large (e.g., relative to a propagation delay of an NTN scenario), the use of a 2-step RA procedure for BSR over the SR for BSR procedure may be demoted in order to reduce the interference over other wireless devices and/or reducing RA congestion. In an example, when the value range of first timer being sufficiently small (e.g., relative to the propagation delay of an NTN scenario), the use of a 2-step RA procedure for BSR over the SR for BSR procedure may be promoted in order to improve data transmission latency (e.g., delay sensitive applications and/or the cases that the volume of the arrived data being larger than a threshold) when RA resources not being congested.

Figure 32:
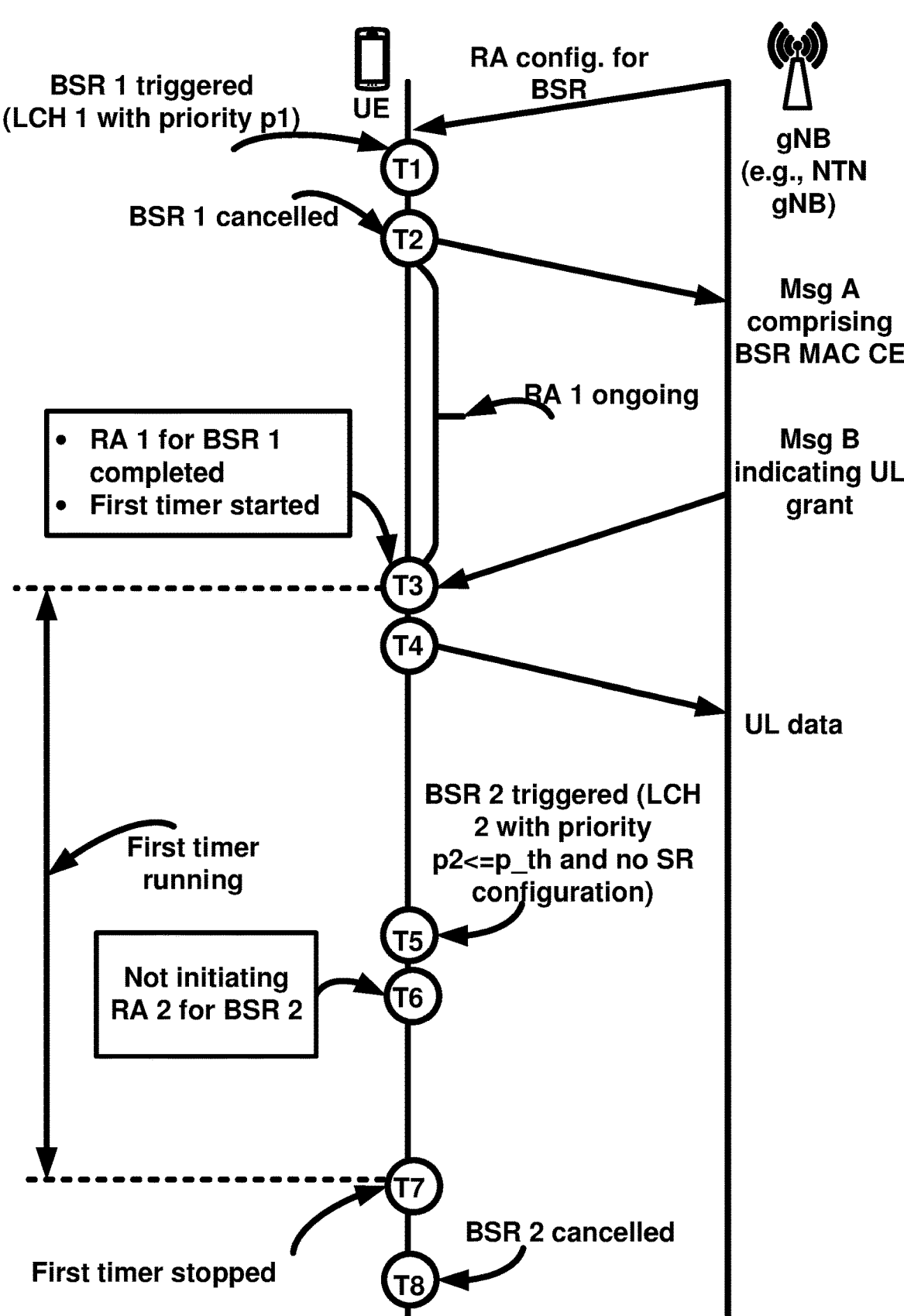
FIG. 32 shows an example of RA based BSR procedure in an NTN network, in accordance with certain aspects of the present disclosure.

FIG. 32 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment shown in FIG. 32, the wireless device may trigger a first BSR in response to uplink data being available for transmission at time T1 (e.g., BSR 1). In an example, the uplink data may belong to a first LCH with priority p1.

As shown in FIG. 32, the wireless device may trigger the first 2-step RA procedure (e.g., RA 1 procedure) at time T2 (e.g., based on determining that the first timer is not running, and the first logical channel is configured with a 2-step RA procedure for BSR). Based on initiating/triggering the RA 1 procedure, the wireless device may transmit a preamble and BSR MAC CE via a PUSCH resource associated with the first 2-step RA procedure (e.g., a Msg A). The wireless device may cancel the first BSR at time T2 in FIG. 32.

In an example shown in FIG. 32, the wireless device may determine that at time T3 the ongoing RA procedure (e.g., RA 1 procedure) being completed. In an example, the ongoing RA procedure may be successfully completed (e.g., based on determining that one or more UL grants for transmission of UL data being received). In an example shown in FIG. 32, one or more UL grants may be received via Msg B in response to or after the transmission of the Msg A. Based on determining that the RA 1 procedure is successfully completed, the wireless device may transmit the UL data (at time T4 in FIG. 32) via the received one or more UL grants.

As shown in FIG. 32 the wireless device may start the first timer based on determining that the first RA procedure is successfully completed. In an example, the first RA procedure initiated/triggered in response to the first BSR.

In an example, while the first timer is running a new data, belonging to a second LCH with priority p2 may arrive. In an example, by the arrival of the new data belonging to the second LCH, the wireless device may trigger a second BSR (the BSR 2 in FIG. 32) at time T5.

In an example shown in FIG. 32, the LCH 2 triggering the second BSR may be configured with no SR configuration parameters. In an example, the priority of the second LCH (e.g., p2) may be lower than or equal to the priority threshold (e.g., p_th). In an example, the priority threshold may be configured via the fourth configuration parameters.

In an example embodiment, the wireless device, based on determining that the first timer is running, the first RA procedure for BSR is completed, and the priority of LCH 2 (e.g., p2) is lower than or equal to the priority threshold (e.g., p_th), may not initiate/trigger a second RA procedure (e.g., RA 2 procedure).

In an example, by not triggering/initiating the second RA procedure based on the priority of the second logical channel being lower than or equal to the priority threshold, the wireless device may prioritize reducing RA resource congestion over QoS requirement of one or more logical channels. the wireless device may receive one or more UL grants until the expiry of the first timer which may accommodate a transmission of the uplink data, or a transmission of a BSR MAC CE. In an example, the wireless device by not initiating/triggering the second RA procedure may use available UL resource(s) for reporting the available data or the BSR MAC CE, improving the RA resource efficiency.

In an example, the wireless device may wait until the expiry of the first timer (at time T7 in FIG. 32) and initiate/trigger the RA 2 based on determining that BSR 2 is pending at time T7. In an NTN scenario with large cell/beam size, by delaying triggering the second RA procedure for the second BSR, the wireless device may reduce interferences over other wireless devices using the RA resources.

Figure 33:
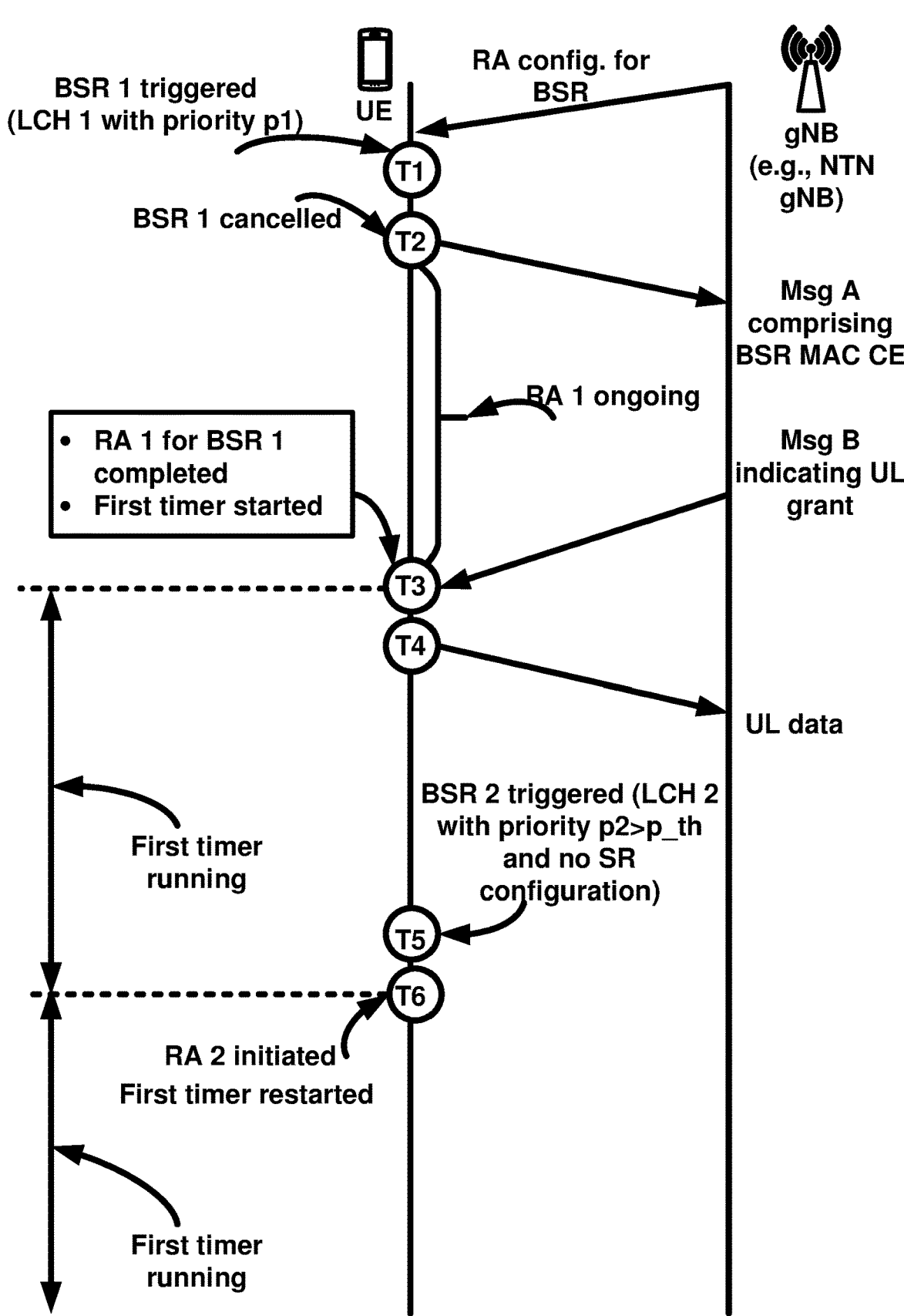
FIG. 33 shows an example of RA based BSR procedure in an NTN network, in accordance with certain aspects of the present disclosure.

FIG. 33 shows an example of RA based BSR procedure in an NTN network, in accordance with certain aspects of the present disclosure. In an example, a wireless device may receive, from a base station of an NTN system, one or more RRC messages comprising configuration parameters of a BSR.

In an example embodiment shown in FIG. 33, the wireless device may trigger a first BSR in response to uplink data belonging to a first LCH with priority p1 becomes available for transmission at time T1 (e.g., BSR 1). As shown in FIG. 33, the wireless device may trigger the first 2-step RA procedure (e.g., RA 1 procedure) at time T2 (e.g., based on determining that the first timer is not running, and the first logical channel is configured with a 2-step RA procedure). Based on initiating/triggering the RA 1 procedure, the wireless device may transmit a preamble and BSR MAC CE via a PUSCH resource associated with the first 2-step RA procedure (e.g., Msg A). The wireless device may cancel the first BSR at time T2 in FIG. 33.

In an example shown in FIG. 33, the wireless device may determine that at time T3 the ongoing RA procedure (e.g., RA 1 procedure) is completed. In an example, the ongoing RA procedure may be successfully completed (e.g., based on determining that an UL grant for transmission of UL data being received). In an example shown in FIG. 33, the UL grant may be received via Msg B in response to or after the transmission of Msg A. Based on determining that the RA 1 procedure is successfully completed, the wireless device may transmit the UL data (at time T4 in FIG. 33).

As shown in FIG. 33 the wireless device may start the first timer based on determining that the first RA procedure initiated/triggered in response to the first BSR (e.g., the Msg A being comprised the BSR MAC CE) is successfully completed.

In an example, while the first timer is running a new data belonging to a second LCH with priority p2 may arrive. In an example, the arrival of the new data may trigger a second BSR (BSR 2 in FIG. 33) at time T5. In an example shown in FIG. 33, the LCH 2 triggering the second BSR may be configured with no SR configuration parameters. In an example, the priority of LCH 2 (e.g., p2) may be higher than the priority threshold (e.g., p_th). In an example, the priority threshold may be indicated via the fourth configuration parameters.

In an example embodiment, the wireless device, based on determining that the first timer is running, the first RA procedure is completed, and the priority of LCH 2 (e.g., p2), triggering the second BSR, is higher than the priority threshold (e.g., p_th) may initiate/trigger a second RA procedure (e.g., RA 2 procedure). In an example, upon (or based on) triggering/initiating the second RA procedure, the wireless device may restart the first timer.

In an example, the second LCH may not be configured with a 2-step RA procedure for BSR. In an example, the second RA may be a 4-step RA procedure. The wireless device may transmit a preamble in response to initiating the 4-step RA procedure. In another example, the second LCH may be configured with a 2-step RA procedure for BSR. In an example, the second RA may be a 4-step RA procedure (e.g., the wireless device may select the 4-step RA procedure based on an RSRP of the downlink pathloss reference). The wireless device may transmit a preamble in response to initiating the 4-step RA procedure.

In an example, the second RA procedure may be a 2-step RA procedure. Based on initiating/triggering the RA 2 procedure, the wireless device may transmit a preamble and BSR MAC CE via a PUSCH resource associated with the second 2-step RA procedure (e.g., a Msg A). In an example, the wireless device may cancel the second BSR.

In an example, the second logical channel may be configured with a 2-step RA procedure for BSR. Based on initiating/triggering the RA 2 procedure, the wireless device may transmit a preamble and a Long/Short Truncated BSR MAC CE via a PUSCH resource associated with the second 2-step RA procedure (e.g., a Msg A). In an example, the wireless device may not cancel the second BSR.

In an example, by triggering/initiating the second RA procedure based on the priority of the second logical channel being higher than the priority threshold, the wireless device may prioritize QoS requirement of one or more logical channels over the load on RA resources. In an example, in an NTN scenario with a long propagation delay, the wireless device may improve the data transmission latency by triggering the second RA procedure.

Figure 34:
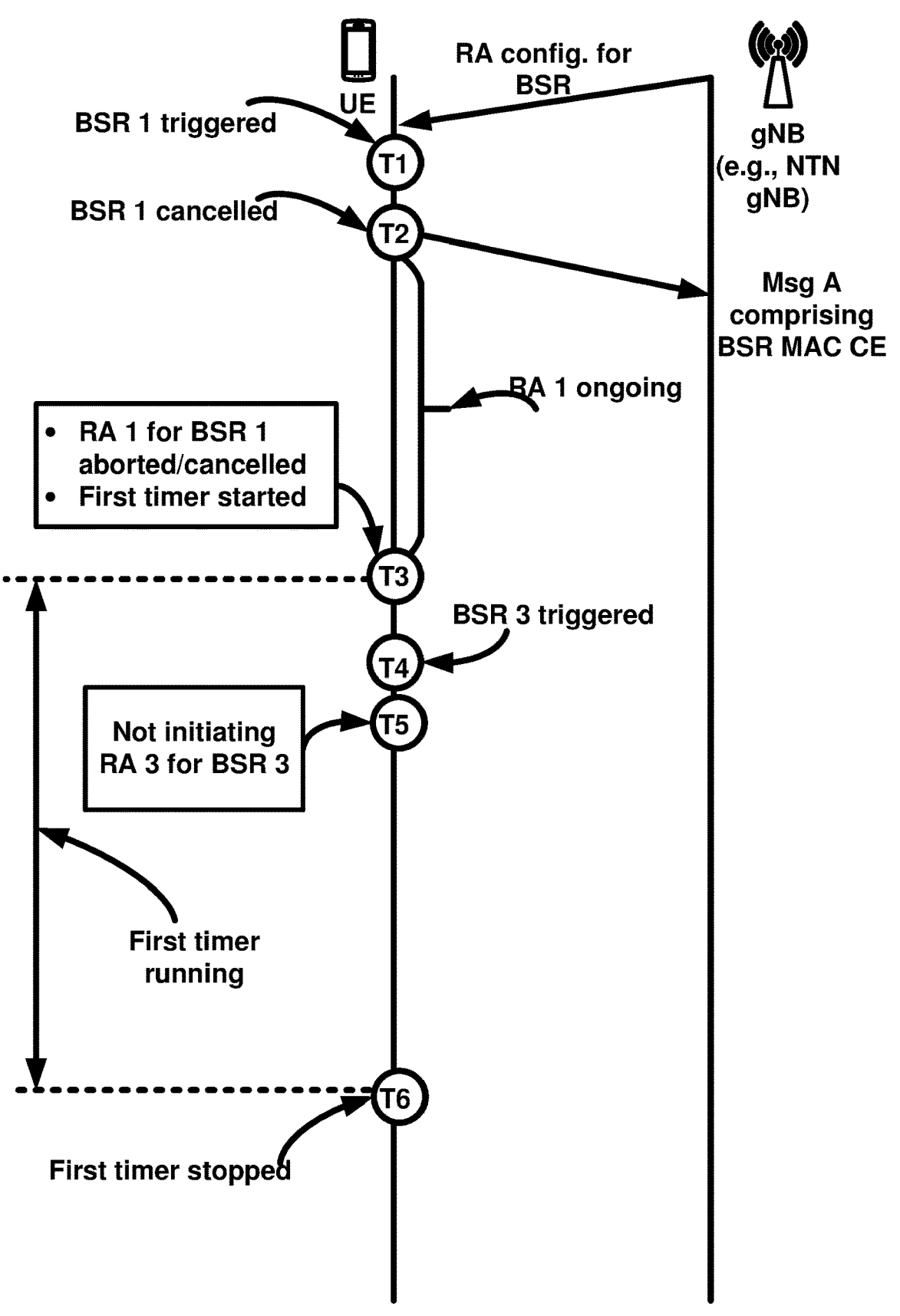
FIG. 34 shows an example of RA based BSR procedure in an NTN network, in accordance with certain aspects of the present disclosure.

FIG. 34 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR comprising the first timer.

In an example embodiment shown in FIG. 34, the wireless device may trigger a BSR in response to uplink data belonging to a first LCH being available for transmission at time T1 (e.g., BSR 1). As shown in FIG. 34, the wireless device may trigger a first 2-step RA procedure (e.g., RA 2 procedure) at time T2 (e.g., based on determining that the first LCH is configured with 2-step RA procedure and the first timer is not running). Based on initiating/triggering the first RA procedure, the wireless device may transmit BSR MAC CE via a PUSCH resource available for the 2-step RA procedure (e.g., a Msg A). In an example, the wireless device may cancel the BSR in response to transmitting a BSR MAC CE via the Msg A. The wireless device may cancel the first BSR in response to the BSR MAC CE being transmitted via the Msg A.

In an example shown in FIG. 34, the wireless device may abort/cancel the ongoing RA procedure (e.g., RA 1 procedure) at time T3. In an example, the wireless device may consider the first RA procedure being unsuccessfully completed upon (or based on) the canceling/aborting the first RA procedure.

In an example, the ongoing RA procedure may be aborted/cancelled based on determining that a second RA procedure being triggered as a result of beam failure recovery procedure, handover procedure, or a higher layer order (e.g., the MAC layer order). In an example, the second RA procedure may not be triggered as a result of a regular BSR. In an example, via the second RA procedure, the wireless device may transmit a MAC PDU comprising no BSR MAC CE (e.g., via a Msg 3 or a Msg A). In another example, the wireless device may transmit a MAC PDU comprising a Long/Short Truncated BSR MAC CE (e.g., via a Msg A or a Msg 3).

The wireless device may start the first timer upon (or based on) aborting/cancelling the RA 1 procedure at time T3 in FIG. 34. In an example, the wireless device may start the first timer based on determining that the first RA procedure, initiated/triggered due to the first BSR, is unsuccessfully completed. In an example, the second RA may be a 4-step RA procedure.

In an example, the wireless device may start the first timer upon (or based on) the transmission of a second preamble (e.g., the second preamble is transmitted in response to triggering/initiating the second RA procedure). In an example, the wireless device may transmit a Msg 3 in response to or after the transmission of the preamble comprising a Long/Short Truncated BSR MAC CE. In an example, the Msg 3 may not comprise a Long/Short BSR MAC CE. In an example, the Msg 3 may not comprise a BSR MAC CE.

In an example, the second RA may be a 2-step RA procedure. In an example, upon (or based on) the initiating the second 2-step RA procedure, the wireless device may start the first timer when a preamble associated to a Msg A is transmitted.

In an example, the Msg A may comprise a Long/Short Truncated BSR MAC CE. In another example, the Msg A may not comprise a Long/Short BSR MAC CE.

In another example, in response to determining that the second RA procedure is a 2-step RA procedure, upon (or based on) the initiating the second 2-step RA procedure, the wireless device may start the first timer after the RACH occasion of the Msg A.

In another example, based on determining that the second RA procedure being a 2-step RA procedure, in response to the initiating the second 2-step RA procedure, the wireless device may start the first timer from the PUSCH occasion that the preamble being mapped to.

In an example shown in FIG. 34, while the first timer is running and the BSR3 is triggered, a new data may arrive (e.g., belonging to a third LCH). In an example, the arrival of the new data may trigger a third BSR (the BSR 3 in FIG. 34) at time T4 in FIG. 34.

In an example, the BSR 3 may be triggered in response to an expiry of the BSR retransmission timer when data belonging to one or more logical channels (e.g., the first LCH) is available. For example, the third logical channel may be the first logical channel.

In an example embodiment, based on determining that the first timer is running and the BSR 3 is triggered, the wireless device may not trigger/initiate a third RA procedure (e.g., the RA 3 procedure in FIG. 34). In an example, the wireless device may wait until the expiry of the first timer (at time T6 in FIG. 34) and initiate/trigger the RA 3 based on determining that the BSR 3 is pending at time T6. In an NTN scenario with a large cell/beam size, the wireless device by delaying the triggering of the third RA procedure may reduce interferences over other wireless devices.

In an example embodiment, when the third LCH is configured with a 2-step RA procedure for BSR, the wireless device, based on determining that the first timer is running, may not trigger/initiate the third RA procedure.

In an example, the wireless device by not initiating/triggering the RA 3 procedure may initiate an SR procedure based on determining that the third LCH is configured with one or more SR configuration parameters. The benefit of not initiating the third RA procedure may be a reducing of the load on RA resources in an NTN scenario with large cell/beam size. In an example, the wireless device by not initiating/triggering the RA 3 procedure may use available UL resource(s) (e.g., configured grants) to report BSR MAC CE and/or available data.

In an example embodiment, the wireless device, based on determining that the first timer is running, the BSR 3 is triggered, and the third LCH is configured with no SR configuration may not trigger/initiate the third RA procedure. In another example, the wireless device, based on determining that the first timer is running, the BSR 3 is triggered, the priority of the third LCH triggering the third BSR is smaller than or equal to the priority threshold, and the third LCH being configured with no SR configuration may not trigger/initiate the third RA procedure. In an example embodiment, the wireless device, based on determining that the first timer is running, the BSR 3 is triggered, the third LCH is configured with no SR configuration, and the priority of the third LCH is higher than the priority threshold may trigger/initiate the third RA procedure. In an example, upon (or based on) triggering the third RA procedure the wireless device may restart the first timer.

In an example, while the first timer is running, the wireless device may not initiate/trigger a fourth RA procedure triggered by a fourth triggering BSR. In an example, the fourth BSR may be triggered as a result of a new data becoming available.

A wireless device may trigger a BSR in response to uplink data is available for transmission. In response to no uplink radio resource is available for transmission of the uplink data, a wireless device may trigger an SR or trigger (e.g., select) a 2-step RA. Based on initiating/triggering the 2-step RA procedure for BSR, the wireless device may transmit uplink data (e.g., one or more TBs) and/or BSR MAC CE via a PUSCH resource associated with the 2-step RA procedure (e.g., a Msg A). The wireless device may cancel the BSR in response to transmitting a BSR MAC CE (and/or the uplink data when the size of the uplink grant may accommodate the uplink data) via uplink resources. The wireless device may cancel the BSR in response to the BSR MAC CE (and/or the uplink data) being transmitted in the Msg A. In an NTN scenario with a long propagation delay, compared with SR based BSR, using the 2-step RA based BSR the data transmission latency may be reduced.

The wireless device, by implementing existing technologies, may trigger parallel BSRs during an ongoing RA procedure (triggered for a triggering BSR). Triggering parallel BSRs during the RA procedure may also trigger multiple RA procedures. In an NTN system, when a first RA procedure for an BSR (e.g., a first BSR associated with a first LCH) is ongoing, a new data may arrive that may trigger a second BSR (e.g., associated with a second LCH) and/or when a small timer value of a BSR retransmission timer (e.g., retxBSR-Timer) being configured. For example, due to a long propagation delay in an NTN system, the wireless device may generate new data (e.g., from uplink layers, e.g., application layers), after the wireless device transmits a BSR MAC CE in the first 2-step RA procedure triggered by the first BSR and when the wireless device is waiting for a response. The wireless device, based on existing technologies, may continue with the first RA procedure, and transmit an SR for the second triggered BSR. In an example, the wireless device, by implementing existing technologies, may abort/cancel the first RA procedure, in response to initiating/triggering another RA procedure (e.g., the second RA procedure) for the second BSR (e.g., when the priority of the second logical channel is higher than the priority of the first logical channel). When the wireless device cancels the on-going RA and starts the second RA (i.e., interrupting the ongoing RA procedure), delay until receiving an uplink grant may be increased as the wireless device starts over the process. In a long delay environment like NTN system, this may increase a latency of a BSR significantly, reduce the RA resource efficiency, and/or increase the consumed power of the wireless device.

Based on existing technologies, the 2-step RA procedure for BSR, if not improved, may increase the consumed power of the wireless device and/or increase data transmission latency in the uplink channel. There is a need to improve RA procedure for a BSR in an NTN network for improving the data transmission latency and/or reducing power consumption of a wireless device. Example embodiments may reduce possibility of an ongoing 2-step RA procedure being interrupted, improve the data transmission latency, and/or power transmission of the wireless device.

A wireless device may not initiate/trigger an RA procedure (e.g., a second RA) for a triggered BSR (e.g., a second BSR) based on determining that a first RA procedure (e.g., a 2-step RA procedure) for a first BSR is ongoing. The second BSR (e.g., associated with a second logical channel) may be triggered in response to uplink data being available for transmission. The second logical channel may have a lower priority than the first logical channel. In an example, the wireless device may wait for the first RA procedure to complete. By not triggering the second RA the wireless device may use received UL grant(s) (e.g., received via Msg B or Msg 4) to transmit BSR MAC CE and/or UL data.

Example embodiments may reduce the power consumption of the wireless device in an NTN scenario with a long communication distance between the wireless device and an NTN node (e.g., GEO satellite).

A wireless device may not initiate/trigger an RA procedure (e.g., a second RA) for a triggered BSR (e.g., a second BSR) based on determining that a first RA procedure (e.g., a 2-step RA procedure) for a first BSR being ongoing. The second BSR (e.g., associated with a second logical channel) may be triggered in response to uplink data being available for transmission. The second logical channel may have a lower priority than the first logical channel. In an example, the wireless device may trigger an SR procedure for the second BSR. In an example, the wireless device by not interrupting (e.g., aborting/cancelling) the first RA procedure may reduce the data transmission latency. Example embodiments may reduce the data transmission latency of the wireless device in an NTN scenario with a long propagation delay.

A wireless device may not initiate/trigger an RA procedure (e.g., a second RA) for a triggered BSR (e.g., a second BSR) based on determining that a first RA procedure (e.g., a 2-step RA procedure) for a first BSR being ongoing. The second BSR (e.g., associated with a second logical channel) may be triggered in response to uplink data being available for transmission. The second logical channel may have a higher priority than the first logical channel. In an example, the wireless device may wait for the first RA procedure to complete. In an example, by not triggering the second RA, the wireless device may reduce the random access load. Example embodiments may reduce a possibility of congestion in an NTN scenario with a large spotbeam.

Figure 35:
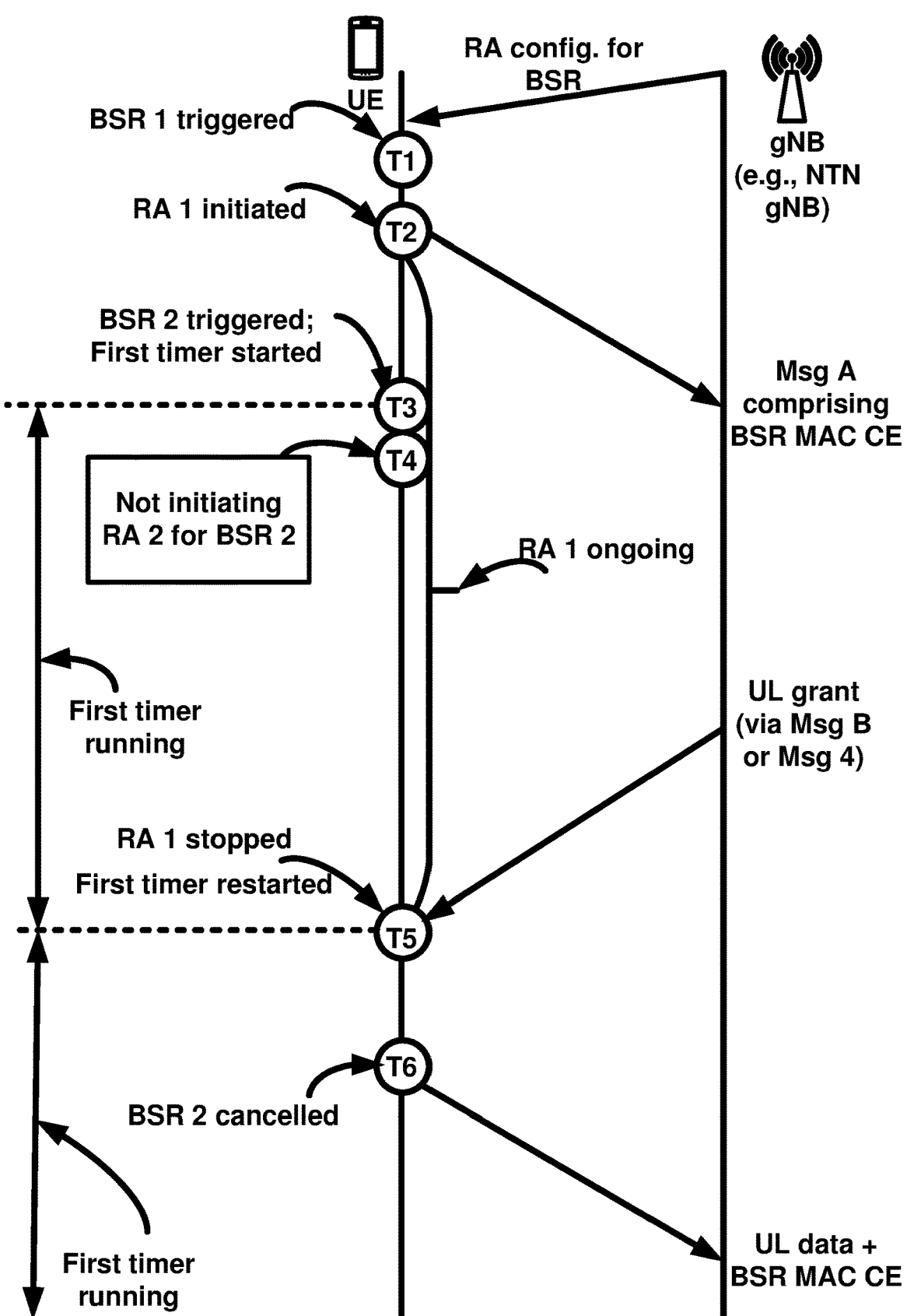
FIG. 35 shows an example of a 2-step RA procedure for BSR in an NTN network, in accordance with certain aspects of the present disclosure.

FIG. 35 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment shown in FIG. 35, the wireless device may trigger a first BSR in response to uplink data belonging to a first LCH becomes available for transmission at time T1 (e.g., the BSR 1). In an example, the wireless device may trigger an SR in response to no uplink radio resource(s) being available for transmission of the uplink data or trigger a 2-step RA for the first BSR.

As shown in FIG. 35, the wireless device may trigger the first 2-step RA procedure (e.g., RA 1 procedure) at time T2 (e.g., based on determining that the first timer is not running, and the first logical channel is configured with a 2-step RA procedure for BSR). Based on initiating/triggering the RA 1 procedure, the wireless device may transmit a preamble and BSR MAC CE via a PUSCH resource associated with the first 2-step RA procedure (e.g., a Msg A). The wireless device may cancel the first BSR in response to transmitting the Msg A comprising BSR MAC CE.

In an example, while the first RA procedure is ongoing, the wireless device may trigger a second BSR at time T3. The second BSR may be triggered due to arrival of a new data belonging to a second LCH.

In an example, upon (or based on) determining that the second BSR being triggered, and the first RA procedure is ongoing, the wireless device may start the first timer.

In an example, the second LCH may be configured with one or more SR configurations. The wireless device based on determining that the first timer is running may initiate an SR for BSR procedure. In another example, the second LCH may be configured with a 2-step RA procedure. The wireless device based on determining that the first timer is running may not trigger/initiate a second RA procedure (at time T4 in FIG. 35). In another example, the second LCH may be configured with no SR configuration. The wireless device based on determining that the first timer is running may not trigger/initiate a second RA procedure (at time T4 in FIG. 35). In an example, the second LCH, with the priority smaller than or equal to the priority threshold, may be configured with no SR configurations. The wireless device based on determining that the first timer is running may not initiate/trigger the second BSR at time T4 in FIG. 35. In another example, the second LCH, with the priority higher than the priority threshold, may be configured with no SR configurations. The wireless device based on determining that the first timer is running may not initiate/trigger the second BSR at time T4 in FIG. 35.

By not initiating/triggering the second RA procedure and waiting for UL-SCH resources to become available (e.g., via Msg B or Msg 4), while the first RA procedure is ongoing, the wireless device may reduce the power consumption and/or the interferences over the other wireless devices.

Considering the long propagation delay of an NTN network, not initiating/triggering the second RA procedure may improve the data transmission latency. In another example, considering the large cell/beam size in an NTN network, not initiating/triggering the second RA procedure may reduce the load on the RA resources.

In an example shown in FIG. 35, the wireless device may determine that at time T5 the ongoing RA procedure (e.g., RA 1 procedure) is completed.

In an example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., the Msg A) being transmitted. In an example, the ongoing RA procedure may be successfully completed based on determining that an UL grant for transmission of UL data is received via a Msg B in response to and/or after the transmission of the Msg A.

In another example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., the Msg A) being transmitted. In an example, the wireless device may receive a fallbackRAR MAC subPDU indicating the transmission of a Msg 3. The wireless may obtain a MAC PDU for transmitting a Msg 3 from a buffer of Msg A comprising BSR MAC CE. The wireless device may store the MAC PDU of the Msg 3 in a buffer of Msg 3. In an example, the wireless device may transmit the Msg 3 and, in response to the transmission of the Msg 3, start monitoring the PDCCH over a (variable) time window for a contention resolution message during a contention resolution window. In an example, the wireless device may receive one or more UL grants for transmission of UL data while monitoring PDCCH over the contention resolution time window. Upon receiving the one or more UL grants, the ongoing RA procedure may be successfully completed.

In another example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., the Msg A) being transmitted. In an example, the wireless device may receive the Msg B comprising a backoff indicator MAC subPDU indicating a retransmission of the Msg A. In an example, the wireless device may choose a backoff time (e.g., based on the received backoff indicator MAC subPDU) and retransmit the Msg A in response and/or after the backoff time being expired. In an example, the wireless device may start monitoring the PDCCH for a contention resolution message during a contention resolution window (e.g., msgB RAR window) after and/or in response to the retransmitting the Msg A. In an example, the ongoing RA procedure may be successfully completed based on determining that one or more UL grants for transmission of UL data being received via Msg B in response to and/or after the retransmission of the Msg A.

Based on determining that the RA 1 procedure is successfully completed the wireless device may transmit UL data (at time T6 in FIG. 35). In an example, the wireless device may transmit UL data and the BSR MAC CE at time T6. In an example, the wireless device may cancel the second BSR. In an example, the wireless device may reduce the consumed power by not initiating/triggering the second RA procedure.

By not initiating/triggering the second BSR while the first RA procedure is ongoing, the wireless device may reduce a possibility of interrupting the ongoing RA procedure (e.g., via aborting the ongoing RA procedure). In an example, in an NTN scenario with a long propagation delay, by not initiating/triggering the second BSR while the first RA procedure is ongoing, the data transmission latency may be improved.

As shown in FIG. 35 the wireless device may restart the first timer based on determining that the first RA procedure (triggered/initiated due to the first BSR) is successfully completed.

In an example, while the first timer is running and the first RA procedure (e.g., triggered as a result of the first BSR) is successfully completed, the wireless device may wait for the expiry of the first timer to initiate/trigger a new RA procedure for a new triggered BSR (e.g., the new BSR may be triggered after time T6 in FIG. 35).

In another example, while the first timer is running and the first RA procedure (e.g., triggered as a result of the first BSR) is successfully completed, the wireless device may wait for one or more UL-SCH resources to become available (e.g., Type 1 and/or Type 2 configured grants).

In another example, while the first timer is running and the first RA procedure (e.g., triggered as a result of the first BSR) is successfully completed, the wireless device, based on determining that new data (e.g., belonging to a logical channel being configured with one or more SR configuration parameters) is arrived may trigger an SR.

In another example, while the first timer is running and the first RA procedure (e.g., triggered as a result of the first BSR) is successfully completed, the wireless device, based on determining that new data (e.g., belonging to a logical channel being configured with no SR configuration parameters with the priority being higher than the priority threshold) is arrived, may initiate/trigger a new RA procedure. In an example, the wireless device may restart the first timer.

In another example, while the first timer is running and the first RA procedure (e.g., triggered as a result of the first BSR) is successfully completed, the wireless device, based on determining that new data (e.g., belonging to a logical channel being configured with no SR configuration parameters with the priority being lower than or equal to the priority threshold) being arrived, may not initiate/trigger a new RA procedure.

Figure 36:
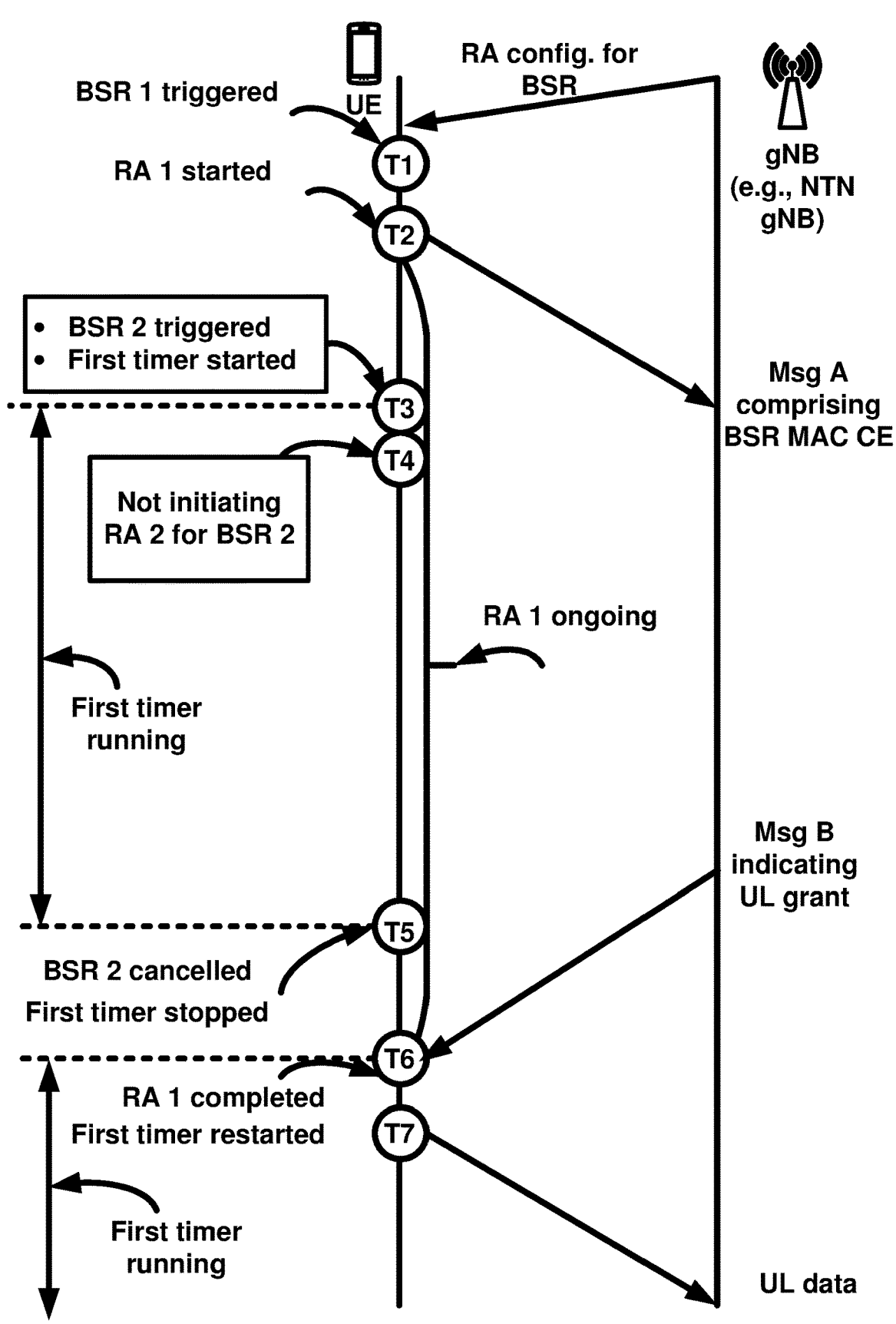
FIG. 36 shows an example of a 2-step RA procedure for BSR in an NTN network, in accordance with certain aspects of the present disclosure.

FIG. 36 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment shown in FIG. 36, the wireless device may trigger a first BSR in response to uplink data belonging to a first LCH being available for transmission at time T1 (e.g., BSR 1). In an example, the wireless device may trigger an SR in response to no uplink radio resource(s) being available for transmission of the uplink data or trigger a 2-step RA for the first BSR.

As shown in FIG. 36, the wireless device may trigger the first 2-step RA procedure (e.g., RA 1 procedure) at time T2 (e.g., based on determining that the first timer is not running, and the first logical channel being configured with a 2-step RA procedure for BSR). Based on initiating/triggering the RA 1 procedure, the wireless device may transmit a preamble and BSR MAC CE via a PUSCH resource associated with the first 2-step RA procedure (e.g., a Msg A). The wireless device may cancel the first BSR in response to transmitting the Msg A.

In an example, while the first RA procedure is ongoing, the wireless device may trigger a second BSR at time T3. The second BSR may be triggered due to arrival of a new data belonging to the second LCH.

In an example, based on determining that the second BSR is triggered, and the first RA procedure is ongoing, the wireless device may start the first timer. In an example, the second LCH may be configured with one or more SR configurations. The wireless device based on determining that the first timer is running may initiate an SR for BSR procedure.

In an example, the second LCH may be configured with no SR configuration. The wireless device based on determining that the first timer is running may not trigger/initiate a second RA procedure (at time T4 in FIG. 36). In an example, the second LCH may be configured with one or more SR configurations and 2-step RA procedure for BSR. The wireless device based on determining that the first timer is running may not initiate/trigger the second BSR at time T4 in FIG. 36. In an example, the second LCH, with the priority smaller than or equal to the priority threshold, may be configured with no SR configurations. The wireless device based on determining that the first timer is running may not initiate/trigger the second BSR at time T4 in FIG. 36.

In an example, the second LCH, with the priority higher than the priority threshold, may be configured with no SR configurations. The wireless device based on determining that the first timer is running may not initiate/trigger the second BSR at time T4 in FIG. 36.

In an example shown in FIG. 36, the wireless device may determine that at time T5, when the first RA procedure is ongoing and the second BSR is cancelled. In an example, the wireless device may receive one or more UL grants, not indicated via a Msg B or Msg 4, allowing the transmission of BSR MAC CE or UL data at time T5. In an example, the wireless device may use configured grants to report BSR MAC CE or UL data at time T5. In an example, based on reporting BSR MAC CE the wireless device may cancel the second BSR.

In an example, upon (or based on) determining that the first timer is running, the second BSR is cancelled, and the first RA procedure is ongoing, the wireless device may stop the first timer.

By not initiating/triggering the second RA procedure and waiting for available UL-SCH resources, while the first RA procedure is ongoing, the wireless device may reduce the power consumption and/or the interferences over the other wireless devices. In an example, the wireless device by not initiating/triggering the second RA procedure may use available UL resource(s) (e.g., Type1 and/or Type 2 configured grants) for reporting BSR MAC CE or the available data. Considering the long propagation delay of an NTN network, not initiating/triggering the second RA procedure (e.g., via aborting the first RA procedure) may improve the data transmission latency.

In an example shown in FIG. 36, the wireless device may determine that at time T5 the ongoing RA procedure (e.g., RA 1 procedure) is completed.

In an example shown in FIG. 36, the wireless device may determine the first RA procedure being completed by receiving an UL grant via Msg B. In an example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., Msg A) being transmitted. In an example, the ongoing RA procedure may be successfully completed based on determining that an UL grant for transmission of UL data being received via Msg B in response to and/or after the transmission of Msg A.

In another example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., Msg A) being transmitted. In an example, the wireless device may receive a fallbackRAR MAC subPDU indicating an UL grant for the transmission of a Msg 3. The wireless may obtain a MAC PDU for transmitting the Msg 3 from a buffer of the Msg A comprising BSR MAC CE. The wireless device may store the MAC PDU of the Msg 3 in a buffer of the Msg 3. In an example, the wireless device may transmit the Msg 3 comprising the BSR MAC CE and, in response to the transmission of the Msg 3, start monitoring the PDCCH over a (variable) time window for a contention resolution message during a contention resolution window (e.g., when contention resolution timer being running). In an example, the wireless device may receive an indication of one or more UL grants, for transmission of UL data, via Msg 4 while monitoring PDCCH over the contention resolution window. Upon (or based on) receiving the one or more UL grants, the ongoing RA procedure may be successfully completed.

In another example, the wireless device may start monitoring a PDCCH for a contention resolution message during a contention resolution window (e.g., msgB RAR window), wherein the wireless device may start to monitor the PDCCH over a (variable) time period/window after the PUSCH message comprising the BSR MAC CE (e.g., the Msg A or a retransmission of the Msg A) being transmitted. In an example, the wireless device may receive the Msg B comprising a backoff indicator MAC subPDU indicating a retransmission of Msg A. In an example, the wireless device may choose a backoff time (e.g., based on the received backoff indicator MAC subPDU) and retransmit the Msg A in response and/or after the backoff time being expired. In an example, the wireless device may start monitoring a PDCCH for a contention resolution message during a contention resolution window (e.g., msgB RAR window) after and/or in response to the retransmitting the Msg A. In an example, the ongoing RA procedure may be successfully completed based on determining that an UL grant for transmission of UL data being received via Msg B in response to and/or after the retransmission of the Msg A.

Based on determining that the RA 1 procedure is successfully completed the wireless device may transmit the UL data (at time T6 in FIG. 36).

As shown in FIG. 36 the wireless device may restart the first timer based on determining that the first RA procedure is completed and the first RA procedure is triggered/initiated as a result of a triggering BSR (e.g., the first BSR).

In an example, while the first timer is running, in response to determining that the first RA procedure (e.g., triggered as a result of the first BSR) is successfully completed, a new data may arrive that may trigger a new BSR (e.g., the new BSR may be triggered after time T7 in FIG. 36). In an example, based on triggering the new BSR the wireless device may wait for the expiry of the first timer to initiate/ trigger a new RA procedure.

In another example, while the first timer is running, in response to determining that the first RA procedure (e.g., triggered as a result of the first BSR) is successfully completed, a new data may arrive that may trigger a new BSR (e.g., the new BSR may be triggered after time T7 in FIG. 36). The wireless device may wait for one or more UL-SCH resources to become available (e.g., Type 1 and/or Type 2 configured grants) while the first timer is running.

In another example, while the first timer is running, in response to determining that the first RA procedure (e.g., triggered as a result of the first BSR) is successfully completed, a new data may arrive that may trigger a new BSR (e.g., the new BSR may be triggered after time T7 in FIG. 36). In an example, the new data may belong to a logical channel being configured with one or more SR configuration parameters. The wireless device, based on determining that new data being arrived may trigger an SR.

In another example, while the first timer is running, in response to determining that the first RA procedure (e.g., triggered as a result of the first BSR) is successfully completed, a new data may arrive that may trigger a new BSR (e.g., the new BSR may be triggered after time T7 in FIG. 36). In an example, the new data may belong to a logical channel being configured with no SR configuration parameters with the priority being higher than the priority threshold. In an example, the wireless device may initiate/trigger a new RA procedure in response to the availability of new data. In an example, the wireless device may restart the first timer.

In another example, while the first timer is running, in response to determining that the first RA procedure (e.g., triggered as a result of the first BSR) is successfully completed, a new data may arrive that may trigger a new BSR (e.g., the new BSR may be triggered after time T7 in FIG. 36). In an example, the new data may belong to a logical channel being configured with no SR configuration parameters with the priority being lower than or equal to the priority threshold. In an example, the wireless device may not initiate/trigger a new RA procedure in response to the availability of new data.

Figure 37:
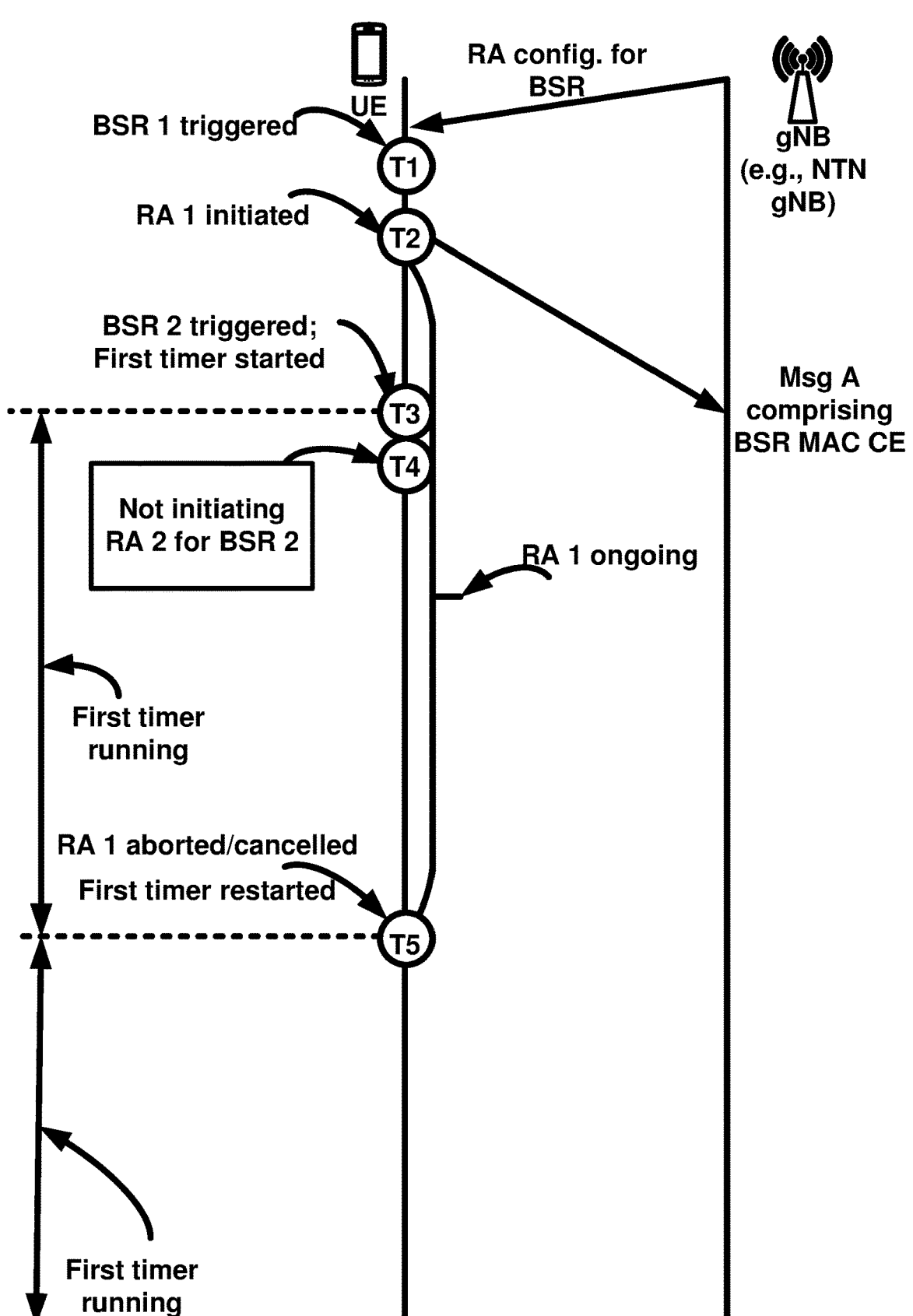
FIG. 37 shows an example of a 2-step RA procedure for BSR in an NTN network, in accordance with certain aspects of the present disclosure.

FIG. 37 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment shown in FIG. 37, the wireless device may trigger a first BSR in response to uplink data belonging to a first LCH being available for transmission at time T1 (e.g., BSR 1). In an example, the wireless device may trigger an SR in response to no uplink radio resource(s) being available for transmission of the uplink data or trigger a 2-step RA for the first BSR.

As shown in FIG. 37, the wireless device may trigger the first 2-step RA procedure (e.g., RA 1 procedure) at time T2 (e.g., based on determining that the first timer is not running, and the first logical channel being configured with a 2-step RA procedure for BSR). Based on initiating/triggering the RA 1 procedure, the wireless device may transmit a preamble and BSR MAC CE via a PUSCH resource associated with the first 2-step RA procedure (e.g., a Msg A). The wireless device may cancel the first BSR in response to transmitting the Msg A.

In an example, while the first RA procedure is ongoing, the wireless device may trigger a second BSR at time T3. The second BSR may be triggered due to arrival of a new data belonging to a second LCH.

In an example, based on determining that the second BSR is triggered and the first RA procedure is ongoing, the wireless device may start the first timer. In an example, the second LCH may be configured with one or more SR configurations. The wireless device based on determining that the first timer is running may initiate an SR for BSR procedure. In an example, the second LCH may be configured with no SR configuration. The wireless device based on determining that the first timer is running may not trigger/ initiate a second RA procedure (at time T4 in FIG. 37). In an example, the second LCH may be configured with no SR configuration. The wireless device based on determining that the first timer is running may not trigger/initiate a second RA procedure (at time T4 in FIG. 37). In an example, the second LCH, with the priority smaller than or equal to the priority threshold, may be configured with no SR configurations. The wireless device based on determining that the first timer is running may not initiate/trigger the second BSR at time T4 in FIG. 37. In anpther example, the second LCH, with the priority higher than the priority threshold, may be configured with no SR configurations. The wireless device based on determining that the first timer is running may not initiate/trigger the second BSR at time T4 in FIG. 37.

By not initiating/triggering the second BSR while the first RA procedure is ongoing, the wireless device may reduce a possibility of RA congestion on a limited RA resource. In an example, considering the large cell/beam size in an NTN network, not initiating/triggering the second RA procedure may reduce the load on the RA resources.

In an example shown in FIG. 37, the wireless device may determine that at time T5 the ongoing RA procedure (e.g., RA 1 procedure) is unsuccessfully completed. In an example, the ongoing RA procedure may be aborted/cancelled as a result of initiating/triggering another RA procedure (e.g., a 4-step RA procedure) for another application such as handover, beam failure recovery, SI request. In an example, the ongoing RA procedure may be aborted/cancelled by initiating another RA procedure not as a result of a triggering BSR (e.g., a third BSR). In an example, a higher layer (e.g., MAC layer) may order the cancelation/abortion of the ongoing RA procedure.

As shown in FIG. 37, based on determining that the RA 1 procedure is unsuccessfully completed (e.g., aborted/cancelled), the first RA procedure is completed and the first RA procedure is triggered/initiated as a result of a triggering BSR (e.g., the first BSR) the wireless device may restart the first timer.

In an example, while the first timer is running, in response to determining that the first RA procedure (e.g., triggered as a result of the first BSR) is unsuccessfully completed, a new data may arrive that may trigger a new BSR (e.g., the new BSR may be triggered after time T5 in FIG. 37). In an example, based on triggering the new BSR the wireless device may wait for the expiry of the first timer to initiate/trigger a new RA procedure.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T5 in FIG. 37). The wireless device may wait for one or more UL-SCH resources to become available (e.g., Type 1 and/or Type 2 configured grants) while the first timer is running.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T5 in FIG. 37). In an example, the new data may belong to a logical channel being configured with one or more SR configuration parameters. The wireless device, based on determining that new data being arrived may trigger an SR.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T5 in FIG. 37). In an example, the new data may belong to a logical channel being configured with no SR configuration parameters with the priority being higher than the priority threshold. In an example, the wireless device may initiate/trigger a new RA procedure in response to the availability of new data. In an example, the wireless device may restart the first timer.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T5 in FIG. 37). In an example, the new data may belong to a logical channel being configured with no SR configuration parameters with the priority being lower than or equal to the priority threshold. In an example, the wireless device may not initiate/trigger a new RA procedure in response to the availability of new data.

Figure 38:
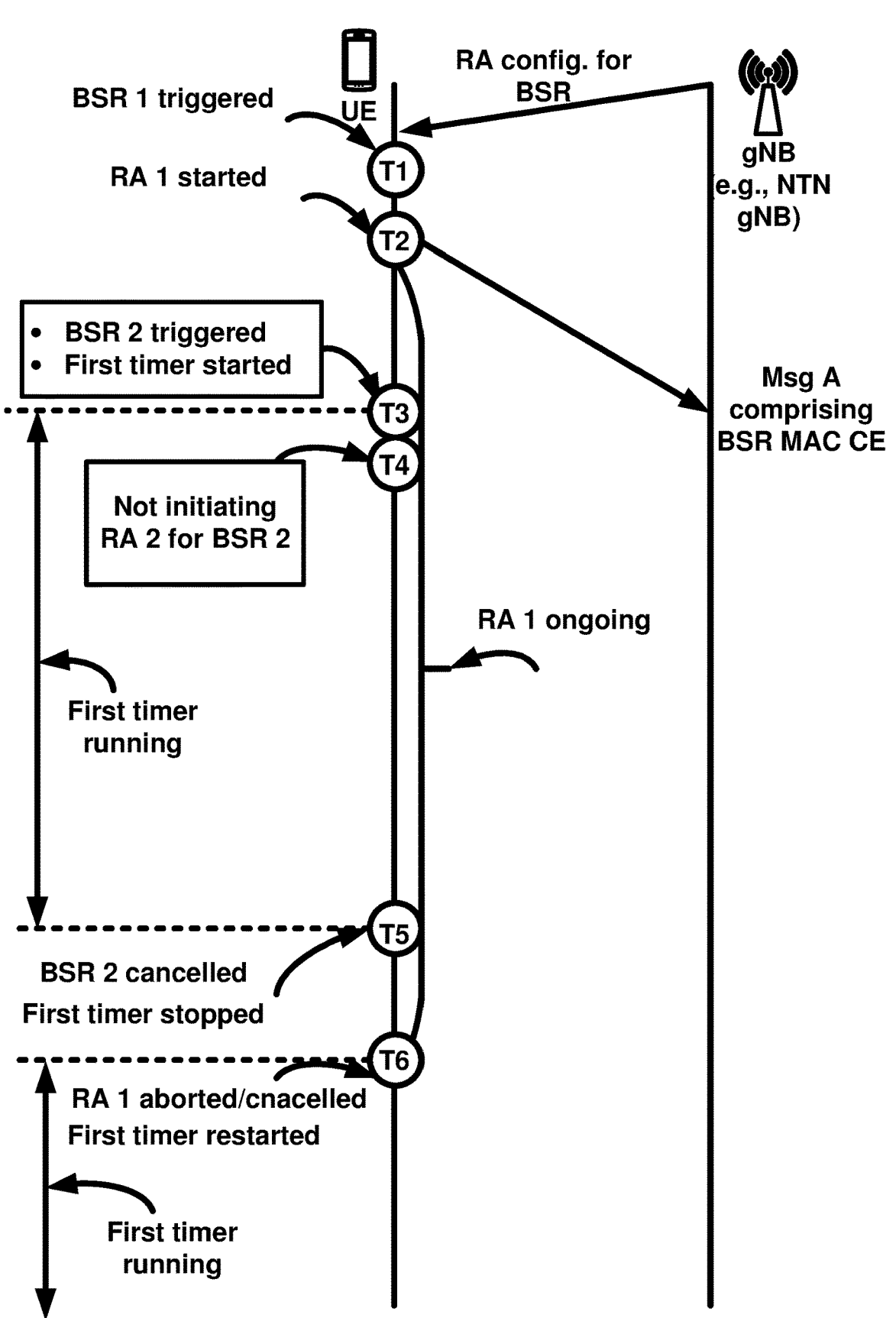
FIG. 38 shows an example of a 2-step RA procedure for BSR in an NTN network, in accordance with certain aspects of the present disclosure.

FIG. 38 shows an example of RA based BSR procedure in an NTN network, in accordance with certain aspects of the present disclosure. In an example, a wireless device may receive, from a base station of an NTN system (e.g., based on example embodiments described above with respect to FIG. 24A and/or FIG. 24B), one or more RRC messages comprising configuration parameters of a BSR.

In an example embodiment shown in FIG. 38, the wireless device may trigger a first BSR in response to uplink data belonging to a first LCH being available for transmission at time T1 (e.g., BSR 1). In an example, the wireless device may trigger an SR in response to no uplink radio resource(s)

being available for transmission of the uplink data or trigger a 2-step RA for the first BSR.

As shown in FIG. 38, the wireless device may trigger the first 2-step RA procedure (e.g., RA 1 procedure) at time T2 (e.g., based on determining that the first timer is not running, and the first logical channel being configured with a 2-step RA procedure for BSR). Based on initiating/triggering the RA 1 procedure, the wireless device may transmit a preamble and BSR MAC CE via a PUSCH resource associated with the first 2-step RA procedure (e.g., a Msg A). The wireless device may cancel the first BSR in response to transmitting the Msg A.

In an example, while the first RA procedure is ongoing, the wireless device may trigger a second BSR at time T3. The second BSR may be triggered due to arrival of a new data belonging to a second LCH.

In an example, upon determining that the second BSR is triggered and the first RA procedure is ongoing, the wireless device may start the first timer. In an example, the second LCH may be configured with one or more SR configurations. The wireless device based on determining that the first timer is running may initiate an SR for BSR procedure. In another example, the second LCH may be configured with no SR configuration. The wireless device based on determining that the first timer is running may not trigger/initiate a second RA procedure (at time T4 in FIG. 38). In another example, the second LCH may be configured with one or more SR configurations and 2-step RA procedure for BSR. The wireless device based on determining that the first timer is running may not initiate/trigger the second BSR at time T4 in FIG. 38. In an example, the second LCH, with the priority smaller than or equal to the priority threshold, may be configured with no SR configurations. The wireless device based on determining that the first timer is running may not initiate/trigger the second BSR at time T4 in FIG. 38. In an example, the second LCH, with the priority higher than the priority threshold, may be configured with no SR configurations. The wireless device based on determining that the first timer is running may not initiate/trigger the second BSR at time T4 in FIG. 38.

In an example shown in FIG. 38, the wireless device may determine that at time T5, when the first RA procedure is ongoing, the second BSR being cancelled. In an example, the wireless device may receive one or more UL grants (e.g., not indicated via a Msg B or Msg 4), allowing the transmission of BSR MAC CE or UL data at time T5. In an example, the wireless device may use configured grants to report BSR MAC CE or UL data at time T5.

In an example, based on determining that the first timer is running, the second BSR is cancelled, and the first RA procedure is ongoing, the wireless device may stop the first timer.

By not initiating/triggering the second RA procedure and waiting for available UL-SCH resources, while the first RA procedure is ongoing, the wireless device may reduce the power consumption and/or the interferences over the other wireless devices. In an example, the wireless device by not initiating/triggering the second RA procedure may use available UL-SCH resource(s) (e.g., Type1 and/or Type 2 configured grants) for reporting BSR MAC CE or the available data. Considering a long propagation delay of the NTN network, not initiating/triggering the second RA procedure (e.g., via aborting the first RA procedure) may improve the data transmission latency. In an example, considering a large cell/beam size in an NTN network, not initiating/triggering the second RA procedure may reduce the load on the RA resources.

In an example shown in FIG. 38, the wireless device may determine that at time T5 the ongoing RA procedure (e.g., RA 1 procedure) being unsuccessfully completed. In an example, the ongoing RA procedure may be aborted/cancelled as a result of initiating/triggering another RA procedure (e.g., a 4-step RA procedure) for another application such as handover, beam failure recovery, SI request. In an example, the ongoing RA procedure may not be aborted/cancelled by initiating another RA procedure triggered as a result of a triggering BSR (e.g., a third BSR). In an example, a higher layer (e.g., MAC layer) may order the cancelation/abortion of the ongoing RA procedure.

As shown in FIG. 38, based on determining that the RA 1 procedure being unsuccessfully completed (e.g., aborted/cancelled) the wireless device may restart the first timer based on determining that the first RA procedure being completed and the first RA procedure being triggered/initiated as a result of a triggering BSR (e.g., the first BSR).

In an example, while the first timer is running, in response to determining that the first RA procedure (e.g., triggered as a result of the first BSR) is unsuccessfully completed, a new data may arrive that may trigger a new BSR (e.g., the new BSR may be triggered after time T6 in FIG. 37). In an example, based on triggering the new BSR the wireless device may wait for the expiry of the first timer to initiate/trigger a new RA procedure.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T6 in FIG. 38). The wireless device may wait for one or more UL-SCH resources to become available (e.g., Type 1 and/or Type 2 configured grants) while the first timer is running.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T6 in FIG. 38). In an example, the new data may belong to a logical channel being configured with one or more SR configuration parameters. The wireless device, based on determining that new data being arrived may trigger an SR.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T6 in FIG. 38). In an example, the new data may belong to a logical channel being configured with no SR configuration parameters with the priority being higher than the priority threshold. In an example, the wireless device may initiate/trigger a new RA procedure in response to the availability of new data. In an example, the wireless device may restart the first timer.

In another example, while the first timer is running, in response to determining that the first RA procedure (e.g., triggered as a result of the first BSR) is unsuccessfully completed, a new data may arrive that may trigger a new BSR (e.g., the new BSR may be triggered after time T6 in FIG. 38). In an example, the new data may belong to a logical channel being configured with no SR configuration parameters with the priority being lower than or equal to the priority threshold. In an example, the wireless device may not initiate/trigger a new RA procedure in response to the availability of new data.

According to an example embodiment, a wireless device may transmit to a base station a message comprising a preamble and a first buffer status report (BSR) Media Access Control (MAC) Control Element (CE) in response to initiating/triggering a first random access (RA) procedure. The wireless device may, in response to aborting/canceling/completing the first RA procedure, may start a first timer. Based on determining that the first timer is running, the wireless device may not initiate/trigger a second RA procedure for a second triggered BSR.

In an example, the wireless device may determine that the first timer is running.

In an example, the completing the first RA procedure, by the wireless device, may comprise receiving one or more UL grants for transmission of uplink data.

In an example, the wireless device may receive the one or more UL grants as a response to the transmitting of the message.

In an example, the one or more UL grants may be available not as a response to the transmitting of the message.

In an example, the completing the first RA procedure my comprise receiving a command to stop the first RA procedure.

In an example, the completing of the first RA may be a successful completion of the first RA procedure or an unsuccessful completion of the first RA procedure.

In an example, the wireless device may transmit, in response to triggering an RA procedure, a message comprising a preamble and the BSR MAC CE.

In an example, the wireless device may, based on determining that the message not comprising the BSR MAC CE, not start the first timer.

In an example, the first RA procedure may be a 2-step RA procedure.

In an example, the second RA procedure may be a 2-step RA procedure.

In an example, the second RA procedure may be a 4-step RA procedure.

In an example, the message may be a Msg A.

In an example, the transmitting the Msg A, by the wireless device, may comprise transmitting the preamble via at least one of the one or more RACH resources and transmitting the BSR MAC CE via at least one of the one or more PUSCH resources.

In an example, the wireless device may receive downlink signal, from the base station, indicating Radio Resource Control (RRC) configuration parameters indicating: one or more RACH resources associated with an RA procedure for the BSR, one or more physical uplink shared channel (PUSCH) resources associated with the RA procedure for the BSR, one or more BSR configuration parameter associated with one or more logical channels, and one or more Scheduling Request (SR) configuration parameters.

In an example, the wireless device may receive one or more messages comprising one or more configuration parameters indicating the first timer and a priority threshold.

In an example, the priority threshold may be absent from the one or more configuration parameters.

In an example, the one or more SR configuration parameters may be absent from the RRC configuration parameters.

In an example, the first BSR may be triggered due to arrival of new data associated to a first logical channel.

In an example, the second BSR may be triggered due to arrival of new data associated with a second logical channel.

In an example, the wireless device may transmit a scheduling request (SR) for the second BSR based on determining that the first timer is running and a second logical channel, triggering the second BSR, being configured with one or more SR configuration parameters.

In an example, the wireless device may initiate/trigger the second RA procedure for the second BSR based on determining that the first timer is running, the first RA procedure is completed, a second logical channel, triggering the second BSR, being configured with no SR configuration parameters, and a priority level of the second logical channel, triggering the second BSR, is higher than a priority threshold.

In an example, the wireless device may not initiate/trigger the second RA procedure for the second BSR based on determining that the first timer is running, the first RA procedure is completed, a second logical channel, triggering the second BSR, being configured with no SR configuration parameters, and a priority level of the second logical channel, triggering the second BSR, is lower than or equal to a priority threshold.

In an example, the wireless device may not initiate/trigger the second RA procedure for the second BSR based on determining that the first timer is running, the first RA procedure is completed, a second logical channel, triggering the second BSR, being configured with no SR configuration parameters, and a priority threshold is absent from the SR configuration parameters.

In an example, the wireless device may restart the first timer based on initiating/triggering the second RA procedure.

In an example, the wireless device may, based on determining that the first timer being running and the first RA procedure being completed, wait for expiry of the first timer for initiating/triggering the second RA procedure for the second BSR.

In an example, not initiating/triggering the second RA procedure, by the wireless device, for the second BSR may comprise not transmitting a second preamble and a second message.

In an example, not initiating/triggering the second RA procedure, by the wireless device, for the second BSR may comprise not selecting resources for the transmitting of a second preamble and a second message.

In an example, not initiating/triggering the second RA procedure, by the wireless device, for the second BSR may comprise not transmitting the second preamble.

In an example, the wireless device may be in a non-terrestrial network (NTN).

In an example, the wireless device may transmit a third message comprising a third preamble and a third BSR MAC CE in response to initiating/triggering a third RA procedure. In response to aborting/canceling/stopping the third RA procedure the wireless device may start the first timer. The wireless device may, based on determining that the first timer is not running, initiate/trigger a fourth RA procedure in response to a fourth BSR being triggered.

According to an example embodiment, a wireless device may transmit to a base station a message comprising a preamble and a first buffer status report (BSR) Media Access Control (MAC) Control Element (CE) in response to initiating/triggering a first RA procedure. The wireless device may start a first timer based on determining that a second BSR being triggered and the first RA procedure being ongoing. Based on the first timer is running, the wireless device may not initiate/trigger, for the second BSR, a second RA procedure. The wireless device may stop, based on the second BSR being cancelled before the first RA procedure is completed, the first timer.

In an example, the wireless device may determine that the first timer is running.

In an example, the wireless device may, based on determining that the second BSR is triggered, start the first timer.

In an example, the wireless device may, based on determining that the first RA procedure is ongoing, start the first timer.

In an example, the wireless device may, based on determining that the first RA procedure not being aborted/cancelled/completed, determine that the first RA procedure is ongoing.

In an example, the first RA procedure being completed may comprise receiving one or more UL grants for transmission of uplink data.

In an example, the one or more UL grants may be received, by the wireless device, as a response to the transmitting of the message.

In an example, the one or more UL grants may become available not as a response to the transmitting of the message.

In an example, the first RA procedure being completed may comprise receiving, by the wireless device, a command to stop the first RA procedure.

In an example, the first RA procedure may be successfully completed or unsuccessfully completed.

In an example, the wireless device may stop the first timer based on determining that the second BSR being cancelled prior to the completion/cancelation/abortion of the first RA procedure and the message comprises the BSR MAC CE.

In an example, the cancelation of the BSR may be in response to the transmitting of a first MAC Protocol Data Unit (PDU) using one or more uplink shared channel resources that accommodate one or more pending data or the transmitting of a second MAC PDU including a Long BSR MAC CE or a Short BSR MAC CE.

In an example, the Long BSR MAC CE or the Short BSR MAC CE may contain a buffer status up to, and including, a last event that triggered a BSR prior to assembly of the MAC PDU.

In an example, the wireless device may transmit, in response to triggering the first RA procedure, a message comprising a preamble and the BSR MAC CE.

In an example, the wireless device may not start the first timer based on determining that the message not being comprised of the BSR MAC CE.

In an example, the wireless device may restart the first timer based on determining that the first RA procedure being completed, the message comprises the BSR MAC CE, and the first timer is stopped or is running.

In an example, the second BSR may be cancelled after the first RA procedure is completed.

In an example, the second BSR may not be cancelled after the first RA procedure is completed.

In an example, the second BSR may be cancelled before the first RA procedure is completed.

In an example, the second BSR may be pending before the first RA procedure is completed.

In an example, the first RA procedure may be a 2-step RA procedure.

In an example, the second RA procedure may be a 2-step RA procedure.

In an example, the second RA procedure may be a 4-step RA procedure.

In an example, the message may be a Msg A.

In an example, the transmitting the Msg A, by the wireless device, may comprise transmitting the preamble via at least one of the one or more Random Access Channel (RACH)

resources and transmitting the BSR MAC CE via at least one of the one or more PUSCH resources.

In an example, the wireless device may receive downlink signal, from the base station, indicating Radio Resource Control (RRC) configuration parameters indicating one or more Random Access Channel (RACH) resources associated with an RA procedure for the BSR, and one or more physical uplink shared channel (PUSCH) resources associated with the RA procedure for the BSR, one or more BSR configuration parameter associated with one or more logical channels, and one or more Scheduling Request (SR) configuration parameters.

In an example, the wireless device may receive one or more messages comprising one or more configuration parameters indicating the first timer.

In an example, the one or more SR configuration parameters may be absent from the RRC configuration parameters.

In an example, the first BSR may be triggered due to arrival of new data associated to a first logical channel.

In an example, the second BSR may be triggered due to arrival of new data associated to a second logical channel.

In an example, the wireless device may, based on determining that the first RA procedure is ongoing, transmit a scheduling request (SR) for the second BSR.

In an example, the wireless device may, based on determining that the first timer is running, wait for expiry of the first timer for the second BSR.

In an example, not initiating/triggering the second RA procedure, by the wireless device, for the second BSR may comprise not transmitting a second preamble and a second message.

In an example, not initiating/triggering the second RA procedure, by the wireless device, for the second BSR may comprise not selecting resources for the transmitting of a second preamble and a second message.

In an example, not initiating/triggering the second RA procedure, by the wireless device, for the second BSR may comprise not transmitting a second preamble.

In an example, not initiate/trigger the second RA procedure, by the wireless device, for the second BSR may comprise not selecting resources for the transmitting of a second preamble.

In an example, the BSR MAC CE may comprise a field indicating amount of uplink data.

In an example, the base station may be a non-terrestrial network (NTN) base station.

In an example, the wireless device may be in a non-terrestrial network (NTN).

In an example, the wireless device may transmit, by a wireless device to a base station, a message comprising a preamble and a third buffer status report (BSR) MAC CE in response to initiating/triggering a third RA procedure. The wireless device may, based on the third RA procedure being aborted/canceled/completed, start a first timer. Based on the first timer is running, the wireless device may not initiate/trigger, a fourth RA procedure for a fourth BSR.

What is claimed is:

1. A wireless device comprising:
one or more processors; and
memory storing instructions that, when executed by the one or more processors, cause the wireless device to:
  receive one or more configuration parameters indicating a first timer used for prohibiting initiation of a random access (RA) procedure for a buffer status report (BSR);
  start the first timer based on completing a first RA procedure initiated for a first BSR;

trigger a second BSR while the first timer is running; and
  based on the triggering the second BSR while the first timer running, prohibit initiation of a second RA procedure for the second BSR.

2. The wireless device of claim 1, wherein the instructions, when executed by the one or more processors, further cause the wireless device to:
determine whether the first timer is running or is stopped; and
initiate the first RA procedure based on the first timer being stopped.

3. The wireless device of claim 1, wherein the completing of the first RA procedure is a successful completion of the first RA procedure or an unsuccessful completion of the first RA procedure.

4. The wireless device of claim 1, wherein the first BSR corresponds to a first logical channel (LCH).

5. The wireless device of claim 1, wherein:
the second BSR corresponds to a second LCH; and
a configuration of the second LCH excludes a scheduling request (SR) configuration.

6. The wireless device of claim 1, wherein the instructions, when executed by the one or more processors, further cause the wireless device to:
transmit, for the first BSR, a BSR medium access control (MAC) control element (CE) via a message A (MsgA) of the first RA procedure.

7. The wireless device of claim 6, wherein the instructions, when executed by the one or more processors, further cause the wireless device to:
prohibit initialization of the first timer:
until completion of the first RA procedure for the BSR after transmitting the MsgA;
after transmitting the BSR MAC CE via the MsgA of the first RA procedure; or
based on a short truncated BSR MAC CE or a long truncated BSR MAC CE being transmitted via the MsgA of the first RA procedure.

8. A base station comprising:
one or more processors; and
memory storing instructions that, when executed by the one or more processors, cause the base station to:
  transmit one or more configuration parameters, wherein the one or more configuration parameters indicate:
    a first timer configured for prohibiting initiation of a random access (RA) procedure for a buffer status report (BSR);
    initiation of the first timer based on completing a first RA procedure for a first BSR; and
    prohibition of a second RA procedure for a second BSR while the first timer is running.

9. The base station of claim 8, wherein the completing of the first RA procedure is a successful completion of the first RA procedure or an unsuccessful completion of the first RA procedure.

10. The base station of claim 8, wherein the first BSR corresponds to a first logical channel (LCH).

11. The base station of claim 8, wherein:
the second BSR corresponds to a second LCH; and
a configuration of the second LCH excludes a scheduling request (SR) configuration.

12. The base station of claim 8, wherein the instructions, when executed by the one or more processors, further cause the base station to:

receive, for the first BSR, a BSR medium access control (MAC) control element (CE) via a message A (MsgA) of the first RA procedure.

13. The base station of claim 12, wherein the one or more configuration parameters indicate prohibition of initialization of the first timer:

until completion of the first RA procedure for the BSR after transmitting the MsgA;

after transmitting the BSR MAC CE via the MsgA of the first RA procedure; or based on a short truncated BSR MAC CE or a long truncated BSR MAC CE being transmitted via the MsgA of the first RA procedure.

14. The base station of claim 13, wherein the one or more configuration parameters indicate the first timer prohibiting the initiation of the second RA procedure for the second BSR based on at least one of:

waiting for the first timer to be expired before the initiation of the second RA procedure for the second BSR;

triggering a scheduling request (SR) for the BSR while the first timer is running; or using an available uplink shared channel resource for the BSR.

15. A non-transitory computer-readable medium comprising instructions that, when executed by one or more processors of a wireless device, cause the wireless device to:

receive one or more configuration parameters indicating a first timer used for prohibiting initiation of a random access (RA) procedure for a buffer status report (BSR);

start the first timer based on completing a first RA procedure initiated for a first BSR;

trigger a second BSR while the first timer is running; and based on the triggering the second BSR while the first timer running, prohibit initiation of a second RA procedure for the second BSR.

16. The non-transitory computer-readable medium of claim 15, wherein the instructions further cause the wireless device to:

determine whether the first timer is running or is stopped; and initiate the first RA procedure based on the first timer being stopped.

17. The non-transitory computer-readable medium of claim 15, wherein the completing of the first RA procedure is a successful completion of the first RA procedure or an unsuccessful completion of the first RA procedure.

18. The non-transitory computer-readable medium of claim 15, wherein the first BSR corresponds to a first logical channel (LCH).

19. The non-transitory computer-readable medium of claim 15, wherein:

the second BSR corresponds to a second LCH; and a configuration of the second LCH excludes a scheduling request (SR) configuration.

20. The non-transitory computer-readable medium of claim 15, wherein the instructions further cause the wireless device to:

transmit, for the first BSR, a BSR medium access control (MAC) control element (CE) via a message A (MsgA) of the first RA procedure; and prohibit initialization of the first timer:

until completion of the first RA procedure for the BSR after transmitting the MsgA;

after transmitting the BSR MAC CE via the MsgA of the first RA procedure; or based on a short truncated BSR MAC CE or a long truncated BSR MAC CE being transmitted via the MsgA of the first RA procedure.

* * * * *